US011402802B2

(12) United States Patent
Chan et al.

(10) Patent No.: US 11,402,802 B2
(45) Date of Patent: Aug. 2, 2022

(54) PHOTONIC COHERENT DETECTION ARRAY

(71) Applicants: Kam Wai Clifford Chan, San Diego, CA (US); Chung Ki Wong, San Diego, CA (US)

(72) Inventors: Kam Wai Clifford Chan, San Diego, CA (US); Chung Ki Wong, San Diego, CA (US)

(73) Assignee: OAM PHOTONICS LLC, San Diego, CA (US)

( * ) Notice: Subject to any disclaimer, the term of this patent is extended or adjusted under 35 U.S.C. 154(b) by 183 days.

(21) Appl. No.: 16/997,809

(22) Filed: Aug. 19, 2020

(65) Prior Publication Data

US 2021/0055694 A1    Feb. 25, 2021

Related U.S. Application Data

(60) Provisional application No. 62/889,065, filed on Aug. 20, 2019.

(51) Int. Cl.
*G03H 1/26* (2006.01)

(52) U.S. Cl.
CPC ..... *G03H 1/2645* (2013.01); *G03H 2001/267* (2013.01); *G03H 2001/2665* (2013.01); *G03H 2001/2675* (2013.01)

(58) Field of Classification Search
CPC . G02B 5/28; G02B 5/32; H04B 10/11; H04B 10/25; H04B 10/60; H04B 10/61; H04B 10/615; H04B 10/64; H04B 10/80; H04B 10/801; H04B 10/803
USPC ............. 359/22, 1, 10, 11, 15, 32, 35, 577; 398/43, 44, 45, 79, 82, 87, 91, 96, 202, 398/204, 207, 212, 214
See application file for complete search history.

(56) References Cited

U.S. PATENT DOCUMENTS

| | | | | | |
|---|---|---|---|---|---|
| 4,783,850 | A | * | 11/1988 | MacDonald | H04Q 11/0005 398/48 |
| 5,058,101 | A | * | 10/1991 | Albanese | H04B 10/271 398/1 |
| 7,315,584 | B1 | * | 1/2008 | Epworth | H04B 10/61 375/325 |
| 8,965,221 | B2 | * | 2/2015 | Hironishi | H04B 10/614 398/208 |
| 2010/0322631 | A1 | * | 12/2010 | Nagarajan | G02B 6/12009 398/65 |

(Continued)

*Primary Examiner* — Arnel C Lavarias
(74) *Attorney, Agent, or Firm* — Hsuanyeh Law Group PC

(57) ABSTRACT

The present invention relates to a coherent detection array and methods of multiplexing for signal readout of the coherent detection array. The coherent detection array may be implemented on a photonic integrated circuit (PIC). It may comprise a plurality of coherent detection units coupling with connecting waveguides and electrical conducting paths, wherein the electrical conducting paths may manifest as readout channels for multiplexing electrical signals. The detection units may be configured to include free-space-to-waveguide couplers, optical couplers, and photodetectors. The coherent detection array enables multiplexing methods that may leverage extra degrees of freedom of the coherent detection array. These methods may include those enabled by the local oscillator and those related to the properties and responses of the components of the PIC-based detection array.

25 Claims, 26 Drawing Sheets

(56) References Cited

U.S. PATENT DOCUMENTS

2015/0117865 A1\* 4/2015 Sonoda ................ H04B 10/614
                                                                            398/140

\* cited by examiner

PHOTONIC COHERENT DETECTION ARRAY

CROSS-REFERENCE TO RELATED APPLICATION

This application claims the benefit of U.S. Provisional Patent Application No. 62/889,065 filed on Aug. 20, 2019, which is incorporated by reference herein in its entirety.

FIELD OF THE INVENTION

The present invention relates to optical coherent detection and, in particular, relates to detection arrays for optical coherent detection.

BACKGROUND

Optical coherent detection, also known as optical heterodyne detection, is able to measure both the field amplitude and phase of an optical signal relative to a reference light signal, customarily called the local oscillator (LO), whereas direct optical detection measures only the light intensity of the optical signal. Advantages of coherent detection include near shot-noise-limited optical amplification, rejection of background light and provision of additional information through the phase.

A detection array, commonly called a focal plane array (FPA) when used at the focal plane of an imaging system, is an array of detection units that provides fast signal acquisitions of a scene by exploiting spatial parallelism. Conventional detection array technologies such as CCD and CMOS image sensors operate only in the direct optical detection mode. To achieve parallel spatial coherent detection, the direct detection array needs to be setup in an interferometric configuration, wherein free-space bulk optics is needed to coherently combine the signal light with the LO on the detection array. Such a configuration however is bulky and gives rise to the issue of the spatial-mode matching of the incoming signal beam with the LO beam that may affect the efficiency of the coherent detection.

A coherent detection array based on photonic integrated circuit (PIC) technology greatly simplifies a coherent imaging system by performing the optical interference on a photonic chip, wherein the signal light and LO light usually manifest as the same waveguide mode, so that the mode-matching issue is resolved naturally. A known form of a PIC-based coherent detection array is the Nanophotonic Coherent Imager (NCI) described by Non-Patent Document [Firooz Aflatouni, Behrooz Abiri, Angad Rekhi, and Ali Hajimiri, "Nanophotonic coherent imager," Optics Express 23, 5117-5125 (2015)]. In the NCI, the coherent detection array is configured such that the optical antenna (grating coupler) of each detection pixel is connected individually with a waveguide to a directional coupler and photodetectors outside the sensing region. The pixel pitches of the NCI increase linearly with the number of pixels to accommodate the space for the routing waveguides, and thus the size of the resultant PIC chip increases quadratically with the number of pixels. Consequently, the described NCI scheme may be limited to a few pixels in the case where size and cost are at a premium.

Additionally, it is desirable for a coherent detection array to operate at a high frame rate for certain coherent sensing applications that benefit from real-time detection. These applications include frequency-modulated continuous-wave (FMCW) light detection and ranging (LIDAR) and optical coherence tomography (OCT). Modern high-pixel-count direct detection arrays achieve high frame rates by incorporating an analog-to-digital circuit (ADC) on every column of the pixel arrays or even at each pixel to enable parallel readouts and conversions. However, these detection arrays still have to transfer the pixel signals row-by-row to the horizontal registers of the column addressing circuit. State-of-the-art CMOS-based direct detection arrays implemented with in situ frame storage are able to operate at very high sampling rates, but the frame storage circuitry substantially constraints the number of pixels in the detection array. Generally, existing designs of either coherent or direct detection arrays and their operations encounter a trade-off between the pixel count and the frame rate.

BRIEF SUMMARY OF THE INVENTION

Embodiments of the present invention describe a coherent detection array implemented on a photonic integrated circuit (PIC) and multiplexing methods for readout of coherent detection signals that leverage the properties of the detection array. The coherent detection array may comprise a plurality of coherent detection units coupling with connecting waveguides and electrical conducting paths, wherein local oscillator (LO) light is introduced into the coherent detection units through the connecting waveguides. The detection units may be configured to include free-space-to-waveguide couplers to receive incident signal light from a medium, including but not limited to free space, into the detection units, optical couplers that mix the signal light with the LO light, and photodetectors that measure the mixed signal-LO light. The electrical conducting paths may manifest as readout channels for multiplexing electrical signals, wherein the readout channels may facilitate stacking of the detection units and scalability of the coherent detection array without the need of complex waveguide routing nor optical switching. The coherent detection array also enables multiplexing methods that may leverage extra degrees of freedom of the coherent detection array. These methods may include those enabled by the local oscillator and those related to the properties and responses of the components of the PIC-based detection array. The scalable design of the coherent detection array together with multiplexing methods applicable to the array may enable the coherent detection array to achieve high pixel-count and high frame-rate operation simultaneously.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features.

FIG. 3 is a modified example of FIG. 2 where one or more electrodes of the photodetectors of the coherent detection units may be connected by electrical conducting paths across different columns instead of across different rows.

FIG. 4 is an embodiment where a single photodetector is employed. FIG. 5 is a modified example of FIG. 4 where one or more waveguides and/or optical couplers may be removed to simplify the detection unit.

FIG. 6 is coherent detection array where the embodiment of FIG. 4 is employed. FIG. 7 is a first modified example of FIG. 6 where one or more electrodes of the photodetectors of the detection units may be connected by electrical conducting paths across different columns instead of across different rows. FIG. 8 is a second modified example of FIG. 6 where the embodiment of FIG. 5 is employed. FIG. 9 is a third modified example of FIG. 6 where the modifications to FIG. 6 according to both FIGS. 7 and 8 are incorporated.

FIG. 10 is an embodiment where the input light may be coupled to the detection unit through a polarized-light separating free-space-to-waveguide coupler and a single photodetector may be employed for the detection of each polarization of light. FIG. 11 is a first modified example of FIG. 10 where a single local oscillator source may be used to interfere with the two polarizations of the input light. FIG. 12 is a second modified example of FIG. 10 where one or more waveguides may be removed to simplify the coherent detection unit. FIG. 13 is a third modified example of FIG. 10 where the modifications to FIG. 10 according to both FIGS. 11 and 12 are incorporated.

FIG. 14 is coherent detection array where the embodiment of FIG. 10 is employed. FIG. 15 is a first modified example of FIG. 14 where one or more electrodes of the photodetectors of the detection units may be connected by electrical conducting paths across different columns instead of across different rows. FIG. 16 is a second modified example of FIG. 14 where the embodiment of FIG. 11 is employed. FIG. 17 is a third modified example of FIG. 14 where the modifications to FIG. 14 according to both FIGS. 15 and 16 are incorporated. FIG. 18 is a fourth modified example of FIG. 14 where the embodiment of FIG. 12 is employed. FIG. 19 is a fifth modified example of FIG. 14 where the modifications to FIG. 14 according to both FIGS. 15 and 18 are incorporated. FIG. 20 is a sixth modified example of FIG. 14 where the embodiment of FIG. 13 is employed. FIG. 21 is a seventh modified example of FIG. 14 where the modifications to FIG. 14 according to both FIGS. 15 and 20 are incorporated.

FIG. 22 is an embodiment where the input light may be coupled to the detection unit through a polarized-light separating free-space-to-waveguide coupler and two photodetectors may be employed for the detection of each polarization of light. FIG. 23 is a modified example of FIG. 22 where a single local oscillator source may be used to interfere with the two polarizations of the input light.

FIG. 24 is coherent detection array where the embodiment of FIG. 22 is employed. FIG. 25 is a first modified example of FIG. 24 where one or more electrodes of the photodetectors of the detection units may be connected by electrical conducting paths across different columns instead of across different rows. FIG. 26 is a second modified example of FIG. 24 where the embodiment of FIG. 23 is employed. FIG. 27 is a third modified example of FIG. 24 where the modifications to FIG. 24 according to both FIGS. 25 and 26 are incorporated.

FIG. 29A is a graph showing an example of the frequency spectrum of the combined photocurrent or signal of connected detection units in a coherent detection array without the use of frequency offsets in the local oscillator. FIG. 29B is a graph showing an example of the frequency spectrum of the combined photocurrent or signal of connected detection units in a coherent detection array with frequency offsets applied in the local oscillator.

FIG. 30A is a graph showing an example of the frequency spectrum of the combined photocurrent or signal of connected detection units in a coherent detection array without the use of modulation on the photodetector responsivity. FIG. 30B is a graph showing an example of the frequency spectrum of the combined photocurrent or signal of connected detection units in a coherent detection array with modulation on the photodetector responsivity. FIG. 30C is a graph showing an example of the frequency spectrum of the combined photocurrent or signal difference of connected detection units in a coherent detection array for the case of a balanced configuration with modulation on the photodetector responsivity.

DETAILED DESCRIPTION OF THE PREFERRED EMBODIMENTS

To achieve a coherent detection array with high pixel counts, it is desirable that the designs of the array pixel elements should allow scalability without extra complexity. In addition, existing designs of a detection array, wherein signal readout schemes exploiting time-division and space-division multiplexing are commonly used, stipulate a trade-off between pixel count and frame rate. Extra degrees of freedom to multiplex the signals may thus be desirable.

The subject technology provides an approach of a coherent detection array that enables high scalability in the number of pixels. It also enables extra degrees of freedom of the array in additional to those in the temporal and spatial domains to be used to multiplex the signal in readout. Here a pixel of the coherent detection array is generally referred to as a coherent detection unit, or simply a detection unit, of the coherent detection array.

To achieve scalability for high-pixel-count designs, the coherent detection array is configured to perform the optical interference and detection at the pixel, i.e., the coherent detection unit. In some aspects, the coherent detection array may be implemented on a photonic chip using the PIC technology wherein each detection unit of the coherent detection array may be configured to include a waveguide to introduce the LO light into the unit, a free-space-to-waveguide coupler to couple the signal light into the PIC chip, an optical coupler to mix the LO and signal light, and on-chip photodetector(s) to measure the mixed light. The detection units may be connected by connecting waveguides and electrical conducting paths to form a coherent detection array to enable signal readout for the detection units by a multiplexing method.

For signal multiplexing, the extra degrees of freedom may be categorized into the optical and electrical domains. They may include those enabled by the local oscillator and those related to the properties and responses of the components of the PIC-based coherent detection array.

Preferred embodiments of the present invention will be described in detail below, with reference to the drawings, to illustrate the designs of coherent detection unit, coherent detection array and multiplexing methods.

Coherent Detection Unit and Coherent Focal Plane Array

First Preferred Embodiment

Figure 1:
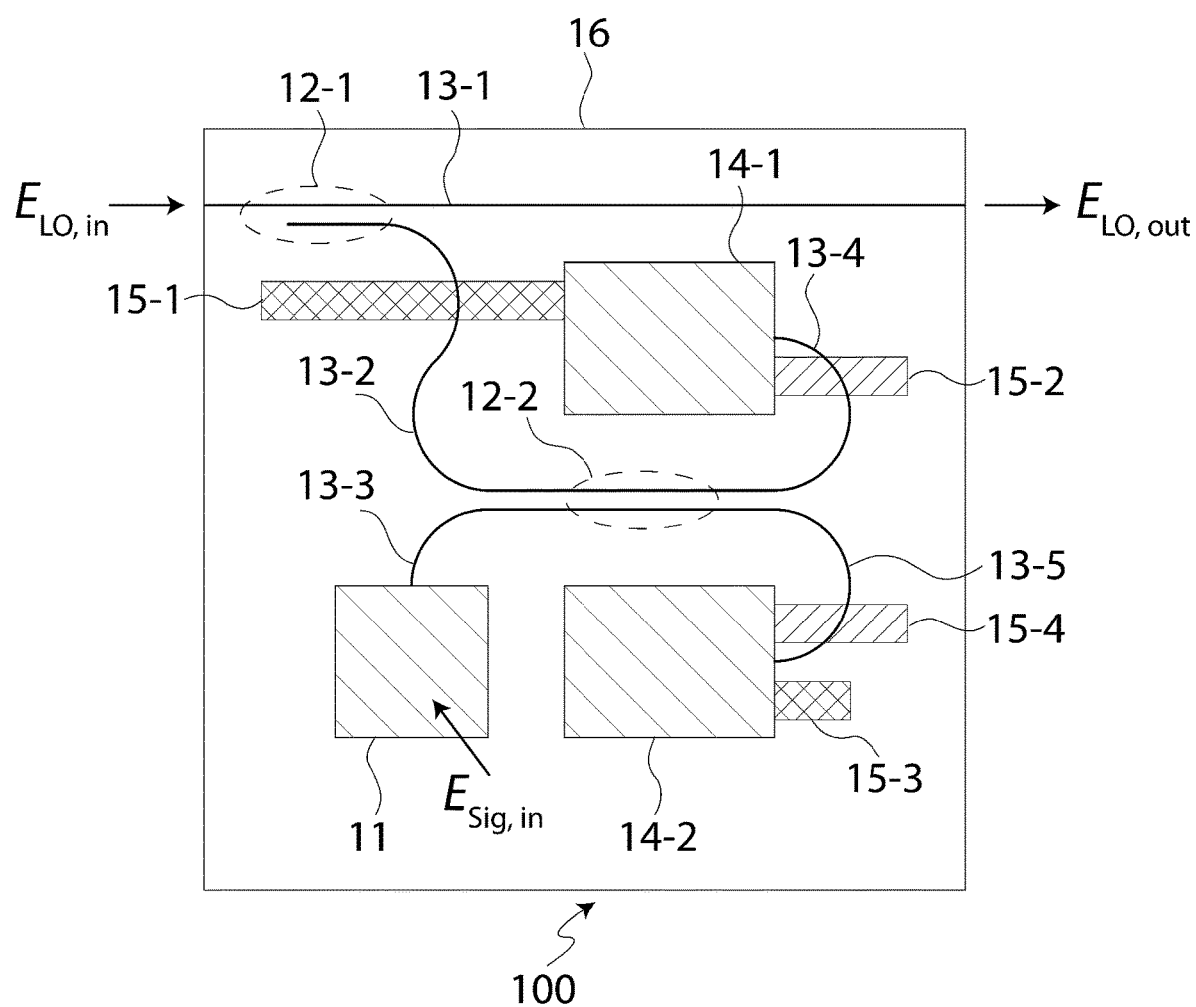
FIG. 1 illustrates an example of a configuration of a coherent detection unit according to a first preferred embodiment of the present invention where two photodetectors are employed.

A coherent detection unit 100 according to the present preferred embodiment will be described with reference to FIG. 1, which illustrates a plan view of the coherent detection unit 100. The coherent detection unit 100 illustrated in FIG. 1 is configured to include a free-space-to-waveguide coupler 11, optical couplers 12-1 and 12-2, waveguides 13-1, 13-2, 13-3, 13-4 and 13-5, photodetectors 14-1 and 14-2, and electrodes 15-1, 15-2, 15-3 and 15-4. The coherent detection unit 100 may also be configured to include additional components, such as one or more modulators and/or heaters, which may be used to modulate or modify the properties of the coherent detection unit. These additional components are not shown in FIG. 1. The coherent detection unit 100 may be integrated on a substrate 16 using optical waveguide technology.

The waveguide 13-1 is an optical waveguide having one end (incoming end) through which the local oscillator light $E_{LO,in}$ may be introduced, and having another end (outgoing end) through which the local oscillator light $E_{LO,out}$ may be transmitted. The optical coupler 12-1 may split a fraction of the local oscillator light $E_{LO,in}$ from the waveguide 13-1 to the waveguide 13-2. The waveguide 13-2 may pass the local oscillator light to the optical coupler 12-2. Examples of the optical coupler 12-1 include, but not limited to, a Y-junction, a directional coupler, and a multi-mode interferometer.

The free-space-to-waveguide coupler 11 is a site where the signal light $E_{Sig,in}$ may be coupled into the coherent detection unit 100. The signal light $E_{Sig,in}$ may be incoming in a direction perpendicular to or at an angle from the plane of the photonic chip on which the free-space-to-waveguide coupler 11 is implemented. The light received by the free-space-to-waveguide coupler 11 may flow through the waveguide 13-3 to the optical coupler 12-2. The free-space-to-waveguide coupler 11 is generally an optical antenna that couples light from free-space or a medium into the photonic chip. Examples of a free-space-to-waveguide coupler include, but not limited to, a grating coupler commonly used in PIC designs, and novel photonic micro/nano-structures.

The optical coupler 12-2 is a coupler comprising the waveguides 13-2 and 13-3 as input ports and the waveguides 13-4 and 13-5 as output ports. The local oscillator light from the input waveguide 13-2 and the signal light from the input waveguide 13-3 may be mixed and interfere at the optical coupler 12-2. The optical coupler 12-2 is constructed in such a manner that the light in the input waveguide 13-2 may be split between the output waveguides 13-4 and 13-5 at some fractions, and similarly the light in the input waveguide 13-3 may also be split between the output waveguides 13-4 and 13-5 at some fractions. The fractions may or may not be fixed, which also may or may not be dependent on the properties (such as, but not limited to, wavelengths) of the light input to the optical coupler, the properties and conditions (such as, but not limited to, temperature) of the optical coupler, and other unspecified factors. Examples of the optical coupler 12-2 include, but not limited to, a directional coupler and a multi-mode interferometer.

In some aspects such as a balanced configuration wherein the optical coupler 12-2 is a 50/50 coupler, the light in the input waveguide 13-2 may be split equally in magnitude between the output waveguides 13-4 and 13-5, and the light in the input waveguide 13-3 may be split equally in magnitude between the output waveguides 13-4 and 13-5.

The photodetector 14-1 detects the light input from the waveguide 13-4. When the light from the waveguide 13-4 is detected by the photodetector 14-1, a photocurrent may be generated and flow in the electrodes 15-1 and 15-2. Similarly, the photodetector 14-2 detects the light input from the waveguide 13-5. When the light from the waveguide 13-5 is detected by the photodetector 14-2, a photocurrent may be generated and flow in the electrodes 15-3 and 15-4. In some aspects, one of the electrodes 15-1 and 15-2 may represent the anode, and the other electrode may represent the cathode. Similarly, one of the electrodes 15-3 and 15-4 may represent the anode, and the other electrode may represent the cathode.

In some aspects, each of the photocurrents generated by the photodetectors 14-1 and 14-2 may include a direct component and a cross component, wherein a noise component may also be present. The direct component is proportional to the average intensities of the signal light and the local oscillator light. The cross component is proportional to the product of the electric fields of the signal light and the local oscillator light, i.e., $\langle E_{LO,in}(t)E_{Sig,in}(t)\rangle$, where t denotes time and $\langle \cdot \rangle$ denotes time averaging over a time duration that may be inversely proportional to the bandwidth of the photodetector. The noise component may be included in the direct component of the photocurrent for simplification of description.

In some aspects, the cross component may exhibit a beating of the signal light with the local oscillator light wherein the beating frequencies equal the sum or the difference of the frequencies of the signal light and the local oscillator light. The sum-beating frequency is usually very high and thus the corresponding photocurrent component may be temporally averaged out or may be suppressed due to the finite response of the photodetector. The difference-beating frequency is usually at an intermediate frequency and the corresponding photocurrent component may be temporally resolved for further processing.

In some aspects such as the case of a balanced configuration with the optical coupler 12-2 being a 50/50 coupler, by taking a difference between the photocurrents by the photodetectors 14-1 and 14-2, the direct components of the photocurrents may be cancelled out except for a possible remnant noise component, whereas the cross components of the photocurrents may add up according to the phase difference between the cross components of the photocurrents by the photodetectors 14-1 and 14-2.

In other aspects, the photocurrents generated by the photodetectors 14-1 and 14-2 may be modulated by modulating the responsivities of the photodetectors.

Second Preferred Embodiment

Two examples of coherent detection arrays 200 and 210 according to the present preferred embodiment will be described with reference to FIGS. 2 and 3.

Figure 2:
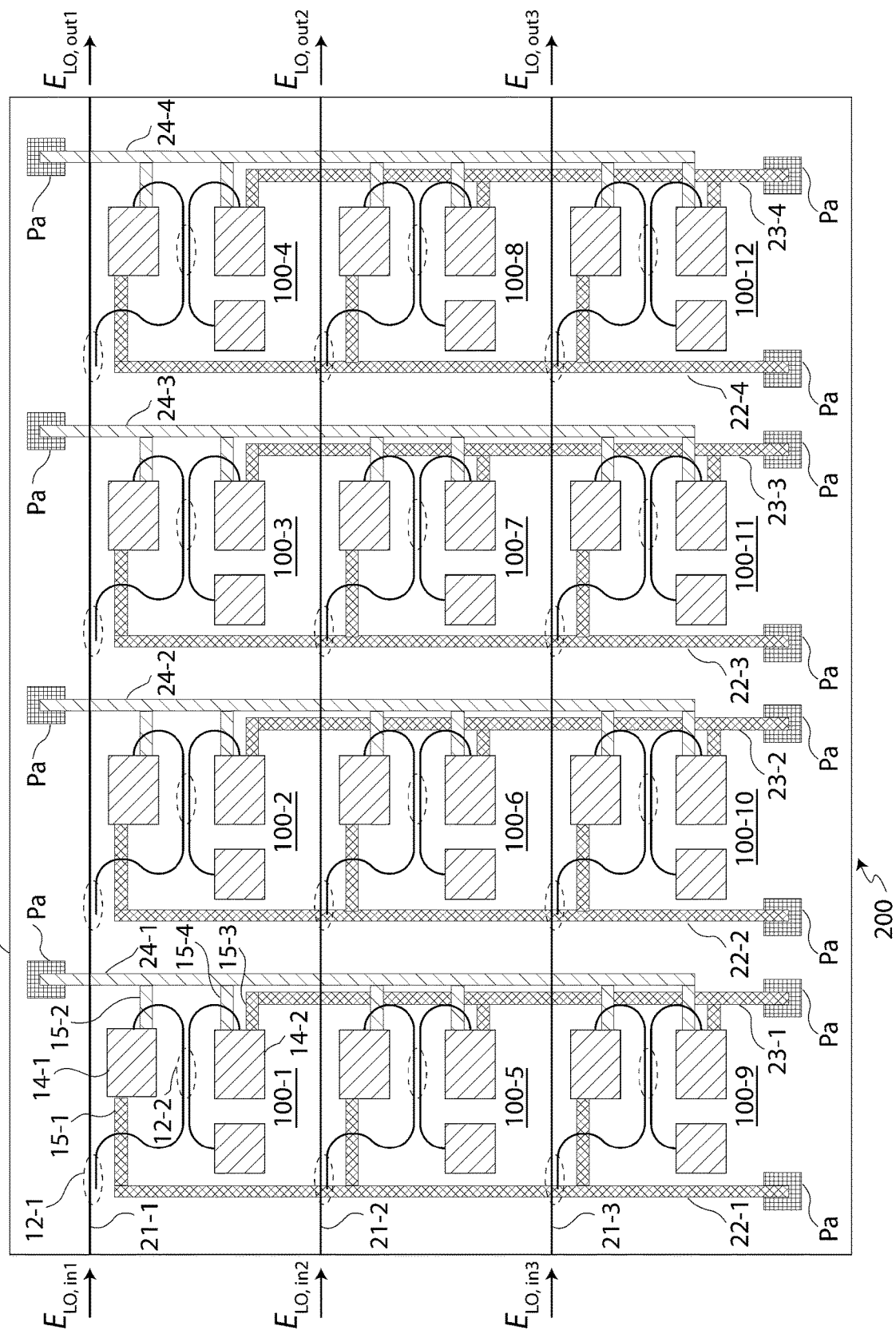
FIGS. 2 and 3 illustrate examples of a configuration of a coherent detection array according to a second preferred embodiment of the present invention where the embodiment of FIG. 1 is employed.

FIG. 2 illustrates a plan view of the coherent detection array 200. The coherent detection array 200 is configured to include plural units of the coherent detection unit 100 according to the embodiment illustrated in FIG. 1. In some aspects, the coherent detection array 200 may include other embodiments of the coherent detection units. In some aspects, the coherent detection array 200 may be constructed by concatenating plural units of the coherent detection unit 100 in a rectilinear configuration. In other aspects, embodiments of the coherent detection array may be constructed by concatenating plural units of the coherent detection unit 100 in geometries other than the rectilinear configuration. The coherent detection array 200 may be integrated on a substrate 26 using optical waveguide technology.

In some aspects of a rectilinear configuration, the coherent detection array may be configured in M rows and N columns with M×N coherent detection units, where M and N are positive integers. As an example, the embodiment of the coherent detection array 200 illustrated in FIG. 2 includes 12 coherent detection units 100-1, 100-2, 100-3, 100-4, 100-5, 100-6, 100-7, 100-8, 100-9, 100-10, 100-11 and 100-12 that are all coherent detection units 100 arranged in the format of 3 rows and 4 columns.

Each row of a coherent detection array 200 may be constructed by concatenating a series of the coherent detection units 100 using the waveguides 13-1 (see FIG. 1). In some aspects, a coherent detection array according to the present preferred embodiment may be constructed in such a manner that the outgoing end of the waveguide 13-1 of a coherent detection unit 100 may be connected to the incoming end of the waveguide 13-1 of the next coherent detection unit 100, so that the transmitted LO light $E_{LO,out}$ of a detection unit may be the incoming LO light $E_{LO,in}$ of the next connected unit. The series of the waveguides 13-1 in a row hence constitute a connecting waveguide of that row, also referred to as a row-encoding waveguide of that row to denote the role of the waveguide. The LO light in a connecting waveguide may be coupled to the connected coherent detection units 100 through the optical couplers 12-1 (see FIGS. 1 and 2). In such configuration, detection units on the same row of the coherent detection array may share the same local oscillator light, with each unit in the row tapping a fraction of the local oscillator light off the connecting waveguide. The fractions of the local oscillator light split off by different coherent detection units on a row may be the same or different.

A connecting waveguide may connect coherent detection units in a single row or coherent detection units in more than one row. A connecting waveguide may not need to connect all coherent detection units in a single row. A row may or may not be straight, depending on the configuration and arrangement of the coherent detection units in the coherent detection array.

Referring to FIG. 2, the row-encoding waveguides 21-1, 21-2, and 21-3 each has one end through which the local oscillator light $E_{LO,in\ m}$, with m=1, 2, 3 correspondingly, may be introduced, and has another end through which the local oscillator light $E_{LO,out\ m}$, with m=1, 2, 3 correspondingly, may be transmitted. For a coherent detection array comprising M rows, the index m ranges from 1 to M. In FIG. 2, the local oscillator light in the row-encoding waveguide 21-1 is coupled to the coherent detection units 100-1, 100-2, 100-3 and 100-4 through the optical couplers 12-1. Similarly, the local oscillator light in the row-encoding waveguide 21-2 is coupled to the coherent detection units 100-5, 100-6, 100-7 and 100-8 through the optical couplers 12-1, and the local oscillator light in the row-encoding waveguide 21-3 is coupled to the coherent detection units 100-9, 100-10, 100-11 and 100-12 through the optical couplers 12-1. The optical couplers 12-1 in the coherent detection units 100-1, 100-2, 100-3, 100-4, 100-5, 100-6, 100-7, 100-8, 100-9, 100-10, 100-11 and 100-12 may split the same or different fractions of light into the units through appropriate designs of the optical couplers 12-1.

The local oscillator light $E_{LO,in\ m}$ with m=1, 2, . . . , M, where M is the number of rows of the coherent detection array with M=3 in the illustration of FIG. 2, may have the same or different optical frequencies, the same or different magnitudes (including zero amplitudes), and the same or different relative phases. The local oscillator light $E_{LO,in\ m}$ may also be applied at the same or different times with the same or different durations. The local oscillator light $E_{LO,in\ m}$ may be introduced into the array of the coherent detection units from the same or different light sources, which may be on-chip light sources, or external light sources off the photonic chip. These light sources may be controlled by some optical switches and network co-located or not co-located with the coherent detection array on the photonic substrate 26. The light sources and the optical switches and network are not shown in FIG. 2.

In some aspects, to form a detection array with multiplexed readouts, plural rows of the coherent detection units may be concatenated in series by electrical conducting paths, also referred to as column-readout wirings, so that the coherent detection units on each column of the detection array may share the same electrical outlets that may be connected to readout circuits located at the peripheral of the coherent detection array. These electrical conducting paths may exhibit as readout channels for multiplexing. An electrical conducting path is also referred to as a wiring in the following for nomenclature simplicity.

An electrical conducting path connecting a plurality of coherent detection units may connect coherent detection units in a single column or coherent detection units in more than one column. An electrical conducting path may not need to connect all coherent detection units in a single column. A column may or may not be straight, depending on the configuration and arrangement of the coherent detection units in the coherent detection array.

In some aspects, a coherent detection array according to the present preferred embodiment illustrated in FIG. 2 may be constructed in such a manner that, for the coherent detection units in each column, the electrodes 15-1 of the photodetectors 14-1 may be connected to a column-readout wiring, the electrodes 15-3 of the photodetectors 14-2 may be connected to a column-readout wiring, and the electrodes 15-2 of the photodetectors 14-1 and the electrodes 15-4 of the photodetectors 14-2 may be connected to a common column-readout wiring. In other aspects, the electrodes 15-2 of the photodetectors 14-1 and the electrodes 15-4 of the photodetectors 14-2 may be connected to separate column-readout wirings instead of a common column-readout wiring. Electrical signals resulting from the detection units connected to the same electrical conducting path are combined (summed or differed, depending on the sign or direction of the signals) and transferred jointly to output terminals that may be connected to peripheral readout circuits. The peripheral readout circuits of the coherent detection array are not shown in FIG. 2.

The embodiment of the coherent detection array 200 in FIG. 2 illustrates a configuration comprising 3 rows with each row including 4 coherent detection units 100, wherein the electrodes of the photodetectors on different rows of the 4 columns are connected by column-readout wirings. For the coherent detection units 100-1, 100-5 and 100-9 in column 1 of the illustration in FIG. 2, the electrodes 15-1 of the photodetectors 14-1 are connected to the column-readout wiring 22-1, the electrodes 15-3 of the photodetectors 14-2 are connected to the column-readout wiring 23-1, and the electrodes 15-2 of the photodetectors 14-1 and the electrodes 15-4 of the photodetectors 14-2 are connected to the column-readout wiring 24-1. The electric current at the output end of the column-readout wiring 22-1 comprises the sum of the photocurrents from the photodetectors 14-1, the electric current at the output end of the column-readout wiring 23-1 comprises the sum of the photocurrents from the photodetectors 14-2, and the electric current at the output end of the column-readout wiring 24-1 comprises the sum or difference of the photocurrents from the photodetectors 14-1 and 14-2, depending on the directions of the photocurrents.

Similarly, for the coherent detection units 100-2, 100-6 and 100-10 in column 2, the electrodes 15-1 of the photodetectors 14-1 are connected to the column-readout wiring 22-2, the electrodes 15-3 of the photodetectors 14-2 are connected to the column-readout wiring 23-2, and the electrodes 15-2 of the photodetectors 14-1 and the electrodes 15-4 of the photodetectors 14-2 are connected to the column-readout wiring 24-2. The electric current at the output end of the column-readout wiring 22-2 comprises the sum of the photocurrents from the photodetectors 14-1, the electric current at the output end of the column-readout wiring 23-2 comprises the sum of the photocurrents from the photodetectors 14-2, and the electric current at the output end of the column-readout wiring 24-2 comprises the sum or difference of the photocurrents from the photodetectors 14-1 and 14-2, depending on the directions of the photocurrents.

Similarly, for the coherent detection units 100-3, 100-7 and 100-11 in column 3, the electrodes 15-1 of the photodetectors 14-1 are connected to the column-readout wiring 22-3, the electrodes 15-3 of the photodetectors 14-2 are connected to the column-readout wiring 23-3, and the electrodes 15-2 of the photodetectors 14-1 and the electrodes 15-4 of the photodetectors 14-2 are connected to the column-readout wiring 24-3. The electric current at the output end of the column-readout wiring 22-3 comprises the sum of the photocurrents from the photodetectors 14-1, the electric current at the output end of the column-readout wiring 23-3 comprises the sum of the photocurrents from the photodetectors 14-2, and the electric current at the output end of the column-readout wiring 24-3 comprises the sum or difference of the photocurrents from the photodetectors 14-1 and 14-2, depending on the directions of the photocurrents.

Similarly, for the coherent detection units 100-4, 100-8 and 100-12 in column 4, the electrodes 15-1 of the photodetectors 14-1 are connected to the column-readout wiring 22-4, the electrodes 15-3 of the photodetectors 14-2 are connected to the column-readout wiring 23-4, and the electrodes 15-2 of the photodetectors 14-1 and the electrodes 15-4 of the photodetectors 14-2 are connected to the column-readout wiring 24-4. The electric current at the output end of the column-readout wiring 22-4 comprises the sum of the photocurrents from the photodetectors 14-1, the electric current at the output end of the column-readout wiring 23-4 comprises the sum of the photocurrents from the photodetectors 14-2, and the electric current at the output end of the column-readout wiring 24-4 comprises the sum or difference of the photocurrents from the photodetectors 14-1 and 14-2, depending on the directions of the photocurrents.

In FIG. 2, the pads Pa are output terminals of the column-readout wirings that may be connected to peripheral readout circuits.

In FIG. 2, the coherent detection units of the coherent detection array may be viewed as being grouped by electrical conducting paths, i.e., column-readout wirings, into 4 distinct subsets (columns) wherein each coherent detection unit of the array is included in a single subset as grouped by electrical conducting paths. Alternatively, the coherent detection units of the coherent detection array may also be viewed as being grouped by connecting waveguides, i.e., row-encoding waveguides, into 3 distinct subsets (rows) wherein each coherent detection unit is included in a single subset as grouped by connecting waveguides. Each coherent detection unit of the coherent detection array may be specified by a row-encoding waveguide and a column-readout wiring.

Modified Example of Second Preferred Embodiment

Figure 3:
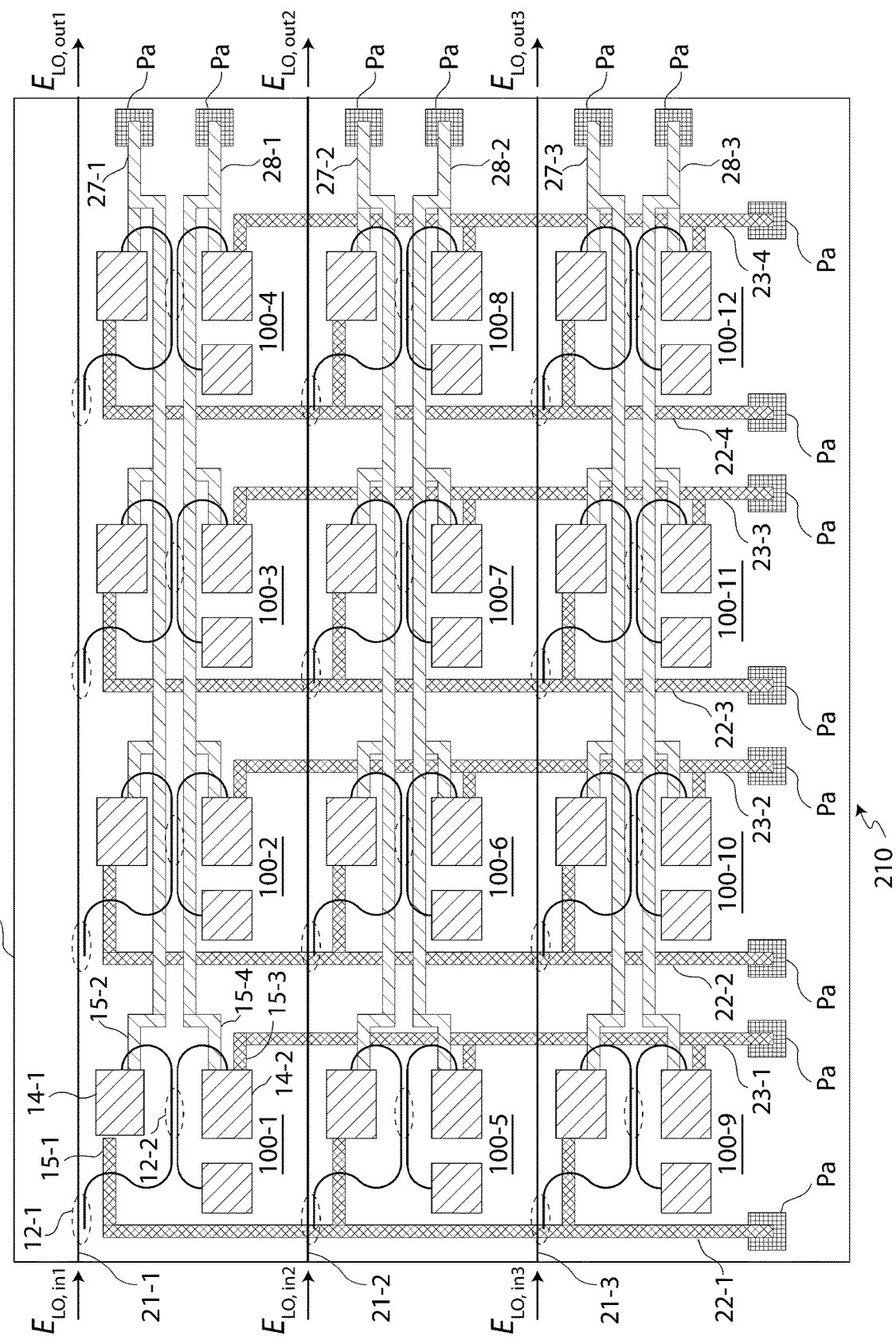

FIG. 3 illustrates a plan view of the coherent detection array 210. The coherent detection array 210 is a modified example of the coherent detection array 200 according to the embodiment illustrated in FIG. 2. Similar to the coherent detection array 200, the coherent detection array 210 may be configured to include plural units of the coherent detection unit 100 according to the embodiment illustrated in FIG. 1. Each row of a coherent detection array 210 may be constructed by concatenating a series of the coherent detection units 100 using the waveguides 13-1 (see FIG. 1). Plural rows of the coherent detection units 100 may be concatenated in series by electrical conducting paths to form a detection array. As an example, the embodiment of the coherent detection array 210 illustrated in FIG. 3 includes 12 coherent detection units 100-1, 100-2, 100-3, 100-4, 100-5, 100-6, 100-7, 100-8, 100-9, 100-10, 100-11 and 100-12 that are all coherent detection units 100 arranged in the format of 3 rows and 4 columns.

Similar to the coherent detection array 200, the coherent detection array 210 according to the present preferred embodiment may be configured in such a manner that, for the coherent detection units in each column, either the electrodes 15-1 or the electrodes 15-2 of the photodetectors 14-1 may be connected to a column-readout wiring, and similarly either the electrodes 15-3 or the electrodes 15-4 of the photodetectors 14-2 may be connected to a column-readout wiring.

Different from the coherent detection array 200, the coherent detection array 210 according to the present preferred embodiment may be configured in such a manner that the other electrodes of the photodetectors of the coherent detection units may be connected across different columns by electrical conducting paths, also referred to as row-encoding wirings, instead of across different rows by column-readout wirings. In some aspects, for the coherent detection units in each row of the coherent detection array 210, either the electrodes 15-1 or the electrodes 15-2 of the photodetectors 14-1 may be connected to a row-encoding wiring, and similarly either the electrodes 15-3 or the electrodes 15-4 of the photodetectors 14-2 may be connected to a row-encoding wiring. In other aspects, the two row-encoding wirings may be combined into a common wiring instead of separate wirings. The row-encoding wirings may be exploited to multiplex the signals of the coherent detection array with a role similar to or different from that of the row-encoding waveguides of the detection array.

Referring to the coherent detection array 210 illustrated in FIG. 3. On one hand, for the coherent detection units 100-1, 100-5 and 100-9 in column 1, the electrodes 15-1 of the photodetectors 14-1 are connected to the column-readout wiring 22-1 and the electrodes 15-3 of the photodetectors 14-2 are connected to the column-readout wiring 23-1.

Similarly, for the coherent detection units 100-2, 100-6 and 100-10 in column 2, the electrodes 15-1 of the photodetectors 14-1 are connected to the column-readout wiring 22-2 and the electrodes 15-3 of the photodetectors 14-2 are connected to the column-readout wiring 23-2.

Similarly, for the coherent detection units 100-3, 100-7 and 100-11 in column 3, the electrodes 15-1 of the photodetectors 14-1 are connected to the column-readout wiring 22-3 and the electrodes 15-3 of the photodetectors 14-2 are connected to the column-readout wiring 23-3.

Similarly, for the coherent detection units 100-4, 100-8 and 100-12 in column 4, the electrodes 15-1 of the photodetectors 14-1 are connected to the column-readout wiring 22-4 and the electrodes 15-3 of the photodetectors 14-2 are connected to the column-readout wiring 23-4.

On the other hand, for the coherent detection units 100-1, 100-2, 100-3 and 100-4 in row 1 of the coherent detection array 210, the electrodes 15-2 of the photodetectors 14-1 are connected to the row-encoding wiring 27-1 and the electrodes 15-4 of the photodetectors 14-2 are connected to the row-encoding wiring 28-1.

Similarly, for the coherent detection units 100-5, 100-6, 100-7 and 100-8 in row 2, the electrodes 15-2 of the photodetectors 14-1 are connected to the row-encoding wiring 27-2 and the electrodes 15-4 of the photodetectors 14-2 are connected to the row-encoding wiring 28-2.

Similarly, for the coherent detection units 100-9, 100-10, 100-11 and 100-12 in row 3, the electrodes 15-2 of the photodetectors 14-1 are connected to the row-encoding wiring 27-3 and the electrodes 15-4 of the photodetectors 14-2 are connected to the row-encoding wiring 28-3.

The pads Pa in FIG. 3 are terminals of the column-readout wirings and the row-encoding wirings that may be connected to peripheral electrical circuits In FIG. 3, the coherent detection units of the coherent detection array may be viewed as being grouped by some electrical conducting paths, i.e., column-readout wirings, into 4 distinct subsets (columns) and by other electrical conducting paths, i.e., row-encoding wirings, into 3 distinct subsets (rows), wherein each coherent detection unit of the array is included in two subsets (1 column and 1 row) as grouped by the electrical conducting paths. Each coherent detection unit of the coherent detection array may be specified by a row-encoding wiring and a column readout wiring. Alternatively, the coherent detection units of the coherent detection array may also be viewed as being grouped by connecting waveguides, i.e., row-encoding waveguides, into 3 distinct subsets (rows) wherein each coherent detection unit is included in a single subset as grouped by the connecting waveguides. Each coherent detection unit of the coherent detection array may be specified by a row-encoding waveguide and a column readout wiring.

Third Preferred Embodiment

Two examples of coherent detection units 300 and 310 according to the present preferred embodiment will be described with reference to FIGS. 4 and 5.

Figure 4:
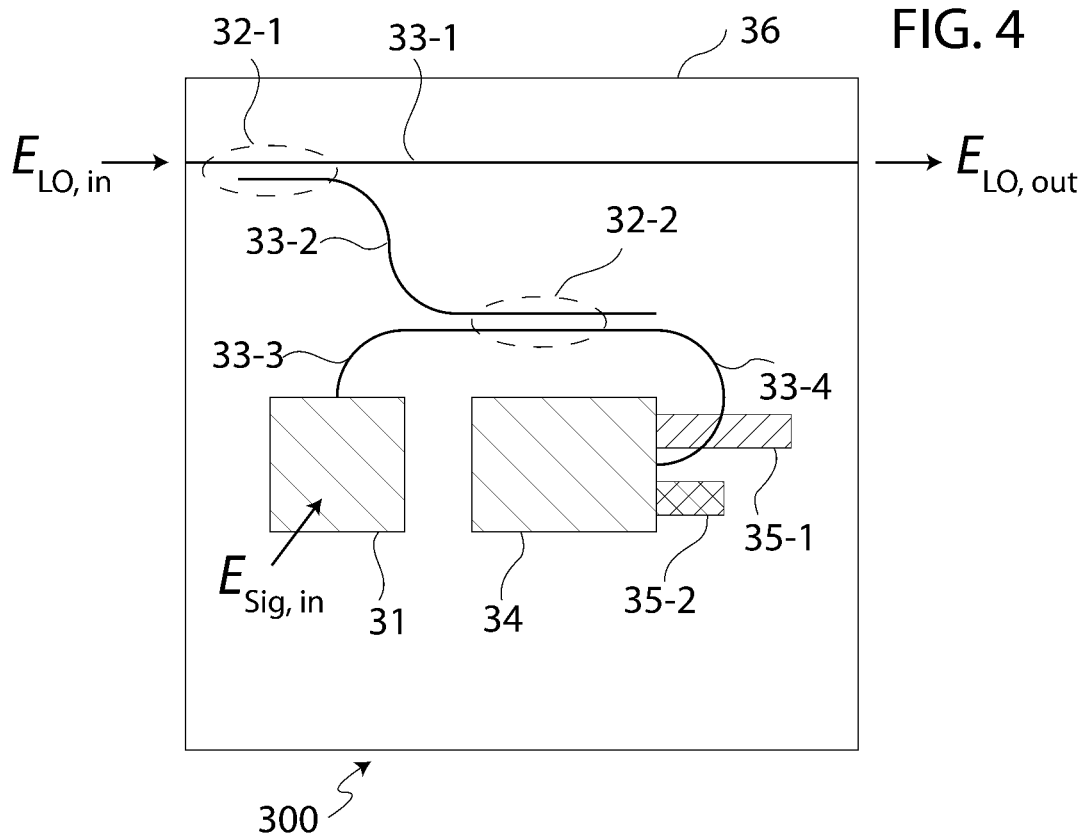
FIGS. 4 and 5 illustrate examples of another configuration of a coherent detection unit according to a third preferred embodiment of the present invention.

FIG. 4 illustrates a plan view of the coherent detection unit 300. The coherent detection unit 300 illustrated in FIG. 4 is configured to include a free-space-to-waveguide coupler 31, optical couplers 32-1 and 32-2, waveguides 33-1, 33-2, 33-3 and 33-4, a photodetector 34, and electrodes 35-1 and 35-2. The coherent detection unit 300 may also be configured to include additional components, such as one or more modulators and/or heaters, which may be used to modulate or modify the properties of the coherent detection unit. These additional components are not shown in FIG. 4. The coherent detection unit 300 may be integrated on a substrate 36 using optical waveguide technology.

The coherent detection unit 300 is a modified version of the coherent detection unit 100 illustrated in FIG. 1. The coherent detection unit 300 may be understood with reference to the coherent detection unit 100 according to the embodiment illustrated in FIG. 1, in conjunction with the following descriptions.

An essential difference between the two embodiments of the coherent detection unit illustrated in FIG. 1 and FIG. 4 is the use of one photodetector 34 in the coherent detection unit 300 instead of two photodetectors 14-1 and 14-2 in the coherent detection unit 100. In addition, the optical coupler 32-2 in the coherent detection unit 300 is a coupler comprising the waveguides 33-2 and 33-3 as input ports and the waveguide 33-4 as an output port. The optical coupler 32-2 may be realized by a 2×2 directional coupler with a free output port appropriately terminated, a Y-junction, or any other form that mixes light with at least two inputs ports and one output port.

In some aspects, the photocurrent generated by the photodetector 34 may include a direct component that is slowly varying in time and a cross component that is rapidly varying in time, wherein a noise component may also be present. With only one photodetector used in the coherent detection unit 300, the photocurrent generated by the photodetector 34 may need to be filtered by an appropriate filter to suppress the direct component of the photocurrent. The filter may be installed at the detection unit or not at the detection unit. The filter is not shown in FIG. 4.

Modified Example of Third Preferred Embodiment

Figure 5:
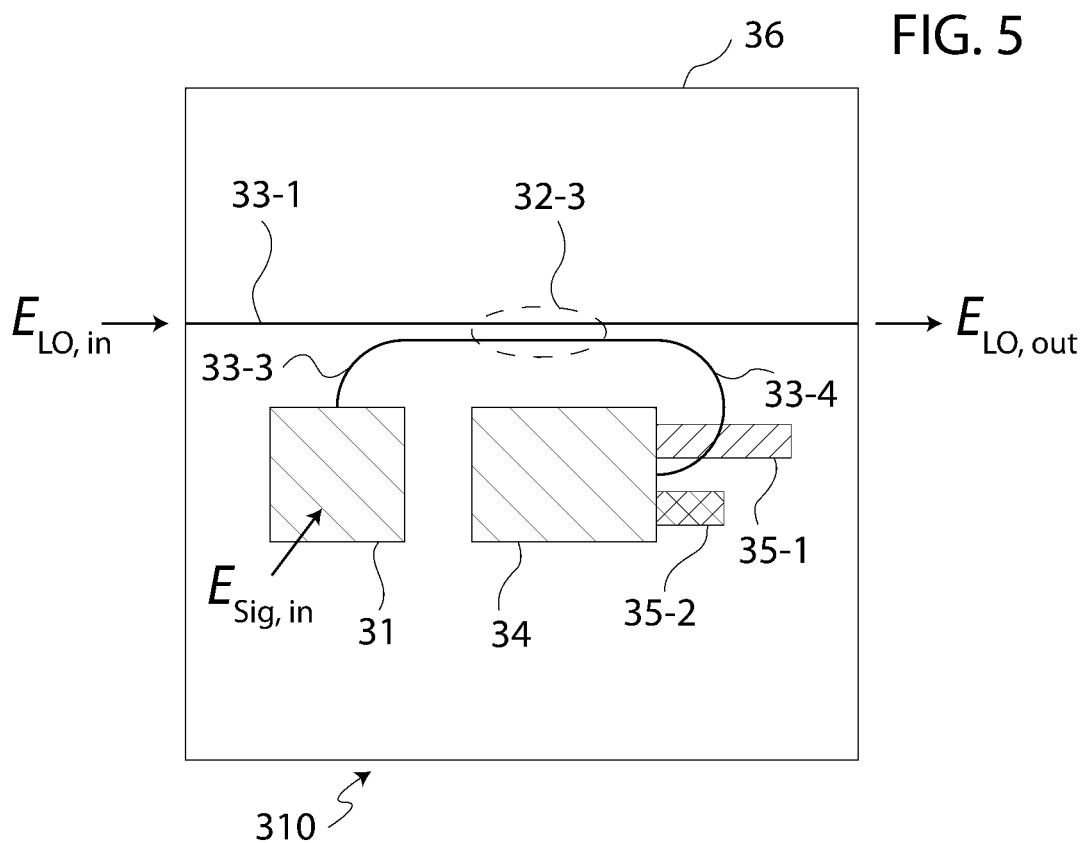

FIG. 5 illustrates a plan view of the coherent detection unit 310. The coherent detection unit 310 illustrated in FIG. 5 is a modified example of the coherent detection unit 300 according to the embodiment illustrated in FIG. 4.

The coherent detection unit 310 illustrated in FIG. 5 is similar to the coherent detection unit 300 illustrated in FIG. 4 with an essential difference of the removal of the waveguide 33-2 and the combining of the optical couplers 32-1 and 32-2 into a single optical coupler 32-3 for simplification. The optical coupler 32-3 of the coherent detection 310 in FIG. 5 plays the roles of both the optical couplers 32-1 and 32-2 of the coherent detection unit 300 in FIG. 4. For the coherent detection unit 310, the optical coupler 32-3 may directly mix the local oscillator light in the waveguide 33-1 with the signal light in the waveguide 33-3. The mixed light may be transferred to the waveguide 33-4 and the outgoing segment of the waveguide 33-1.

In some aspects, the optical coupler 32-3 of the coherent detection unit 310 may be constructed in such a manner that it may transfer a majority fraction of the signal light from the waveguide 33-3 to the waveguide 33-4, and transfer a minority fraction of the signal light from the waveguide 33-3 to the outgoing segment of the waveguide 33-1. An example of the light splitting ratio of the optical coupler 32-3 is 999:1.

Fourth Preferred Embodiment

Four examples of coherent detection arrays 400, 410, 420 and 430 according to the present preferred embodiment will be described with reference to FIGS. 6, 7, 8, and 9.

Figure 6:
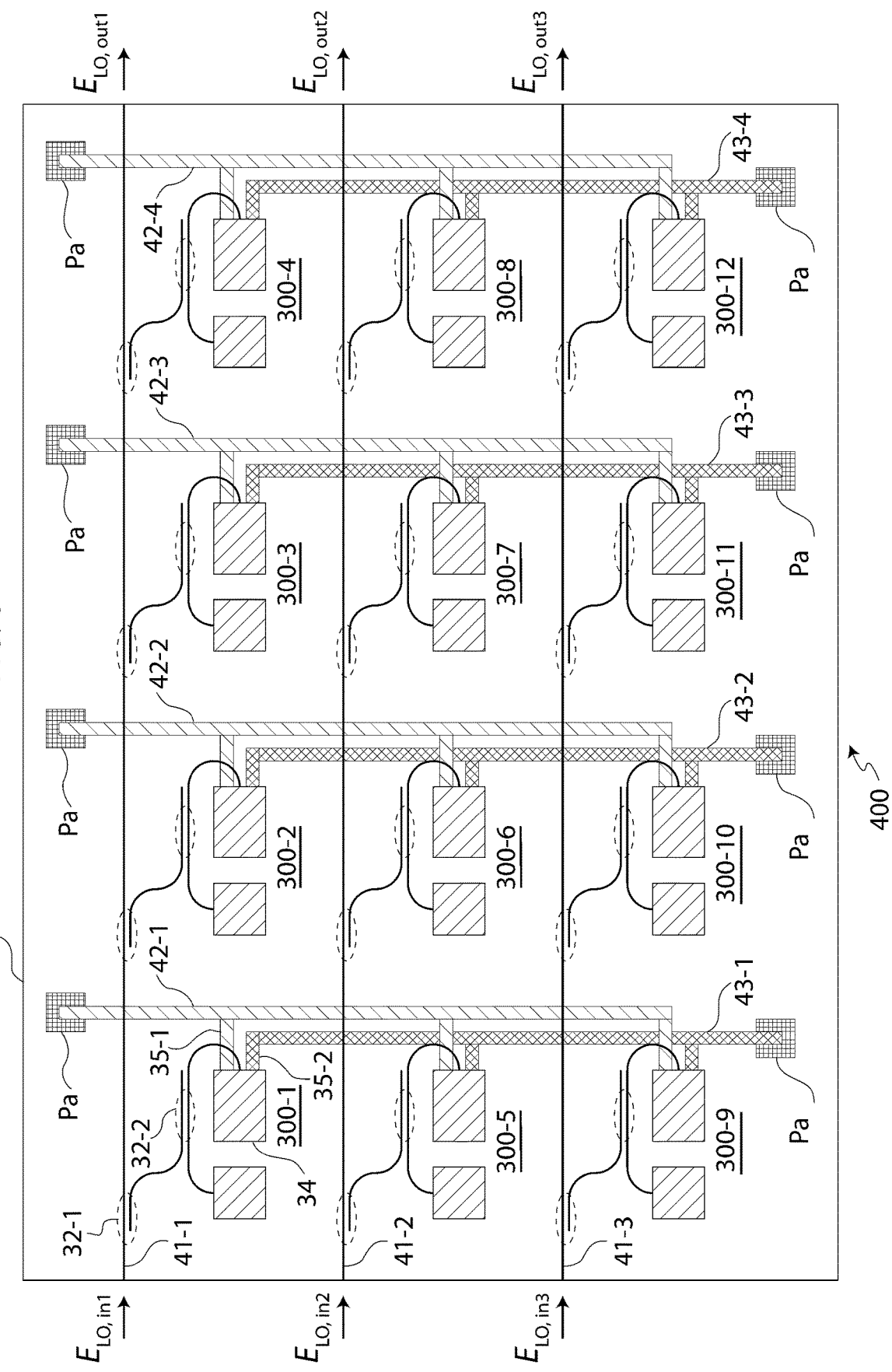
FIGS. 6, 7, 8 and 9 illustrate examples of a configuration of a coherent detection array according to a fourth preferred embodiment of the present invention where a single photodetector at each detection unit may be employed.

FIG. 6 illustrates a plan view of the coherent detection array 400. The coherent detection array 400 is configured to include plural units of the coherent detection unit 300 according to the embodiment illustrated in FIG. 4. In some aspects, the coherent detection array 400 may include other embodiments of the coherent detection units. In some aspects, the coherent detection array 400 may be constructed by concatenating plural units of the coherent detection unit 300 in a rectilinear configuration. In other aspects, embodiments of the coherent detection array may be constructed by concatenating plural units of the coherent detection unit 300 in geometries other than the rectilinear configuration. The coherent detection array 400 may be integrated on a substrate 46 using optical waveguide technology.

The coherent detection array 400 illustrated in FIG. 6 is similar to the coherent detection array 200 illustrated in FIG. 2 with an essential difference of employing the coherent detection unit 300 according to the embodiment illustrated in FIG. 4 as a building block of the detection array, instead of the coherent detection unit 100 used in the coherent detection array 200. In some aspects of a rectilinear configuration, the coherent detection array may be configured in M rows and N columns with M×N coherent detection units. As an example, the embodiment of the coherent detection array 400 illustrated in FIG. 6 includes 12 coherent detection units 300-1, 300-2, 300-3, 300-4, 300-5, 300-6, 300-7, 300-8, 300-9, 300-10, 300-11 and 300-12 that are all coherent detection units 300 arranged in the format of 3 rows and 4 columns.

The coherent detection array 400 may be understood with reference to the coherent detection array 200 according to the embodiment illustrated in FIG. 2, in conjunction with the following descriptions.

Each row of a coherent detection array 400 may be constructed by concatenating a series of the coherent detection units 300 using the waveguides 33-1 (see FIG. 4). In some aspects, a coherent detection array according to the present preferred embodiment may be constructed in such a manner that the outgoing end of the waveguide 33-1 of a coherent detection unit 300 may be connected to the incoming end of the waveguide 33-1 of the next coherent detection unit 300, so that the transmitted LO light $E_{LO,out}$ of a detection unit may be the incoming LO light $E_{LO,in}$ of the next connected unit. The series of the waveguides 33-1 in a row constitute a connecting waveguide of that row, also referred to as a row-encoding waveguide of that row. The LO light in a connecting waveguide may be coupled to the connected coherent detection units 300 through the optical couplers 32-1 (see FIGS. 4 and 6).

For the coherent detection array 400 illustrated in FIG. 6, the row-encoding waveguides are the waveguides 41-1, 41-2 and 41-3. The LO light in the row-encoding waveguide 41-1 is coupled to the coherent detection units 300-1, 300-2, 300-3 and 300-4 through the optical couplers 32-1. Similarly, the LO light in the row-encoding waveguide 41-2 is coupled to the coherent detection units 300-5, 300-6, 300-7 and 300-8 through the optical couplers 32-1, and the LO light in the row-encoding waveguide 41-3 is coupled to the coherent detection units 300-9, 300-10, 300-11 and 300-12 through the optical couplers 32-1. The optical couplers 32-1 in the coherent detection units 300-1, 300-2, 300-3, 300-4, 300-5, 300-6, 300-7, 300-8, 300-9, 300-10, 300-11 and 300-12 may split the same or different fractions of light into the units through appropriate designs of the optical couplers 32-1.

Plural rows of the coherent detection units may be concatenated in series by electrical conducting paths, also referred to as column-readout wirings. The coherent detection units connected by each column-readout wiring may share the same electrical outlets that may be connected to readout circuits located at the peripheral of the coherent detection array. In some aspects, a coherent detection array according to the present preferred embodiment may be constructed in such a manner that, for the coherent detection units in each column, the electrodes 35-1 of the photodetectors 34 may be connected to a column-readout wiring, and similarly the electrodes 35-2 of the photodetectors 34 may be connected to a column-readout wiring.

For the coherent detection units 300-1, 300-5 and 300-9 in column 1 of the illustration in FIG. 6, the electrodes 35-1 of the photodetectors 34 are connected to the column-readout wiring 42-1 and the electrodes 35-2 of the photodetectors 34 are connected to the column-readout wiring 43-1. Similarly, for the coherent detection units 300-2, 300-6 and 300-10 in column 2, the electrodes 35-1 of the photodetectors 34 are connected to the column-readout wiring 42-2 and the electrodes 35-2 of the photodetectors 34 are connected to the column-readout wiring 43-2. Similarly, for the coherent detection units 300-3, 300-7 and 300-11 in column 3, the electrodes 35-1 of the photodetectors 34 are connected to the column-readout wiring 42-3 and the electrodes 35-2 of the photodetectors 34 are connected to the column-readout wiring 43-3. Similarly, for the coherent detection units 300-4, 300-8 and 300-12 in column 4, the electrodes 35-1 of the photodetectors 34 are connected to the column-readout wiring 42-4 and the electrodes 35-2 of the photodetectors 34 are connected to the column-readout wiring 43-4.

Similar to FIG. 2, the pads Pa in FIG. 6 are output terminals of the column-readout wirings that may be connected to peripheral readout circuits.

First Modified Example of Fourth Preferred Embodiment

Figure 7:
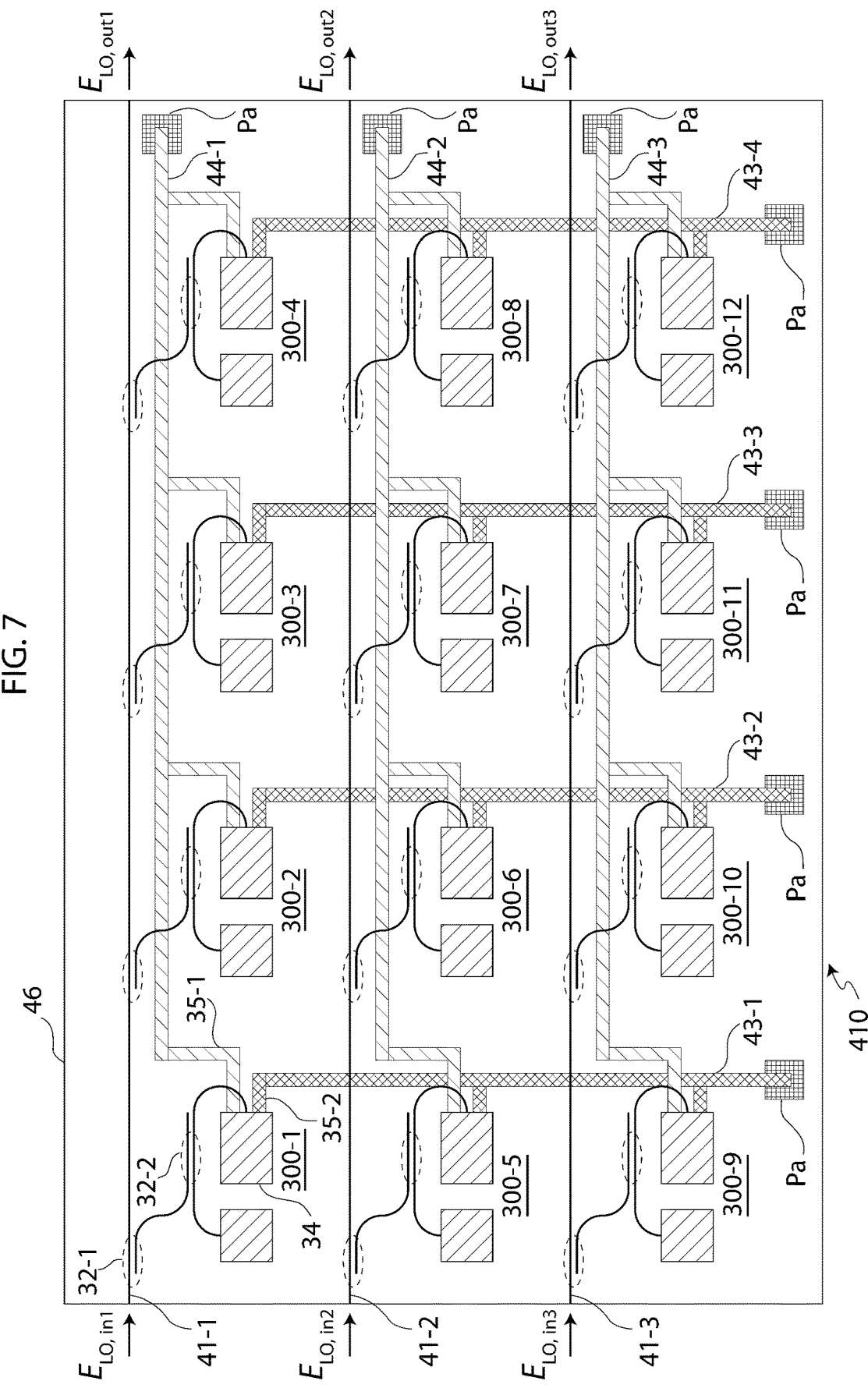

FIG. 7 illustrates a plan view of the coherent detection array 410. The coherent detection array 410 is a modified example of the coherent detection array 400 according to the embodiment illustrated in FIG. 6. Similar to the coherent detection array 400, the coherent detection array 410 may be configured to include plural units of the coherent detection unit 300 according to the embodiment illustrated in FIG. 4. Each row of a coherent detection array 410 may be constructed by concatenating a series of the coherent detection units 300 using the waveguides 33-1 (see FIG. 4). Plural rows of the coherent detection units 300 may be concatenated in series by electrical conducting paths to form a detection array. As an example, the embodiment of the coherent detection array 410 illustrated in FIG. 7 includes 12 coherent detection units 300-1, 300-2, 300-3, 300-4, 300-5, 300-6, 300-7, 300-8, 300-9, 300-10, 300-11 and 300-12 that are all coherent detection units 300 arranged in the format of 3 rows and 4 columns.

Similar to the coherent detection array 400, the coherent detection array 410 according to the present preferred embodiment may be configured in such a manner that, for the coherent detection units in each column, either the electrodes 35-1 or the electrodes 35-2 of the photodetectors 34 may be connected to a column-readout wiring.

Different from the coherent detection array 400, the coherent detection array 410 according to the present preferred embodiment may be configured in such a manner that the other electrodes of the photodetectors of the coherent detection units may be connected across different columns by electrical conducting paths, also referred to as row-encoding wirings, instead of across different rows by column-readout wirings. For the coherent detection units 300 in each row of the coherent detection array 410, either the electrodes 35-1 or the electrodes 35-2 of the photodetectors 34 may be connected to a row-encoding wiring.

Referring to the coherent detection array 410 illustrated in FIG. 7. On one hand, the electrodes 35-2 of the photodetectors 34 of the coherent detection units 300-1, 300-5 and 300-9 in column 1 are connected to the column-readout wiring 43-1. Similarly, the electrodes 35-2 of the photodetectors 34 of the coherent detection units 300-2, 300-6 and 300-10 in column 2 are connected to the column-readout wiring 43-2, the electrodes 35-2 of the photodetectors 34 of the coherent detection units 300-3, 300-7 and 300-11 in column 3 are connected to the column-readout wiring 43-3, and the electrodes 35-2 of the photodetectors 34 of the coherent detection units 300-4, 300-8 and 300-12 in column 4 are connected to the column-readout wiring 43-4.

On the other hand, the electrodes 35-1 of the photodetectors 34 of the coherent detection units 300-1, 300-2, 300-3 and 300-4 in row 1 are connected to the row-encoding wiring 44-1. Similarly, the electrodes 35-1 of the photodetectors 34 of the coherent detection units 300-5, 300-6, 300-7 and 300-8 in row 2 are connected to the row-encoding wiring 44-2, and the electrodes 35-1 of the photodetectors 34 of the coherent detection units 300-9, 300-10, 300-11 and 300-12 in row 3 are connected to the row-encoding wiring 44-3.

Figure 8:
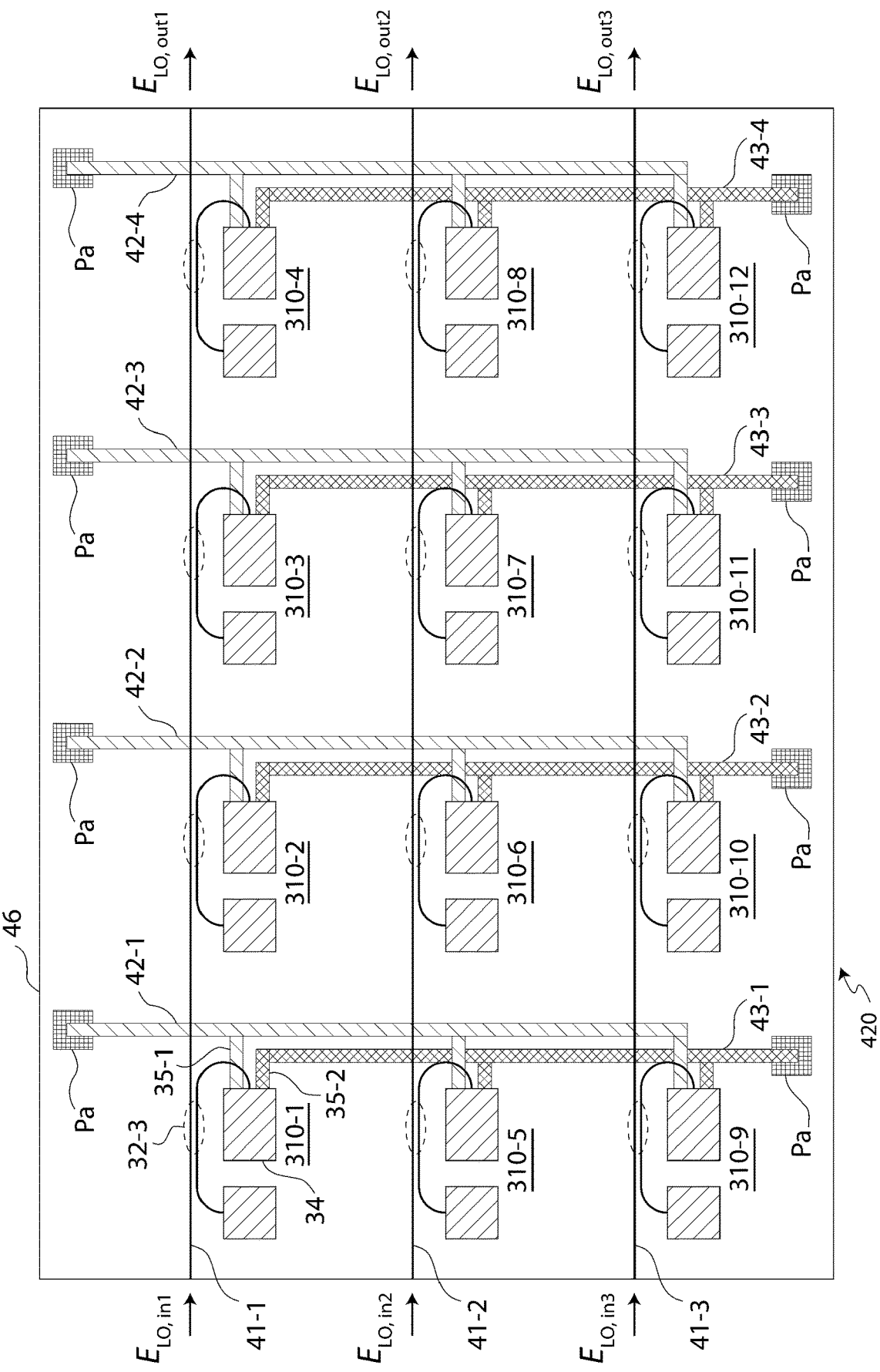

The pads Pa in FIG. 7 are terminals of the column-readout wirings and the row-encoding wirings that may be connected to peripheral electrical circuits Second Modified Example of Fourth Preferred Embodiment FIG. 8 illustrates a plan view of the coherent detection array 420. The coherent detection array 420 is another modified example of the coherent detection array 400 according to the embodiment illustrated in FIG. 6.

The coherent detection array 420 illustrated in FIG. 8 is similar to the coherent detection array 400 illustrated in FIG. 6 with an essential difference of employing the coherent detection unit 310 according to the embodiment illustrated in FIG. 5 as a building block of the detection array, instead of the coherent detection unit 300 used in the coherent detection array 400. In some aspects of a rectilinear configuration, the coherent detection array may be configured in M rows and N columns with M×N coherent detection units. As an example, the embodiment of the coherent detection array 420 illustrated in FIG. 8 includes 12 coherent detection units 310-1, 310-2, 310-3, 310-4, 310-5, 310-6, 310-7, 310-8, 310-9, 310-10, 310-11 and 310-12 that are all coherent detection units 310 arranged in the format of 3 rows and 4 columns.

Third Modified Example of Fourth Preferred Embodiment

Figure 9:
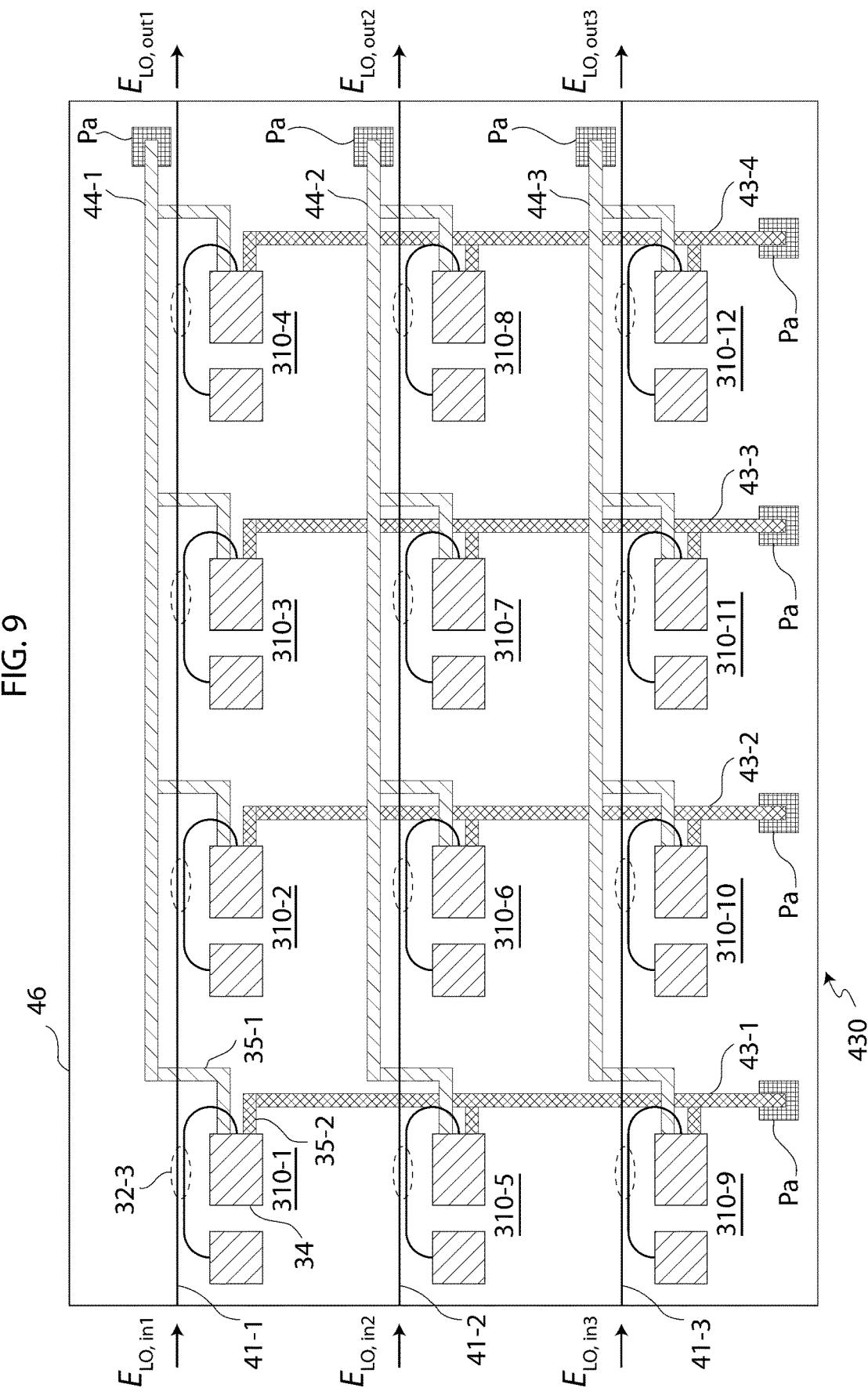

FIG. 9 illustrates a plan view of the coherent detection array 430. The coherent detection array 430 is another modified example of the coherent detection array 400 according to the embodiment illustrated in FIG. 6.

The coherent detection array 430 combines the modifications made to the coherent detection array 400 according to the coherent detection array 410 in FIG. 7 and the coherent detection array 420 in FIG. 8. The coherent detection array 430 may be understood with reference to the coherent detection arrays 410 and 420 according to the embodiments illustrated in FIGS. 7 and 8, in conjunction with the following descriptions.

On one hand, similar to the coherent detection array 420, the coherent detection array 430 employs the coherent detection unit 310 according to the embodiment illustrated in FIG. 5 as a building block of the detection array, instead of the coherent detection unit 300 used in the coherent detection arrays 400 and 410. On the other hand, similar to the coherent detection array 410, the coherent detection array 430 may be configured in such a manner that either the electrodes 35-1 or the electrodes 35-2 of the photodetectors 34 of the coherent detection units 310 in each column of the detection array may be connected to a column-readout wiring across the rows of that column, while the other electrodes of the photodetectors 34 of the coherent detection units 310 in each row of the detection array may be connected to a row-encoding wiring across the columns of that row.

Referring to the coherent detection array 430 illustrated in FIG. 9. On one hand, the electrodes 35-2 of the photodetectors 34 of the coherent detection units 310-1, 310-5 and 310-9 in column 1 are connected to the column-readout wiring 43-1. Similarly, the electrodes 35-2 of the photodetectors 34 of the coherent detection units 310-2, 310-6 and 310-10 in column 2 are connected to the column-readout wiring 43-2, the electrodes 35-2 of the photodetectors 34 of the coherent detection units 310-3, 310-7 and 310-11 in column 3 are connected to the column-readout wiring 43-3, and the electrodes 35-2 of the photodetectors 34 of the coherent detection units 310-4, 310-8 and 310-12 in column 4 are connected to the column-readout wiring 43-4.

On the other hand, the electrodes 35-1 of the photodetectors 34 of the coherent detection units 310-1, 310-2, 310-3 and 310-4 in row 1 are connected to the row-encoding wiring 44-1. Similarly, the electrodes 35-1 of the photodetectors 34 of the coherent detection units 310-5, 310-6, 310-7 and 310-8 in row 2 are connected to the row-encoding wiring 44-2, and the electrodes 35-1 of the photodetectors 34 of the coherent detection units 310-9, 310-10, 310-11 and 310-12 in row 3 are connected to the row-encoding wiring 44-3.

Fifth Preferred Embodiment

Four examples of coherent detection units 500, 510, 520 and 530 according to the present preferred embodiment will be described with reference to FIGS. 10, 11, 12, and 13.

Figure 10:
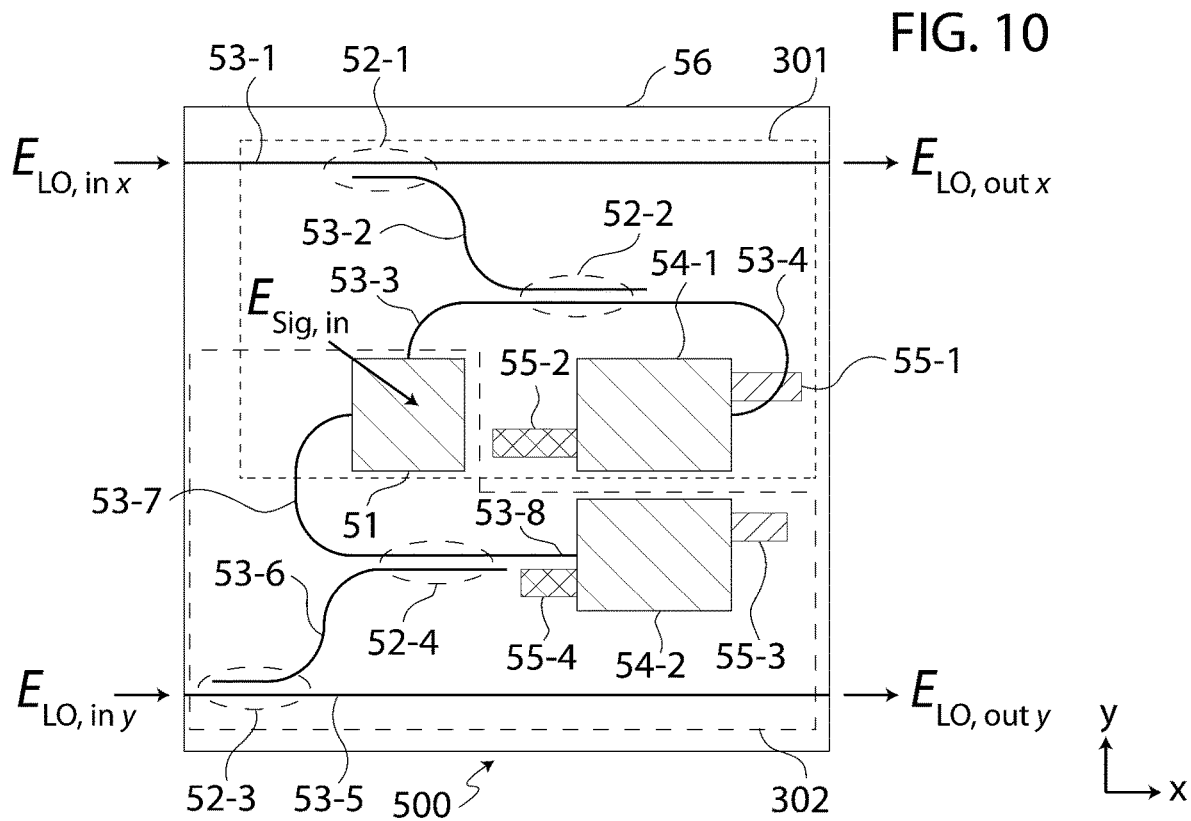
FIGS. 10, 11, 12 and 13 illustrate examples of a configuration of a coherent detection unit according to a fifth preferred embodiment of the present invention where the two polarizations of the input light may be detected at the detection unit separately.

FIG. 10 illustrates a plan view of the coherent detection unit 500. The coherent detection unit 500 illustrated in FIG. 10 is configured to include a polarized-light separating free-space-to-waveguide coupler 51, optical couplers 52-1, 52-2, 52-3 and 52-4, waveguides 53-1, 53-2, 53-3, 53-4, 53-5, 53-6, 53-7 and 53-8, photodetectors 54-1 and 54-2, and electrodes 55-1, 55-2, 55-3 and 55-4. The coherent detection unit 500 may also be configured to include additional components, such as one or more modulators and/or heaters, which may be used to modulate or modify the properties of the coherent detection unit. These additional components are not shown in FIG. 10. The coherent detection unit 500 may be integrated on a substrate 56 using optical waveguide technology.

The coherent detection unit 500 is a modified version of the coherent detection unit 300 illustrated in FIG. 4. The coherent detection unit 500 is configured to detect incoming signal light, which may be multiplexed with polarizations in the x and y directions, wherein the x and y directions are an example of an orthogonal basis of light polarization defined by the design of the polarized-light separating free-space-to-waveguide coupler 51, in such a way that the two polarization components may be measured separately. The coherent detection unit 500 may be understood with reference to the coherent detection unit 300 according to the embodiment illustrated in FIG. 4, in conjunction with the following descriptions.

The coherent detection unit 500 is constructed by combining coherent detection sub-units 301 and 302 (see FIG. 10), each of which is similar to the coherent detection unit 300, with a polarized-light separating free-space-to-waveguide coupler 51 replacing the free-space-to-waveguide coupler 31 of the coherent detection unit 300. The coherent detection sub-unit 301 is configured to include the polarized-light separating free-space-to-waveguide coupler 51, the optical couplers 52-1 and 52-2, the waveguides 53-1, 53-2, 53-3 and 53-4, the photodetector 54-1, and the electrodes 55-1 and 55-2. The coherent detection sub-unit 302 is configured to include the same polarized-light separating free-space-to-waveguide coupler 51, the optical couplers 52-3 and 52-4, the waveguides 53-5, 53-6, 53-7 and 53-8, the photodetector 54-2, and the electrodes 55-3 and 55-4. In such configuration, the polarized-light separating free-space-to-waveguide coupler 51 is a common component of the two coherent detection sub-units 301 and 302.

In FIG. 10, the waveguide 53-1 has one end through which the local oscillator light $E_{LO,in\ x}$ may be introduced and the other end through which the local oscillator light $E_{LO,out\ x}$ may be transmitted, and the waveguide 53-5 has one end through which the local oscillator light $E_{LO,in\ y}$ may be introduced and the other end through which the local oscillator light $E_{LO,out\ y}$ may be transmitted. In some aspects, $E_{LO,in\ x}$ and $E_{LO,in\ y}$ (and correspondingly $E_{LO,out\ x}$ and $E_{LO,out\ y}$) may manifest in the waveguides 53-1 and 53-5 as the same waveguide mode, i.e., the fundamental TE mode as commonly considered in photonics integrated circuits for optimal propagation and coupling efficiencies. In other aspects, $E_{LO,in\ x}$ may be the same as or different from $E_{LO,in\ y}$ in terms of properties such as amplitude, frequency and phase.

The coherent detection unit 500 uses the polarized-light separating free-space-to-waveguide coupler 51 to receive the signal light $E_{Sig,in}$ that may comprise multiplexed x-polarized light and y-polarized light. The signal light $E_{Sig,in}$ may be received and separated into x-polarized light and y-polarized light by the polarized-light separating free-space-to-waveguide coupler 51. On one hand, the x-polarized light may be carried into the coherent detection sub-unit 301 through the waveguide 53-3 and may result in a photocurrent in the electrodes 55-1 and 55-2 when detected by the photodetector 54-1. On the other hand, the y-polarized light may be carried into the coherent detection sub-unit 302 through the waveguide 53-7 and may result in a photocurrent in the electrodes 55-3 and 55-4 when detected by the photodetector 54-2.

In some aspects, the photocurrent generated by each of the photodetectors 54-1 and 54-2 may include a direct component that is slowly varying in time and a cross component that is rapidly varying in time, wherein a noise component may also be present. With one photodetector per polarization used in the coherent detection unit 500, the photocurrents generated by the photodetectors 54-1 and 54-2 may need to be filtered by appropriate filters to suppress the direct components of the photocurrents. The filters may be installed at the detection unit or not at the detection unit. The filters are not shown in FIG. 10.

First Modified Example of Fifth Preferred Embodiment

Figure 11:
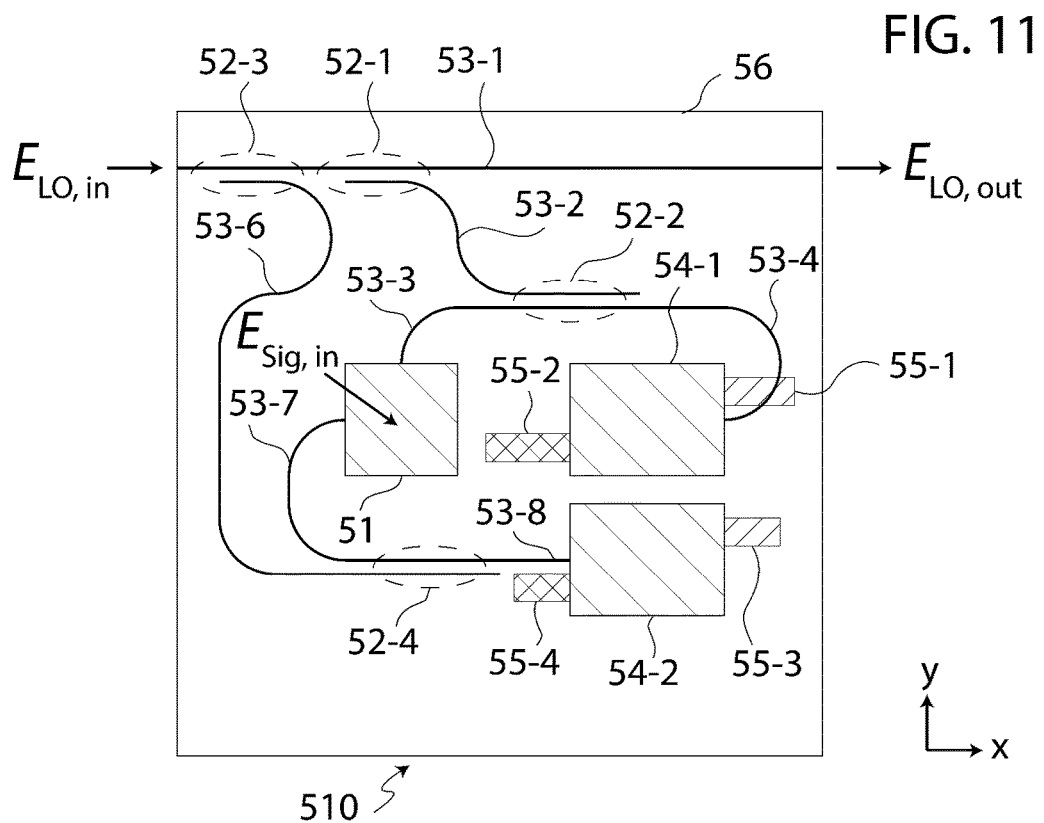

FIG. 11 illustrates a plan view of the coherent detection unit 510. The coherent detection unit 510 illustrated in FIG. 11 is a modified example of the coherent detection unit 500 according to the embodiment illustrated in FIG. 10.

The coherent detection unit 510 in FIG. 11 is similar to the coherent detection unit 500 in FIG. 10 with an essential difference of moving the optical coupler 52-3 to the waveguide 53-1 to couple the same local oscillator light from the waveguide 53-1 to the waveguide 53-6 as the local oscillator light to the waveguide 53-2. In this way, the x-polarized and y-polarized components of the signal light coupled into the detection unit 510 may be mixed with the same local oscillator light $E_{LO,in}$. The waveguide 53-5 may be removed accordingly.

Second Modified Example of Fifth Preferred Embodiment

Figure 12:
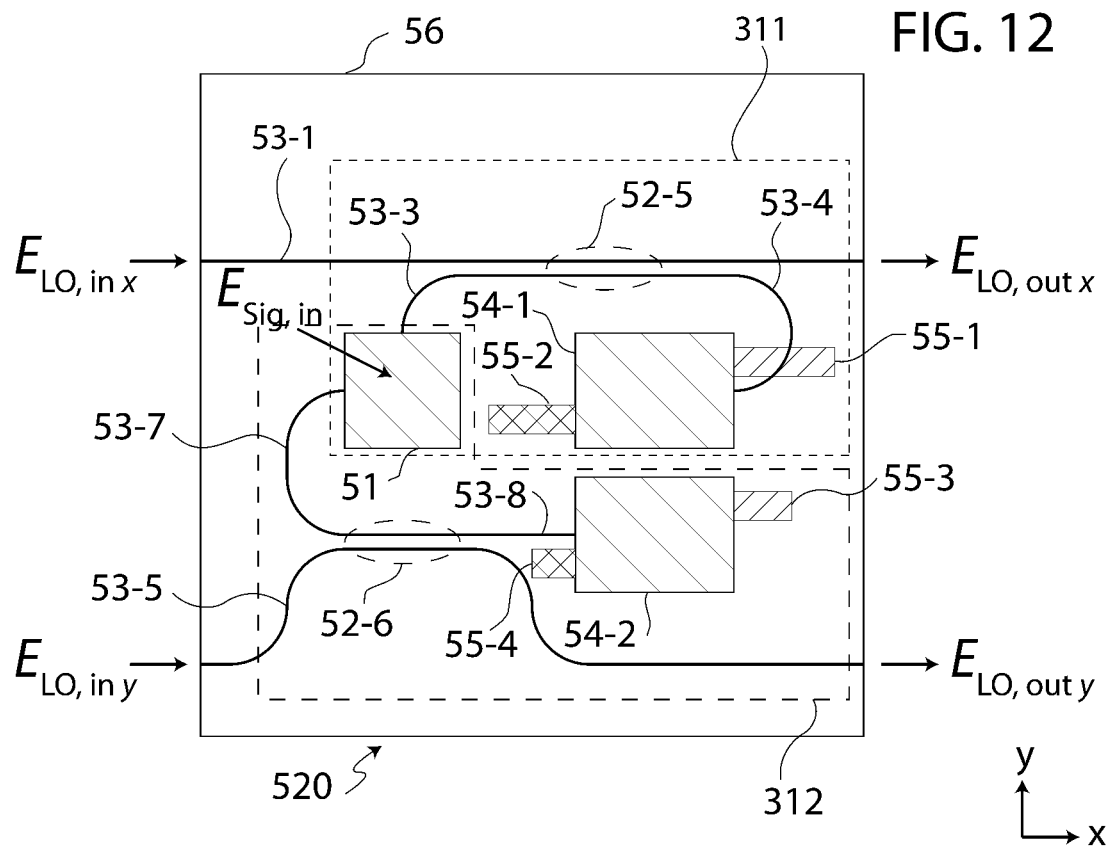

FIG. 12 illustrates a plan view of the coherent detection unit 520. The coherent detection unit 520 illustrated in FIG. 12 is another modified example of the coherent detection unit 500 according to the embodiment illustrated in FIG. 10.

The coherent detection unit 520 illustrated in FIG. 12 is similar to the coherent detection unit 500 illustrated in FIG. 10 wherein the coherent detection unit 520 is constructed by combining coherent detection sub-units 311 and 312, which are similar to the coherent detection sub-units 301 and 302 in FIG. 10 with essential differences of the removals of the waveguides 53-2 and 53-6, and the combining of the optical couplers 52-1 and 52-2 into an optical coupler 52-5 and the combining of the optical couplers 52-3 and 52-4 into an optical coupler 52-6 for simplification.

The optical coupler 52-5 of the coherent detection unit 520 in FIG. 12 plays the roles of both the optical couplers 52-1 and 52-2 of the coherent detection unit 500 in FIG. 10, and similarly the optical coupler 52-6 of the coherent detection unit 520 plays the roles of both the optical couplers 52-3 and 52-4 of the coherent detection unit 500. For the coherent detection unit 520, the optical coupler 52-5 may directly mix the local oscillator light in the waveguide 53-1 with the signal light in the waveguide 53-3. The mixed light may be transferred to the waveguide 53-4 and the outgoing segment of the waveguide 53-1. Similarly, the optical coupler 52-6 may directly mix the local oscillator light in the waveguide 53-5 with the signal light in the waveguide 53-7. The mixed light may be transferred to the waveguide 53-8 and the outgoing segment of the waveguide 53-5.

In some aspects, the optical coupler 52-5 of the coherent detection unit 520 may be constructed in such a manner that it may transfer a majority fraction of the signal light from the waveguide 53-3 to the waveguide 53-4, and transfer a minority fraction of the signal light from the waveguide 53-3 to the outgoing segment of the waveguide 53-1. Similarly, the optical coupler 52-6 of the coherent detection unit 520 may be constructed in such a manner that it may transfer a majority fraction of the signal light from the waveguide 53-7 to the waveguide 53-8, and transfer a minority fraction of the signal light from the waveguide 53-7 to the outgoing segment of the waveguide 53-5. An example of the light splitting ratio for the optical couplers 52-5 and 52-6 is 999:1.

Third Modified Example of Fifth Preferred Embodiment

Figure 13:
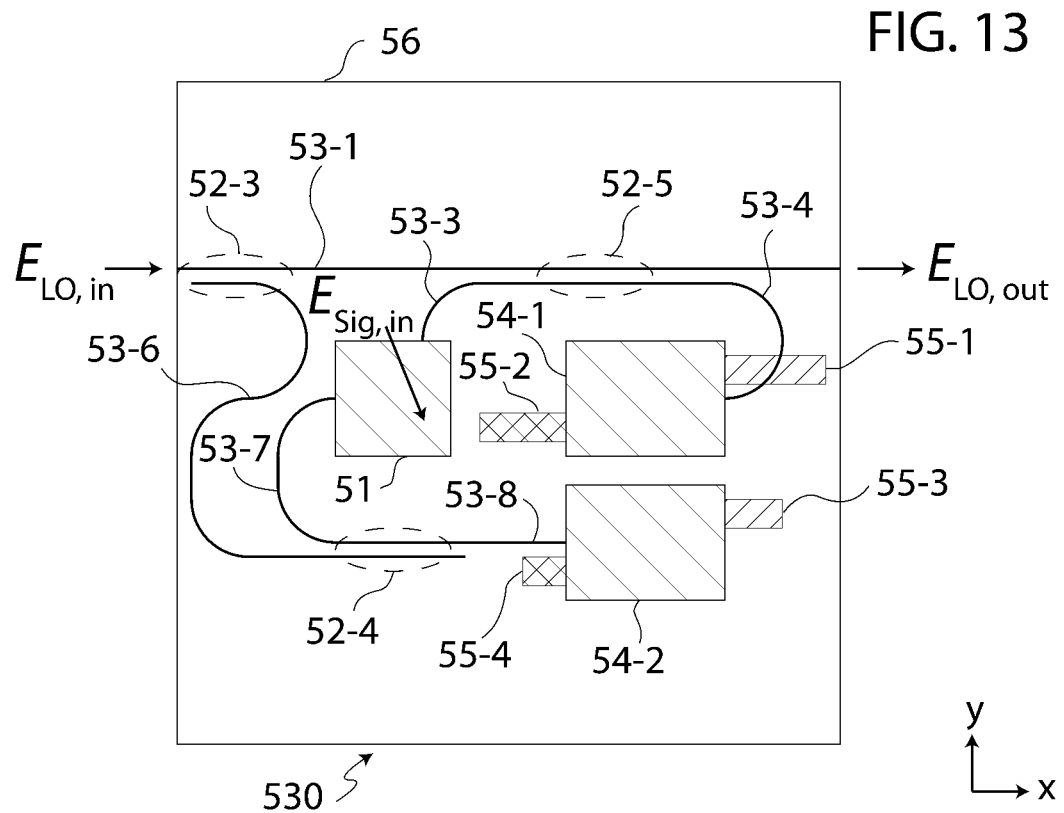

FIG. 13 illustrates a plan view of the coherent detection unit 530. The coherent detection unit 530 illustrated in FIG. 13 is another modified example of the coherent detection unit 500 according to the embodiment illustrated in FIG. 10.

The coherent detection unit 530 combines the modifications made to the coherent detection unit 500 according to the coherent detection unit 510 in FIG. 11 and the coherent detection unit 520 in FIG. 12. The coherent detection unit 530 may be understood with reference to the coherent detection units 510 and 520 according to the embodiments illustrated in FIGS. 11 and 12, in conjunction with the following descriptions.

On one hand, similar to the coherent detection unit 520, the coherent detection unit 530 has the optical couplers 52-1 and 52-2 combined into a single optical coupler 52-5 and the waveguide 53-2 removed from the coherent detection unit 500 (see FIG. 10) for simplification. On the other hand, similar to the coherent detection unit 510, the coherent detection unit 530 has the optical coupler 52-3 moved to the waveguide 53-1 to couple the same local oscillator light from the waveguide 53-1 to the waveguide 53-6 as the local oscillator light to the waveguide 53-4. In this way, the x-polarized and y-polarized components of the signal light coupled into the detection unit 530 may be mixed with the same local oscillator light $E_{LO,in}$. The waveguide 53-5 may be removed accordingly.

Sixth Preferred Embodiment

Eight examples of coherent detection arrays 600, 610, 620, 630, 640, 650, 660 and 670 according to the present preferred embodiment will be described with reference to FIGS. 14, 15, 16, 17, 18, 19, 20 and 21.

Figure 14:
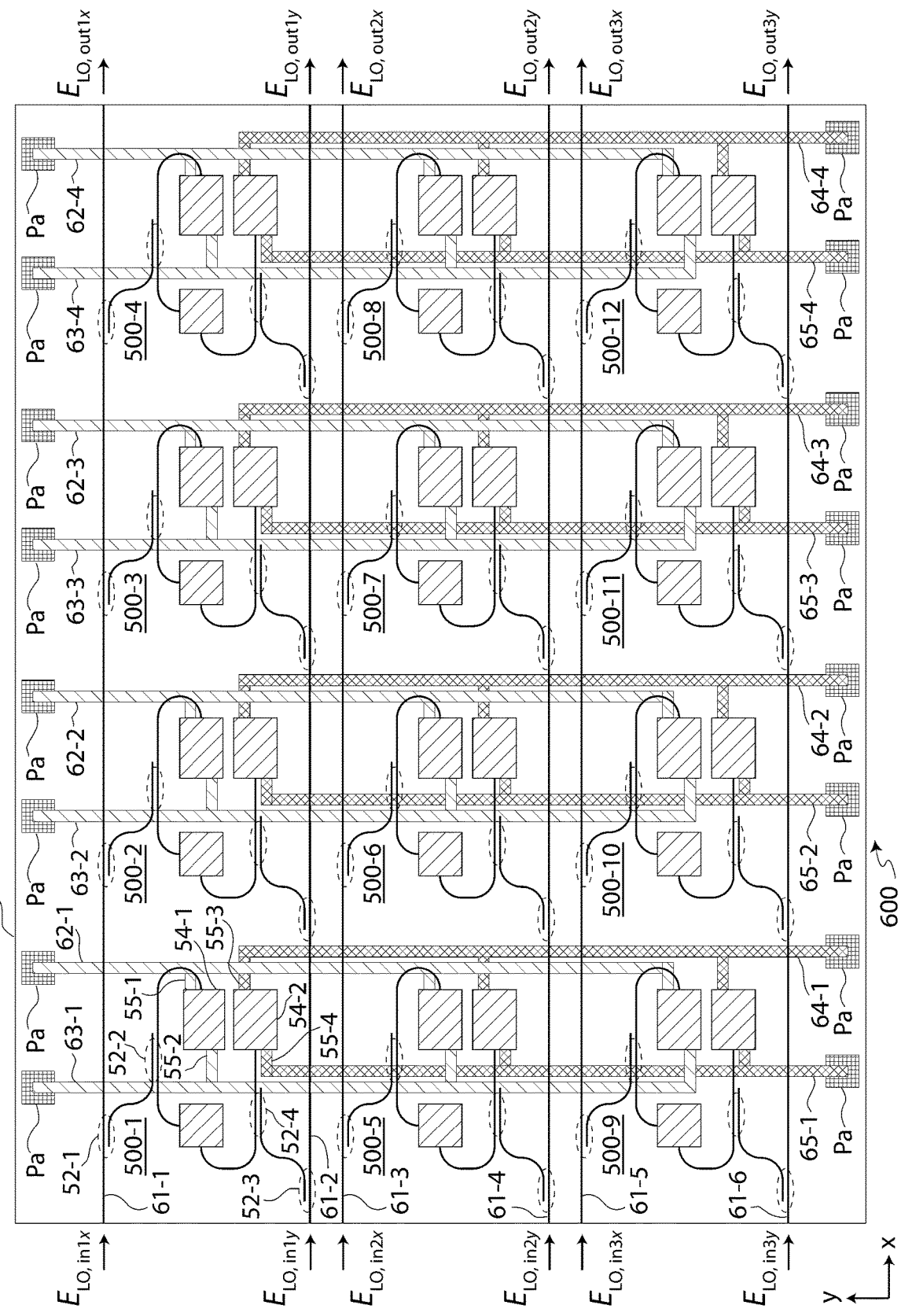
FIGS. 14, 15, 16, 17, 18, 19, 20 and 21 illustrate examples of a configuration of a coherent detection array according to a sixth preferred embodiment of the present invention where the two polarizations of the input light may be detected at the detection units of the array separately.

FIG. 14 illustrates a plan view of the coherent detection array 600. The coherent detection array 600 is configured to include plural units of the coherent detection unit 500 according to the embodiment illustrated in FIG. 10. In some aspects, the coherent detection array 600 may include other embodiments of the coherent detection units. In some aspects, the coherent detection array 600 may be constructed by concatenating plural units of the coherent detection unit 500 in a rectilinear configuration. In other aspects, embodiments of the coherent detection array may be constructed by concatenating plural units of the coherent detection unit 500 in geometries other than the rectilinear configuration. The coherent detection array 600 may be integrated on a substrate 66 using optical waveguide technology.

The coherent detection array 600 illustrated in FIG. 14 is similar to the coherent detection array 200 illustrated in FIG. 2 with an essential difference of employing the coherent detection unit 500 according to the embodiment illustrated in FIG. 10 as a building block of the detection array, instead of the coherent detection unit 100 used in the coherent detection array 200. In some aspects of a rectilinear configuration, the coherent detection array may be configured in M rows and N columns with M×N coherent detection units. As an example, the embodiment of the coherent detection array 600 illustrated in FIG. 14 includes 12 coherent detection units 500-1, 500-2, 500-3, 500-4, 500-5, 500-6, 500-7, 500-8, 500-9, 500-10, 500-11 and 500-12 that are all coherent detection units 500 arranged in the format of 3 rows and 4 columns.

The coherent detection array 600 may be understood with reference to the coherent detection array 200 according to the embodiment illustrated in FIG. 2, in conjunction with the following descriptions.

In some aspects with the coherent detection units 500 configured to detect incoming signal light that may be multiplexed with polarizations in the x and y directions, each row of a coherent detection array 600 may be configured to comprise a row-encoding waveguide for the x-polarized light and a row-encoding waveguide for the y-polarized light, with separate LO light introduced to each row-encoding waveguide. The series of the waveguides 53-1 and 53-5 in a row of connected coherent detection units 500 in the coherent detection array 600 constitute row-encoding waveguides of that row (see FIGS. 10 and 14). The LO light in the row-encoding waveguide for the x polarization may be coupled to the connected coherent detection units 500 through the optical couplers 52-1, and the LO light in the row-encoding waveguide for the y polarization may be coupled to the connected coherent detection units 500 through the optical couplers 52-3 (see FIGS. 10 and 14).

The electric fields of the LO light introduced to the row-encoding waveguides of the coherent detection array are $E_{LO,in\ m\ x}$ and $E_{LO,in\ m\ y}$ with m=1, 2, . . . , M, where M is the number of rows of the detection array. The corresponding transmitted LO fields out of the waveguides are $E_{LO,out\ mx}$ and $E_{LO,out\ my}$. The LO fields $E_{LO,in\ m\ x}$ and $E_{LO,in\ m\ y}$ for different m may have the same or different optical frequencies, the same or different magnitudes, and the same or different relative phases.

For the coherent detection array 600 illustrated in FIG. 14, the LO fields $E_{LO,in1x}$ and $E_{LO,in1y}$ are introduced respectively to the row-encoding waveguides 61-1 and 61-2 in row 1, the LO fields $E_{LO,in2x}$ and $E_{LO,in2y}$ are introduced respectively to the row-encoding waveguides 61-3 and 61-4 in row 2, and the LO fields $E_{LO,in3x}$ and $E_{LO,in3y}$ are introduced respectively to the row-encoding waveguides 61-5 and 61-6 in row 3.

In some aspects, a coherent detection array according to the present preferred embodiment may be constructed in such a manner that, for the coherent detection units in each column, the electrodes 55-1 and 55-2 of the photodetectors 54-1, and the electrodes 55-3 and 55-4 of the photodetectors 54-2 may be connected to separate column-readout wirings. In other aspects, either the electrodes 55-1 or the electrodes 55-2 of the photodetectors 54-1 and either the electrodes 55-3 or the electrodes 55-4 of the photodetectors 54-2 may be connected to a common column-readout wiring instead of separate column-readout wirings.

For the coherent detection units 500-1, 500-5 and 500-9 in column 1 of the illustration in FIG. 14, the electrodes 55-1 and 55-2 of the photodetectors 54-1 are connected to the column-readout wirings 62-1 and 63-1 respectively, and the electrodes 55-3 and 55-4 of the photodetectors 54-2 are connected to the column-readout wirings 64-1 and 65-1 respectively. Similarly, for the coherent detection units 500-2, 500-6 and 500-10 in column 2, the electrodes 55-1 and 55-2 of the photodetectors 54-1 are connected to the column-readout wirings 62-2 and 63-2 respectively, and the electrodes 55-3 and 55-4 of the photodetectors 54-2 are connected to the column-readout wirings 64-2 and 65-2 respectively. Similarly, for the coherent detection units 500-3, 500-7 and 500-11 in column 3, the electrodes 55-1 and 55-2 of the photodetectors 54-1 are connected to the column-readout wirings 62-3 and 63-3 respectively, and the electrodes 55-3 and 55-4 of the photodetectors 54-2 are connected to the column-readout wirings 64-3 and 65-3 respectively. Similarly, for the coherent detection units 500-4, 500-8 and 500-12 in column 4, the electrodes 55-1 and 55-2 of the photodetectors 54-1 are connected to the column-readout wirings 62-4 and 63-4 respectively, and the electrodes 55-3 and 55-4 of the photodetectors 54-2 are connected to the column-readout wirings 64-4 and 65-4 respectively.

Similar to FIG. 2, the pads Pa in FIG. 14 are output terminals of the column-readout wirings that may be connected to peripheral readout circuits.

First Modified Example of Sixth Preferred Embodiment

Figure 15:
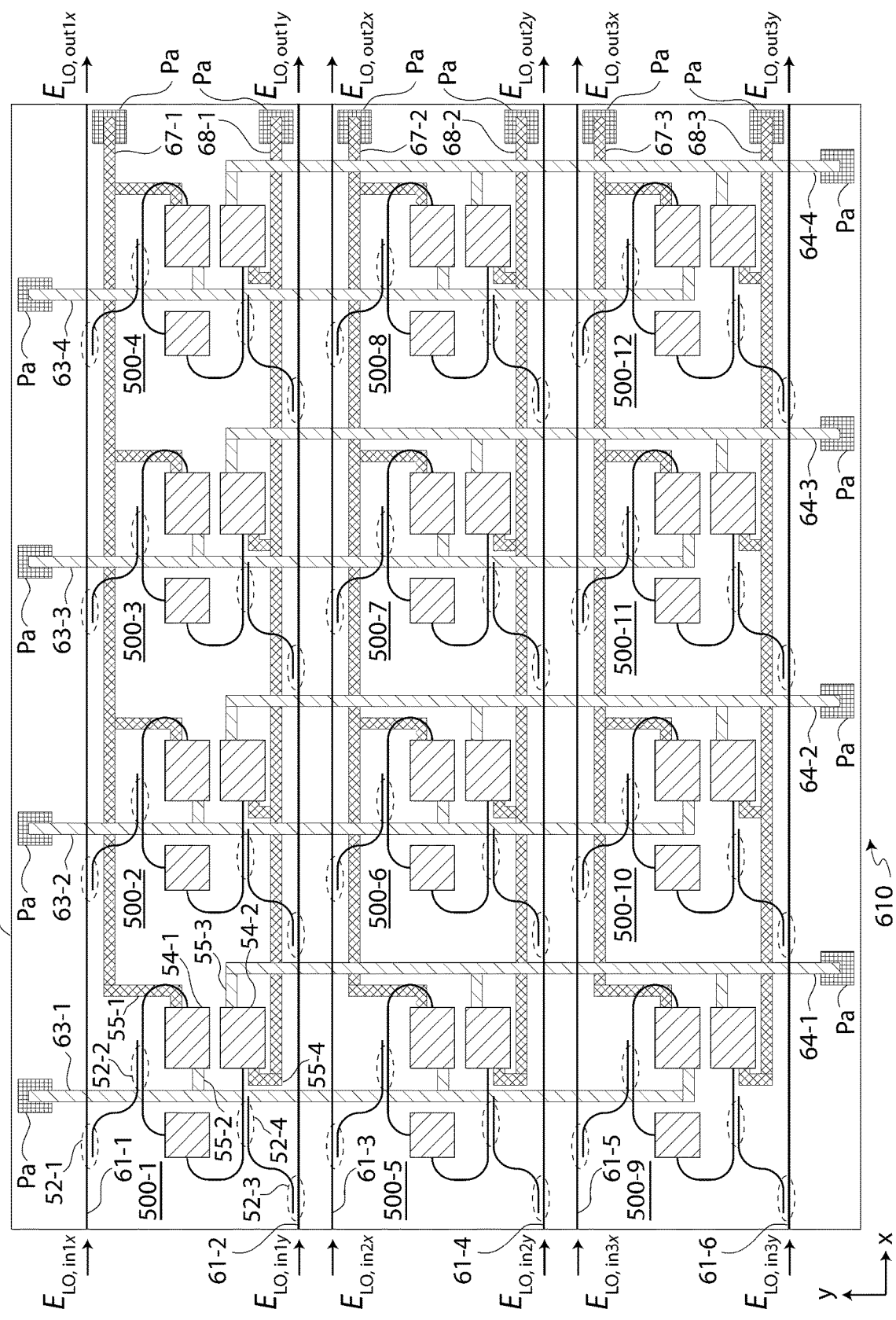

FIG. 15 illustrates a plan view of the coherent detection array 610. The coherent detection array 610 is a modified example of the coherent detection array 600 according to the embodiment illustrated in FIG. 14. Similar to the coherent detection array 600, the coherent detection array 610 may be configured to include plural units of the coherent detection unit 500 according to the embodiment illustrated in FIG. 10. Each row of a coherent detection array 610 may be constructed by concatenating a series of the coherent detection units 500 using the waveguides 53-1 (see FIG. 10). Plural rows of the coherent detection units 500 may be concatenated in series by electrical conducting paths to form a detection array. As an example, the embodiment of the coherent detection array 610 illustrated in FIG. 15 includes 12 coherent detection units 500-1, 500-2, 500-3, 500-4, 500-5, 500-6, 500-7, 500-8, 500-9, 500-10, 500-11 and 500-12 that are all coherent detection units 500 arranged in the format of 3 rows and 4 columns.

Similar to the coherent detection array 600, the coherent detection array 610 according to the present preferred embodiment may be configured in such a manner that, for the coherent detection units in each column, either the electrodes 55-1 or the electrodes 55-2 of the photodetectors 54-1 may be connected to a column-readout wiring, and similarly either the electrodes 55-3 or the electrodes 55-4 of the photodetectors 54-2 may be connected to a column-readout wiring.

Different from the coherent detection array 600, the coherent detection array 610 according to the present preferred embodiment may be configured in such a manner that the other electrodes of the photodetectors of the coherent detection units may be connected across different columns by row-encoding wirings instead of across different rows by column-readout wirings. For the coherent detection units 500 in each row of the coherent detection array 610, either the electrodes 55-1 or the electrodes 55-2 of the photodetectors 54-1 may be connected to a row-encoding wiring, and similarly either the electrodes 55-3 or the electrodes 55-4 of the photodetectors 54-2 may be connected to a row-encoding wiring. In some aspects, some of the row-encoding wirings may be combined to simplify the layout.

Referring to the coherent detection array 610 illustrated in FIG. 15. On one hand, for the coherent detection units 500-1, 500-5 and 500-9 in column 1, the electrodes 55-2 of the photodetectors 54-1 are connected to the column-readout wiring 63-1 and the electrodes 55-3 of the photodetectors 54-2 are connected to the column-readout wiring 64-1.

Similarly, for the coherent detection units 500-2, 500-6 and 500-10 in column 2, the electrodes 55-2 of the photodetectors 54-1 are connected to the column-readout wiring 63-2 and the electrodes 55-3 of the photodetectors 54-2 are connected to the column-readout wiring 64-2.

Similarly, for the coherent detection units 500-3, 500-7 and 500-11 in column 3, the electrodes 55-2 of the photodetectors 54-1 are connected to the column-readout wiring 63-3 and the electrodes 55-3 of the photodetectors 54-2 are connected to the column-readout wiring 64-3.

Similarly, for the coherent detection units 500-4, 500-8 and 500-12 in column 4, the electrodes 55-2 of the photodetectors 54-1 are connected to the column-readout wiring 63-4 and the electrodes 55-3 of the photodetectors 54-2 are connected to the column-readout wiring 64-4.

On the other hand, for the coherent detection units 500-1, 500-2, 500-3 and 500-4 in row 1, the electrodes 55-1 of the photodetectors 54-1 are connected to the row-encoding wiring 67-1 and the electrodes 55-4 of the photodetectors 54-2 are connected to the row-encoding wiring 68-1.

Similarly, for the coherent detection units 500-5, 500-6, 500-7 and 500-8 in row 2, the electrodes 55-1 of the photodetectors 54-1 are connected to the row-encoding wiring 67-2 and the electrodes 55-4 of the photodetectors 54-2 are connected to the row-encoding wiring 68-2.

Similarly, for the coherent detection units 500-9, 500-10, 500-11 and 500-12 in row 3, the electrodes 55-1 of the photodetectors 54-1 are connected to the row-encoding wiring 67-3 and the electrodes 55-4 of the photodetectors 54-2 are connected to the row-encoding wiring 68-3.

Figure 16:
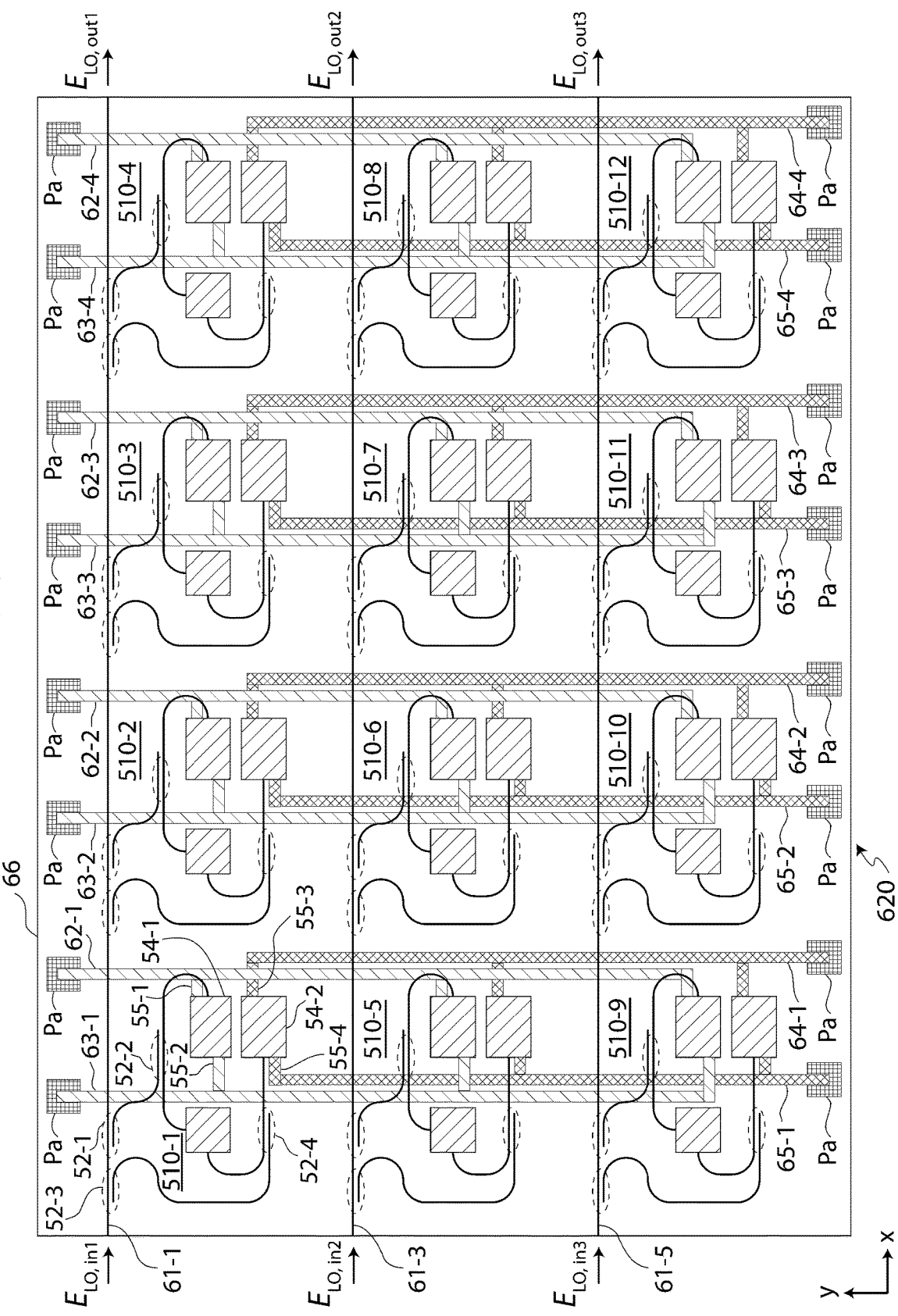

The pads Pa in FIG. 15 are terminals of the column-readout wirings and the row-encoding wirings that may be connected to peripheral electrical circuits Second Modified Example of Sixth Preferred Embodiment FIG. 16 illustrates a plan view of the coherent detection array 620. The coherent detection array 620 is another modified example of the coherent detection array 600 according to the embodiment illustrated in FIG. 14.

The coherent detection array 620 illustrated in FIG. 16 is similar to the coherent detection array 600 illustrated in FIG. 14 with an essential difference of employing the coherent detection unit 510 according to the embodiment illustrated in FIG. 11 as a building block of the detection array, instead of the coherent detection unit 500 used in the coherent detection array 600. In some aspects of a rectilinear configuration, the coherent detection array may be configured in M rows and N columns with M×N coherent detection units. As an example, the embodiment of the coherent detection array 620 illustrated in FIG. 16 includes 12 coherent detection units 510-1, 510-2, 510-3, 510-4, 510-5, 510-6, 510-7, 510-8, 510-9, 510-10, 510-11 and 510-12 that are all coherent detection units 510 arranged in the format of 3 rows and 4 columns.

With the coherent detection units 510 employed, the row-encoding waveguides for the x-polarized and y-polarized light may be combined into one and the same local oscillator light $E_{LO,in\ m}$ with m=1, 2, . . . , M, where M is the number of rows, may be used for the two polarizations.

For the coherent detection array 620 illustrated in FIG. 16, the LO light $E_{LO,in1}$ is introduced to the row-encoding waveguide 61-1 in row 1, the LO light $E_{LO,in2}$ is introduced to the row-encoding waveguide 61-3 in row 2, and the LO light $E_{LO,in3}$ is introduced to the row-encoding waveguide 61-5 in row 3.

Third Modified Example of Sixth Preferred Embodiment

Figure 17:
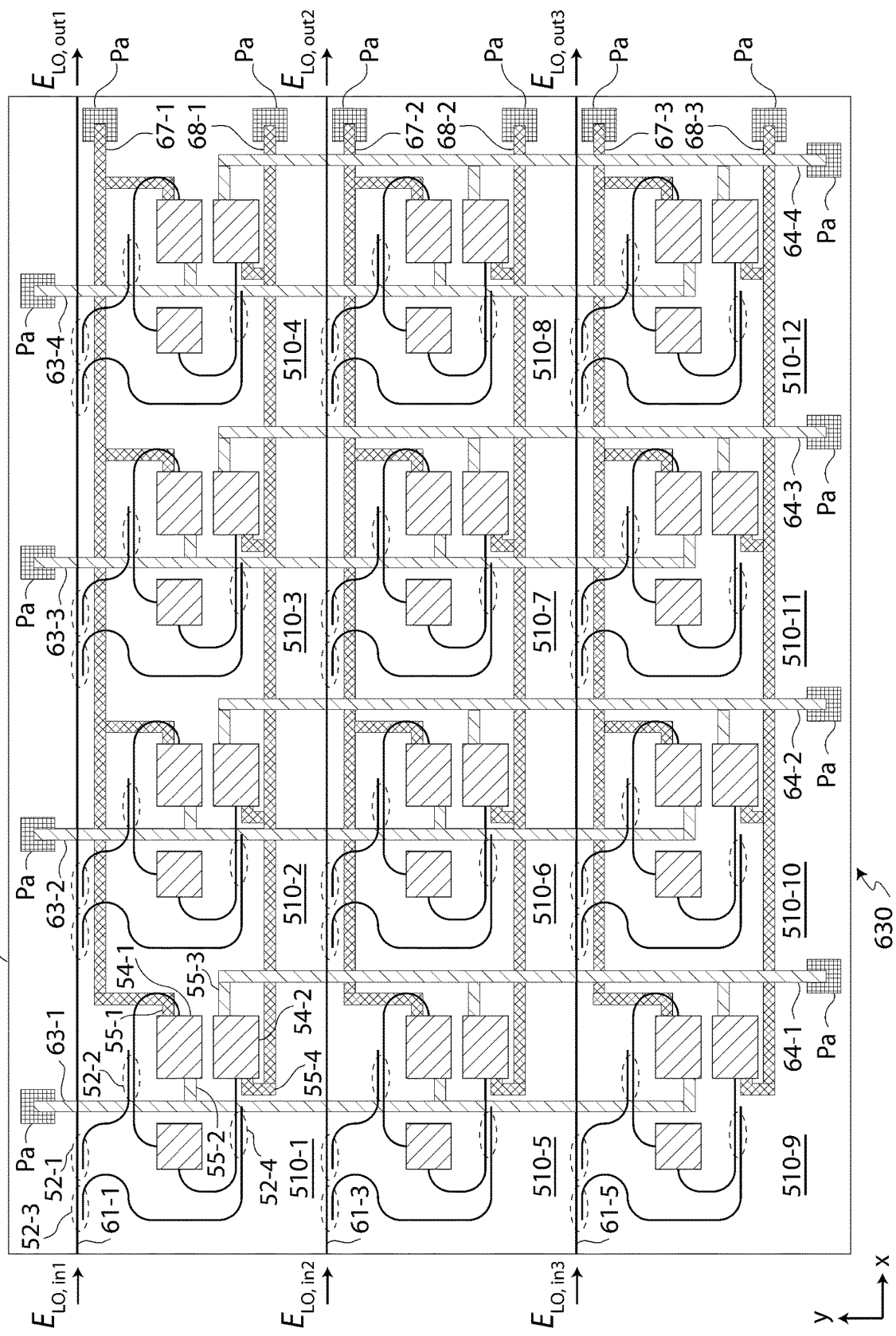

FIG. 17 illustrates a plan view of the coherent detection array 630. The coherent detection array 630 is another modified example of the coherent detection array 600 according to the embodiment illustrated in FIG. 14.

The coherent detection array 630 combines the modifications made to the coherent detection array 600 according to the coherent detection array 610 in FIG. 15 and the coherent detection array 620 in FIG. 16. The coherent detection array 630 may be understood with reference to the coherent detection arrays 610 and 620 according to the embodiments illustrated in FIGS. 15 and 16, in conjunction with the following descriptions.

On one hand, similar to the coherent detection array 620, the coherent detection array 630 employs the coherent detection unit 510 according to the embodiment illustrated in FIG. 11 as a building block of the detection array, instead of the coherent detection unit 500 used in the coherent detection arrays 600 and 610.

With the coherent detection units 510 employed, the row-encoding waveguides for the x-polarized and y-polarized light may be combined into one and the same local oscillator light $E_{LO,in\ m}$ with m=1, 2, . . . , M, where M is the number of rows, may be used for the two polarizations.

For the coherent detection array 630 illustrated in FIG. 17, the LO light $E_{LO,in1}$ is introduced to the row-encoding waveguide 61-1 in row 1, the LO light $E_{LO,in2}$ is introduced to the row-encoding waveguide 61-3 in row 2, and the LO light $E_{LO,in3}$ is introduced to the row-encoding waveguide 61-5 in row 3.

On the other hand, similar to the coherent detection array 610, the coherent detection array 630 may be configured in such a manner that, for the coherent detection units 510 in each column of the detection array, either the electrodes 55-1 or the electrodes 55-2 of the photodetectors 54-1 may be connected to a column-readout wiring across the rows of that column and either the electrodes 55-3 or the electrodes 55-4 of the photodetectors 54-2 may be connected to a column-readout wiring across the rows of that column, while the other electrodes of the photodetectors 54-1 and 54-2 of the coherent detection units 510 in each row of the detection array may be connected to row-encoding wirings, or a common row-encoding wiring, across the columns of that row.

Referring to the coherent detection array 630 illustrated in FIG. 17. On one hand, for the coherent detection units 510-1, 510-5 and 510-9 in column 1, the electrodes 55-2 of the photodetectors 54-1 are connected to the column-readout wiring 63-1 and the electrodes 55-3 of the photodetectors 54-2 are connected to the column-readout wiring 64-1.

Similarly, for the coherent detection units 510-2, 510-6 and 510-10 in column 2, the electrodes 55-2 of the photodetectors 54-1 are connected to the column-readout wiring 63-2 and the electrodes 55-3 of the photodetectors 54-2 are connected to the column-readout wiring 64-2.

Similarly, for the coherent detection units 510-3, 510-7 and 510-11 in column 3, the electrodes 55-2 of the photodetectors 54-1 are connected to the column-readout wiring 63-3 and the electrodes 55-3 of the photodetectors 54-2 are connected to the column-readout wiring 64-3.

Similarly, for the coherent detection units 510-4, 510-8 and 510-12 in column 4, the electrodes 55-2 of the photodetectors 54-1 are connected to the column-readout wiring 63-4 and the electrodes 55-3 of the photodetectors 54-2 are connected to the column-readout wiring 64-4.

On the other hand, for the coherent detection units 510-1, 510-2, 510-3 and 510-4 in row 1, the electrodes 55-1 of the photodetectors 54-1 are connected to the row-encoding wiring 67-1 and the electrodes 55-4 of the photodetectors 54-2 are connected to the row-encoding wiring 68-1.

Similarly, for the coherent detection units 510-5, 510-6, 510-7 and 510-8 in row 2, the electrodes 55-1 of the photodetectors 54-1 are connected to the row-encoding wiring 67-2 and the electrodes 55-4 of the photodetectors 54-2 are connected to the row-encoding wiring 68-2.

Similarly, for the coherent detection units 510-9, 510-10, 510-11 and 510-12 in row 3, the electrodes 55-1 of the photodetectors 54-1 are connected to the row-encoding wiring 67-3 and the electrodes 55-4 of the photodetectors 54-2 are connected to the row-encoding wiring 68-3.

Fourth Modified Example of Sixth Preferred Embodiment

Figure 18:
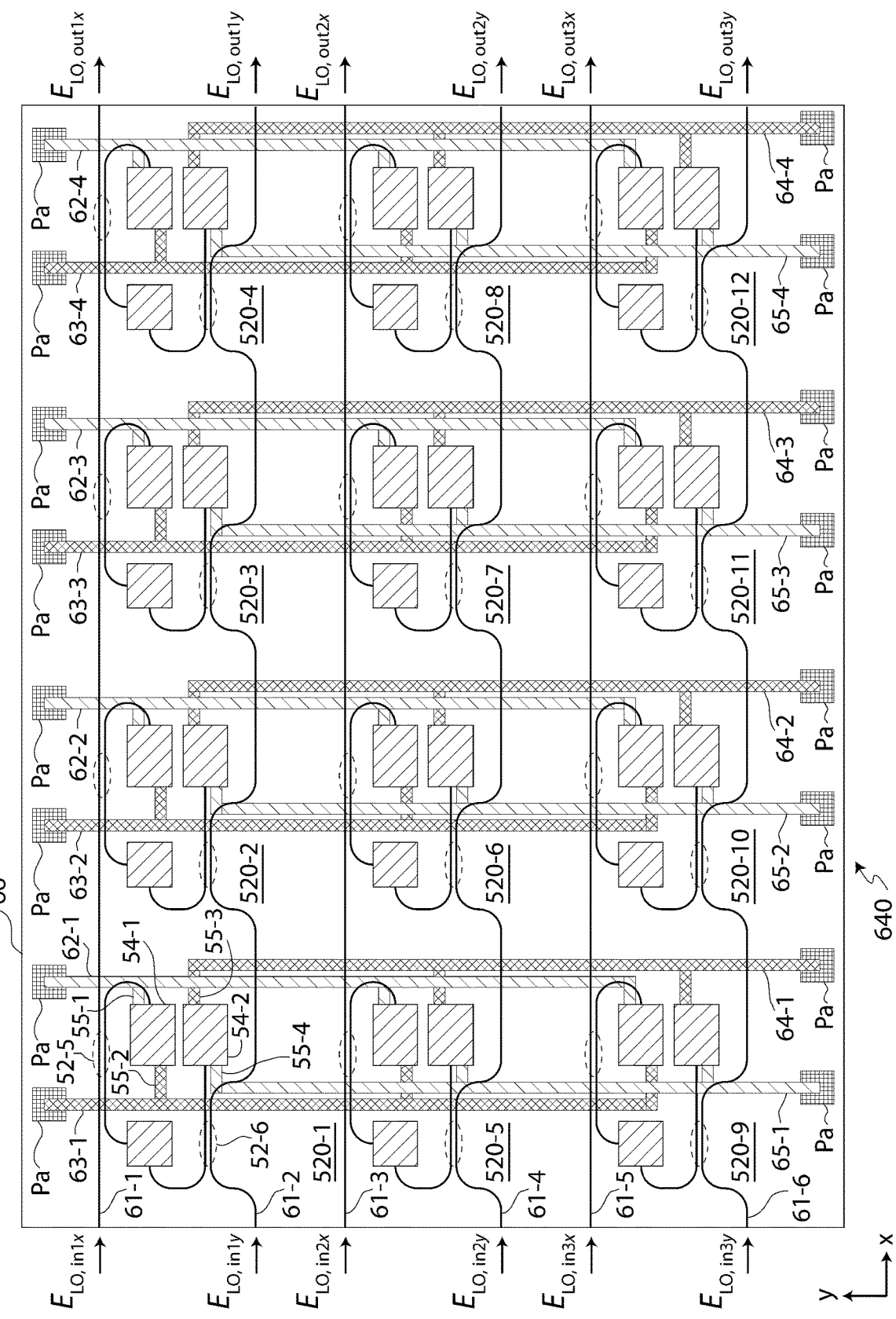

FIG. 18 illustrates a plan view of the coherent detection array 640. The coherent detection array 640 is another modified example of the coherent detection array 600 according to the embodiment illustrated in FIG. 14.

The coherent detection array 640 illustrated in FIG. 18 is similar to the coherent detection array 600 illustrated in FIG. 14 with an essential difference of employing the coherent detection unit 520 according to the embodiment illustrated in FIG. 12 as a building block of the detection array, instead of the coherent detection unit 500 used in the coherent detection array 600. In some aspects of a rectilinear configuration, the coherent detection array may be configured in M rows and N columns with M×N coherent detection units. As an example, the embodiment of the coherent detection array 640 illustrated in FIG. 18 includes 12 coherent detection units 520-1, 520-2, 520-3, 520-4, 520-5, 520-6, 520-7, 520-8, 520-9, 520-10, 520-11 and 520-12 that are all coherent detection units 520 arranged in the format of 3 rows and 4 columns.

Fifth Modified Example of Sixth Preferred Embodiment

Figure 19:
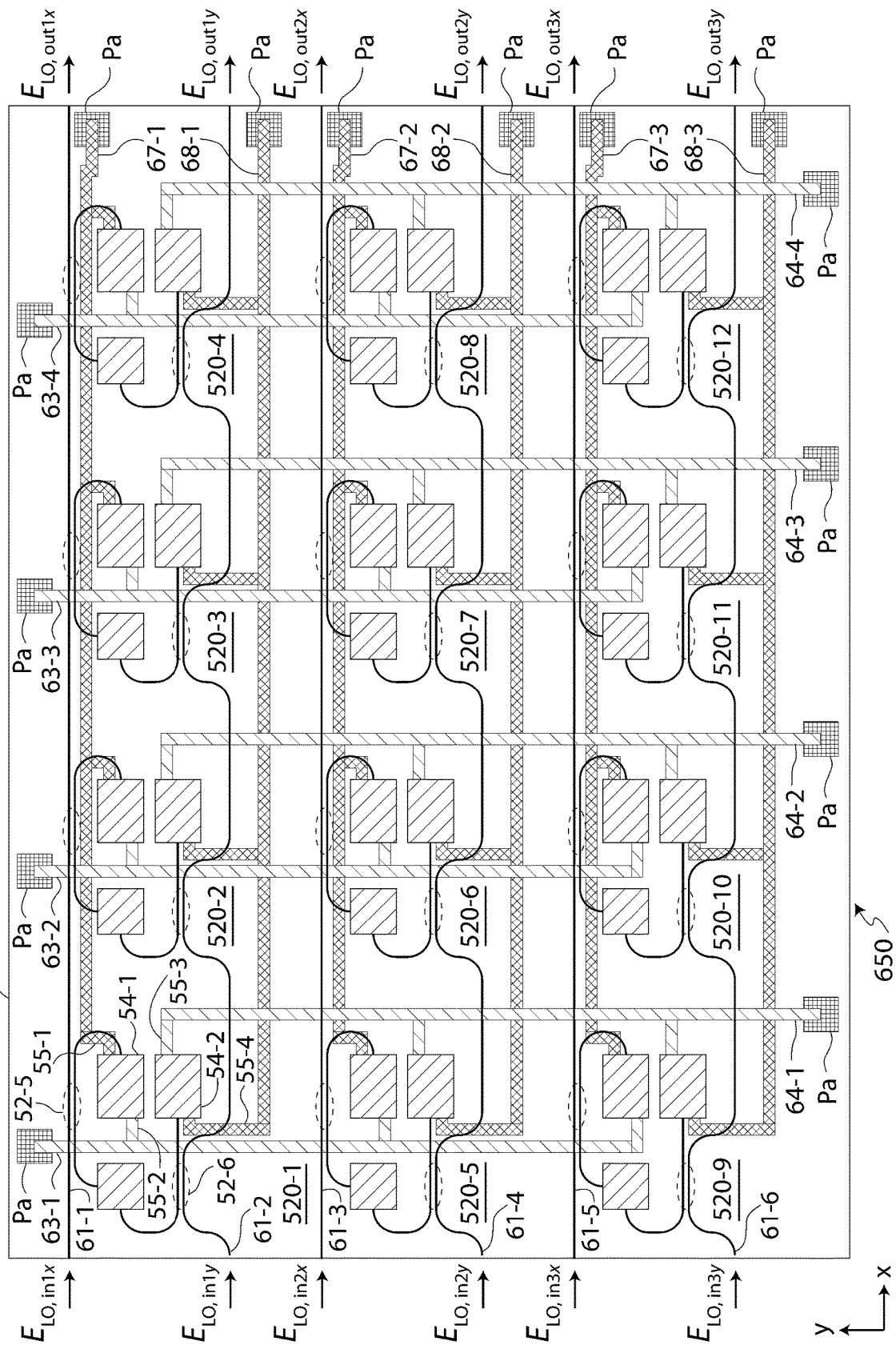

FIG. 19 illustrates a plan view of the coherent detection array 650. The coherent detection array 650 is another modified example of the coherent detection array 600 according to the embodiment illustrated in FIG. 14.

The coherent detection array 650 combines the modifications made to the coherent detection array 600 according to the coherent detection array 610 in FIG. 15 and the coherent detection array 640 in FIG. 18. The coherent detection array 650 may be understood with reference to the coherent detection arrays 610 and 640 according to the embodiments illustrated in FIGS. 15 and 18, in conjunction with the following descriptions.

On one hand, similar to the coherent detection array 640, the coherent detection array 650 employs the coherent detection unit 520 according to the embodiment illustrated in FIG. 12 as a building block of the detection array, instead of the coherent detection unit 500 used in the coherent detection arrays 600 and 610.

On the other hand, similar to the coherent detection array 610, the coherent detection array 650 may be configured in such a manner that, for the coherent detection units 520 in each column of the detection array, either the electrodes 55-1 or the electrodes 55-2 of the photodetectors 54-1 may be connected to a column-readout wiring across the rows of that column and either the electrodes 55-3 or the electrodes 55-4 of the photodetectors 54-2 may be connected to a column-readout wiring across the rows of that column, while the other electrodes of the photodetectors 54-1 and 54-2 of the coherent detection units 520 in each row of the detection array may be connected to row-encoding wirings, or a common row-encoding wiring, across the columns of that row.

Referring to the coherent detection array 650 illustrated in FIG. 19. On one hand, for the coherent detection units 520-1, 520-5 and 520-9 in column 1, the electrodes 55-2 of the photodetectors 54-1 are connected to the column-readout wiring 63-1 and the electrodes 55-3 of the photodetectors 54-2 are connected to the column-readout wiring 64-1.

Similarly, for the coherent detection units 520-2, 520-6 and 520-10 in column 2, the electrodes 55-2 of the photodetectors 54-1 are connected to the column-readout wiring 63-2 and the electrodes 55-3 of the photodetectors 54-2 are connected to the column-readout wiring 64-2.

Similarly, for the coherent detection units 520-3, 520-7 and 520-11 in column 3, the electrodes 55-2 of the photodetectors 54-1 are connected to the column-readout wiring 63-3 and the electrodes 55-3 of the photodetectors 54-2 are connected to the column-readout wiring 64-3.

Similarly, for the coherent detection units 520-4, 520-8 and 520-12 in column 4, the electrodes 55-2 of the photodetectors 54-1 are connected to the column-readout wiring 63-4 and the electrodes 55-3 of the photodetectors 54-2 are connected to the column-readout wiring 64-4.

On the other hand, for the coherent detection units 520-1, 520-2, 520-3 and 520-4 in row 1, the electrodes 55-1 of the photodetectors 54-1 are connected to the row-encoding wiring 67-1 and the electrodes 55-4 of the photodetectors 54-2 are connected to the row-encoding wiring 68-1.

Similarly, for the coherent detection units 520-5, 520-6, 520-7 and 520-8 in row 2, the electrodes 55-1 of the photodetectors 54-1 are connected to the row-encoding wiring 67-2 and the electrodes 55-4 of the photodetectors 54-2 are connected to the row-encoding wiring 68-2.

Similarly, for the coherent detection units 520-9, 520-10, 520-11 and 520-12 in row 3, the electrodes 55-1 of the photodetectors 54-1 are connected to the row-encoding wiring 67-3 and the electrodes 55-4 of the photodetectors 54-2 are connected to the row-encoding wiring 68-3.

Sixth Modified Example of Sixth Preferred Embodiment

Figure 20:
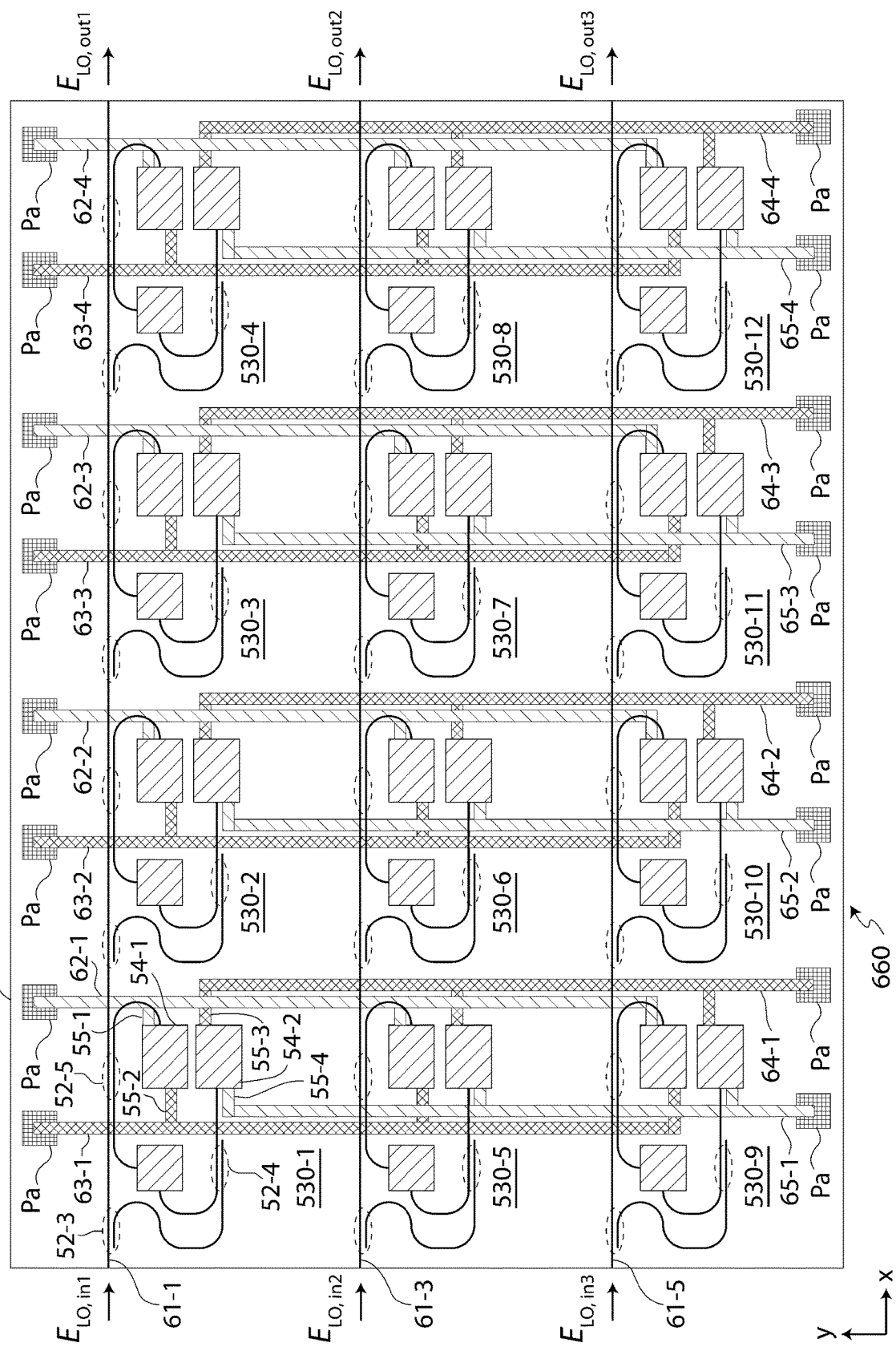

FIG. 20 illustrates a plan view of the coherent detection array 660. The coherent detection array 660 is another modified example of the coherent detection array 600 according to the embodiment illustrated in FIG. 14.

The coherent detection array 660 illustrated in FIG. 20 is similar to the coherent detection array 600 illustrated in FIG. 14 with an essential difference of employing the coherent detection unit 530 according to the embodiment illustrated in FIG. 13 as a building block of the detection array, instead of the coherent detection unit 500 used in the coherent detection array 600. In some aspects of a rectilinear configuration, the coherent detection array may be configured in M rows and N columns with M×N coherent detection units. As an example, the embodiment of the coherent detection array 660 illustrated in FIG. 20 includes 12 coherent detection units 530-1, 530-2, 530-3, 530-4, 530-5, 530-6, 530-7, 530-8, 530-9, 530-10, 530-11 and 530-12 that are all coherent detection units 530 arranged in the format of 3 rows and 4 columns.

With the coherent detection units 530 employed, the row-encoding waveguides for the x-polarized and y-polarized light may be combined into one and the same local oscillator light $E_{LO,in\ m}$ with m=1, 2, . . . , M, where M is the number of rows, may be used for the two polarizations.

For the coherent detection array 660 illustrated in FIG. 20, the LO light $E_{LO,in1}$ is introduced to the row-encoding waveguide 61-1 in row 1, the LO light $E_{LO,in2}$ is introduced to the row-encoding waveguide 61-3 in row 2, and the LO light $E_{LO,in3}$ is introduced to the row-encoding waveguide 61-5 in row 3.

Seventh Modified Example of Sixth Preferred Embodiment

Figure 21:
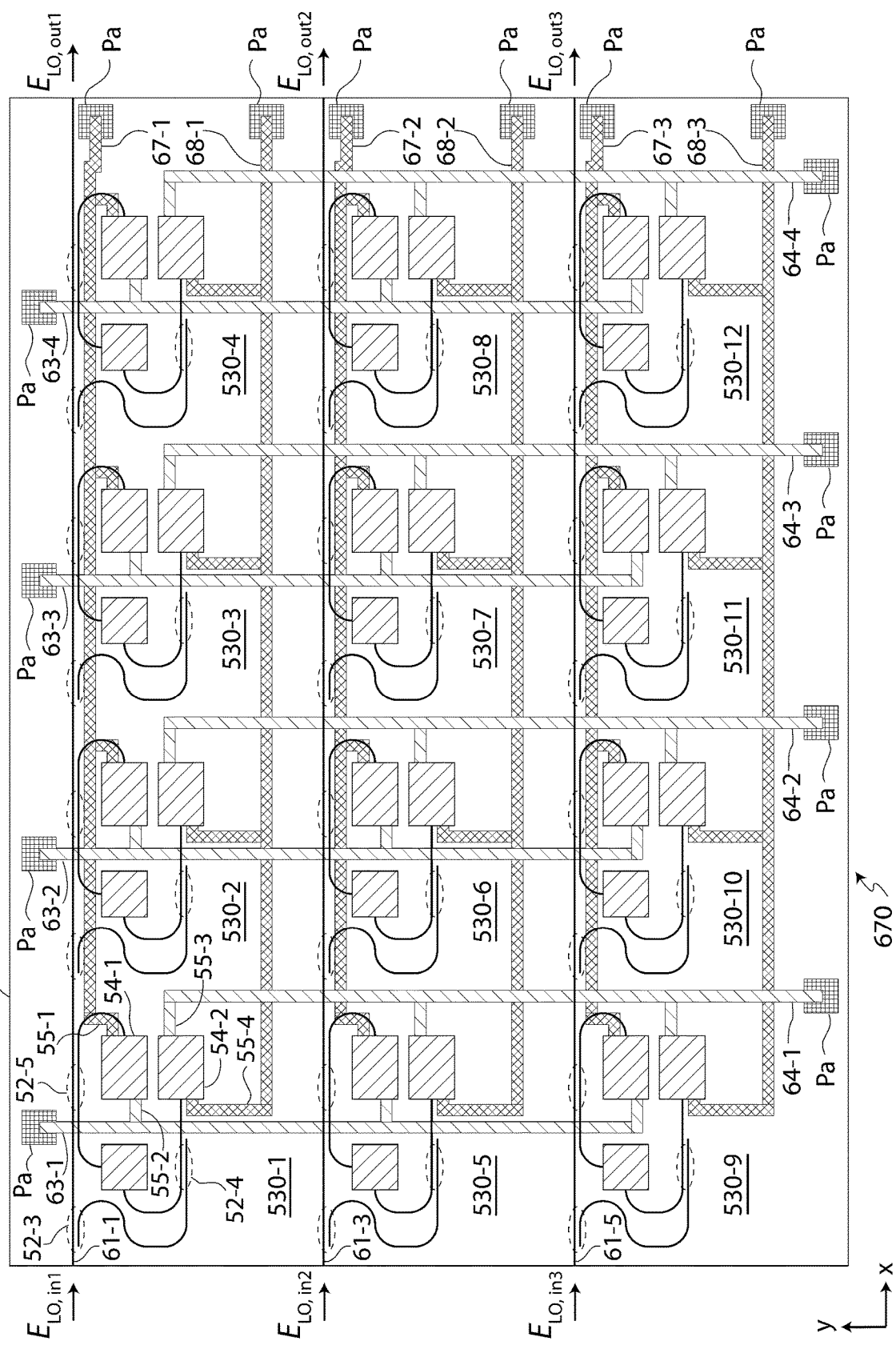

FIG. 21 illustrates a plan view of the coherent detection array 670. The coherent detection array 670 is another modified example of the coherent detection array 600 according to the embodiment illustrated in FIG. 14.

The coherent detection array 670 combines the modifications made to the coherent detection array 600 according to the coherent detection array 610 in FIG. 15 and the coherent detection array 660 in FIG. 20. The coherent detection array 670 may be understood with reference to the coherent detection arrays 610 and 660 according to the embodiments illustrated in FIGS. 15 and 20, in conjunction with the following descriptions.

On one hand, similar to the coherent detection array 660, the coherent detection array 670 employs the coherent detection unit 530 according to the embodiment illustrated in FIG. 13 as a building block of the detection array, instead of the coherent detection unit 500 used in the coherent detection arrays 600 and 610.

With the coherent detection units 530 employed, the row-encoding waveguides for the x-polarized and y-polarized light may be combined into one and the same local oscillator light $E_{LO,in\ m}$ with m=1, 2, . . . , M, where M is the number of rows, may be used for the two polarizations.

For the coherent detection array 670 illustrated in FIG. 21, the LO light $E_{LO,in1}$ is introduced to the row-encoding waveguide 61-1 in row 1, the LO light $E_{LO,in2}$ is introduced to the row-encoding waveguide 61-3 in row 2, and the LO light $E_{LO,in3}$ is introduced to the row-encoding waveguide 61-5 in row 3.

On the other hand, similar to the coherent detection array 610, the coherent detection array 670 may be configured in such a manner that, for the coherent detection units 530 in each column of the detection array, either the electrodes 55-1 or the electrodes 55-2 of the photodetectors 54-1 may be connected to a column-readout wiring across the rows of that column and either the electrodes 55-3 or the electrodes 55-4 of the photodetectors 54-2 may be connected to a column-readout wiring across the rows of that column, while the other electrodes of the photodetectors 54-1 and 54-2 of the coherent detection units 530 in each row of the detection array may be connected to row-encoding wirings, or a common row-encoding wiring, across the columns of that row.

Referring to the coherent detection array 670 illustrated in FIG. 21. On one hand, for the coherent detection units 530-1, 530-5 and 530-9 in column 1, the electrodes 55-2 of the photodetectors 54-1 are connected to the column-readout wiring 63-1 and the electrodes 55-3 of the photodetectors 54-2 are connected to the column-readout wiring 64-1.

Similarly, for the coherent detection units 530-2, 530-6 and 530-10 in column 2, the electrodes 55-2 of the photodetectors 54-1 are connected to the column-readout wiring 63-2 and the electrodes 55-3 of the photodetectors 54-2 are connected to the column-readout wiring 64-2.

Similarly, for the coherent detection units 530-3, 530-7 and 530-11 in column 3, the electrodes 55-2 of the photodetectors 54-1 are connected to the column-readout wiring 63-3 and the electrodes 55-3 of the photodetectors 54-2 are connected to the column-readout wiring 64-3.

Similarly, for the coherent detection units 530-4, 530-8 and 530-12 in column 4, the electrodes 55-2 of the photodetectors 54-1 are connected to the column-readout wiring 63-4 and the electrodes 55-3 of the photodetectors 54-2 are connected to the column-readout wiring 64-4.

On the other hand, for the coherent detection units 530-1, 530-2, 530-3 and 530-4 in row 1, the electrodes 55-1 of the photodetectors 54-1 are connected to the row-encoding wiring 67-1 and the electrodes 55-4 of the photodetectors 54-2 are connected to the row-encoding wiring 68-1.

Similarly, for the coherent detection units 530-5, 530-6, 530-7 and 530-8 in row 2, the electrodes 55-1 of the photodetectors 54-1 are connected to the row-encoding wiring 67-2 and the electrodes 55-4 of the photodetectors 54-2 are connected to the row-encoding wiring 68-2.

Similarly, for the coherent detection units 530-9, 530-10, 530-11 and 530-12 in row 3, the electrodes 55-1 of the photodetectors 54-1 are connected to the row-encoding wiring 67-3 and the electrodes 55-4 of the photodetectors 54-2 are connected to the row-encoding wiring 68-3.

Seventh Preferred Embodiment

Two examples of coherent detection units 700 and 710 according to the present preferred embodiment will be described with reference to FIGS. 22 and 23.

Figure 22:
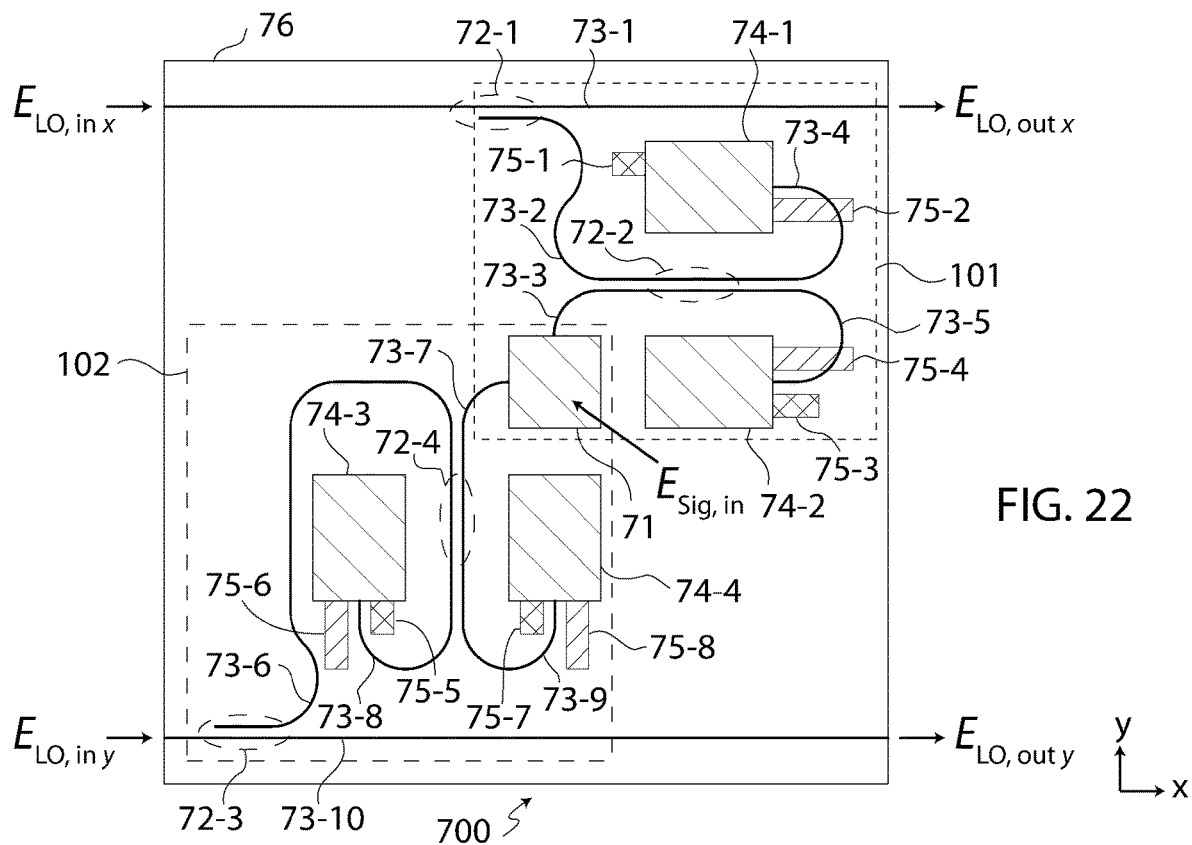
FIGS. 22 and 23 illustrate examples of another configuration of a coherent detection unit according to a seventh preferred embodiment of the present invention where the two polarizations of the input light may be detected at the detection unit separately.

FIG. 22 illustrates a plan view of the coherent detection unit 700. The coherent detection unit 700 illustrated in FIG. 22 is configured to include a polarized-light separating free-space-to-waveguide coupler 71, optical couplers 72-1, 72-2, 72-3, and 72-4, waveguides 73-1, 73-2, 73-3, 73-4, 73-5, 73-6, 73-7, 73-8, 73-9 and 73-10, photodetectors 74-1, 74-2, 74-3 and 74-4, and electrodes 75-1, 75-2, 75-3, 75-4, 75-5, 75-6, 75-7 and 75-8. The coherent detection unit 700 may also be configured to include additional components, such as one or more modulators and/or heaters, which may be used to modulate or modify the properties of the coherent detection unit. These additional components are not shown in FIG. 22. The coherent detection unit 700 may be integrated on a substrate 76 using optical waveguide technology.

The coherent detection unit 700 is a modified version of the coherent detection unit 100 illustrated in FIG. 1. The coherent detection unit 700 is configured to detect incoming signal light that may be multiplexed with polarizations in the x and y directions in such a way that the two polarization components may be measured separately. The coherent detection unit 700 may be understood with reference to the coherent detection unit 100 according to the embodiment illustrated in FIG. 1, in conjunction with the following descriptions.

The coherent detection unit 700 is constructed by combining coherent detection sub-units 101 and 102 (see FIG. 22), each of which is similar to the coherent detection unit 100, with a polarized-light separating free-space-to-waveguide coupler 71 replacing the free-space-to-waveguide coupler 11 of the coherent detection unit 100. The coherent detection sub-unit 101 is configured to include a polarized-light separating free-space-to-waveguide coupler 71, optical couplers 72-1 and 72-2, waveguides 73-1, 73-2, 73-3, 73-4 and 73-5, photodetectors 74-1 and 74-2, and electrodes 75-1, 75-2, 75-3 and 75-4. The coherent detection sub-unit 102 is configured to include the same polarized-light separating free-space-to-waveguide coupler 71, optical couplers 72-3 and 72-4, waveguides 73-6, 73-7, 73-8, 73-9 and 73-10, photodetectors 74-3 and 74-4, and electrodes 75-5, 75-6, 75-7 and 75-8. In such configuration, the polarized-light separating free-space-to-waveguide coupler 71 is a common component of the two coherent detection sub-units 101 and 102.

In FIG. 22, the waveguide 73-1 has one end through which the local oscillator light $E_{LO,in\ x}$ may be introduced and the other end through which the local oscillator light $E_{LO,out\ x}$ may be transmitted, and the waveguide 73-10 has one end through which the local oscillator light $E_{LO,in\ y}$ may be introduced and the other end through which the local oscillator light $E_{LO,out\ y}$ may be transmitted.

The coherent detection unit 700 uses the polarized-light separating free-space-to-waveguide coupler 71 to receive the signal light $E_{Sig,in}$ that may comprise multiplexed x-polarized light and y-polarized light. The signal light $E_{Sig,in}$ may be received and separated into x-polarized light and y-polarized light by the polarized-light separating free-space-to-waveguide coupler 71. On one hand, the x-polarized light may be carried into the coherent detection sub-unit 101 through the waveguide 73-3 and may result in photocurrents in the electrodes 75-1, 75-2, 75-3 and 75-4 when detected by the photodetectors 74-1 and 74-2. On the other hand, the y-polarized light may be carried into the coherent detection sub-unit 102 through the waveguide 73-7 and may result in photocurrents in the electrodes 75-5, 75-6, 75-7 and 75-8 when detected by the photodetectors 74-3 and 74-4.

Modified Example of Seventh Preferred Embodiment

Figure 23:
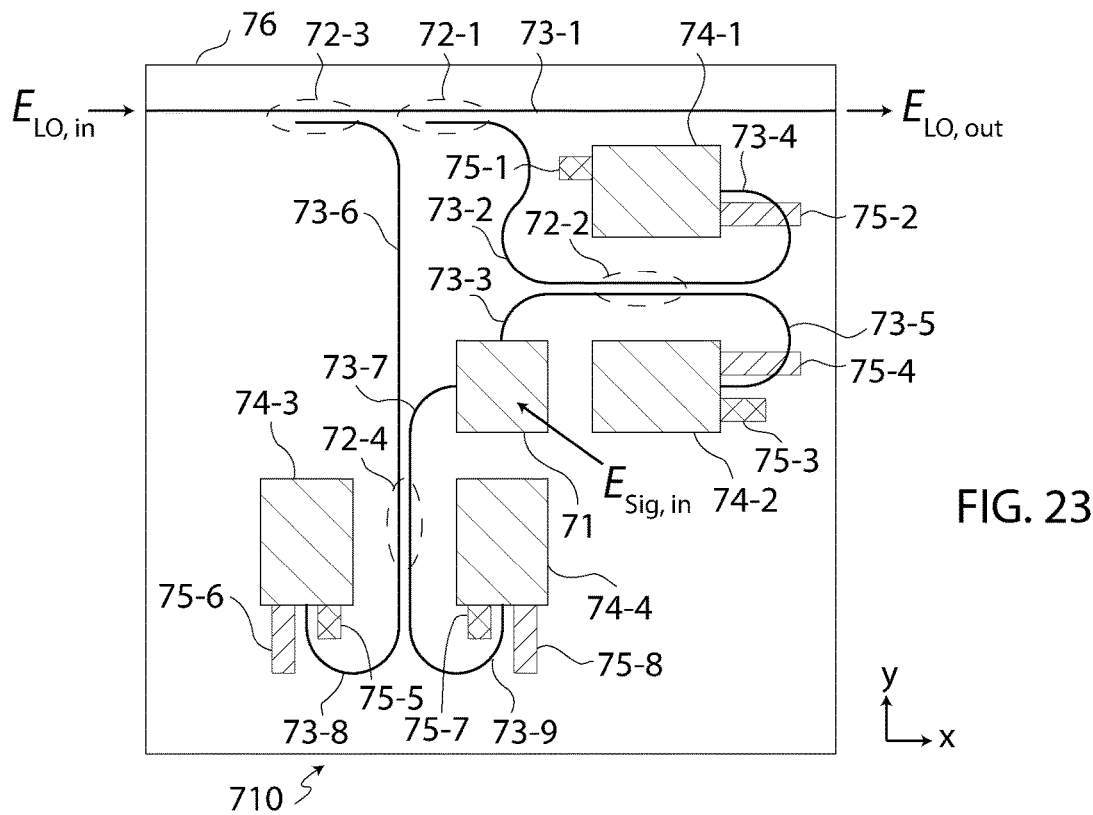

FIG. 23 illustrates a plan view of the coherent detection unit 710. The coherent detection unit 710 illustrated in FIG. 23 is a modified example of the coherent detection unit 700 according to the embodiment illustrated in FIG. 22.

The coherent detection unit 710 in FIG. 23 is similar to the coherent detection unit 700 in FIG. 22 with an essential difference of moving the optical coupler 72-3 to the waveguide 73-1 to couple the same local oscillator light from the waveguide 73-1 to the waveguide 73-6 as the local oscillator light to the waveguide 73-2. In this way, the x-polarized and y-polarized components of the signal light coupled into the detection unit 710 may be mixed with the same local oscillator light $E_{LO,in}$. The waveguide 73-10 may be removed accordingly.

Eighth Preferred Embodiment

Four examples of coherent detection arrays 800, 810, 820 and 830 according to the present preferred embodiment will be described with reference to FIGS. 24, 25, 26, and 27.

Figure 24:
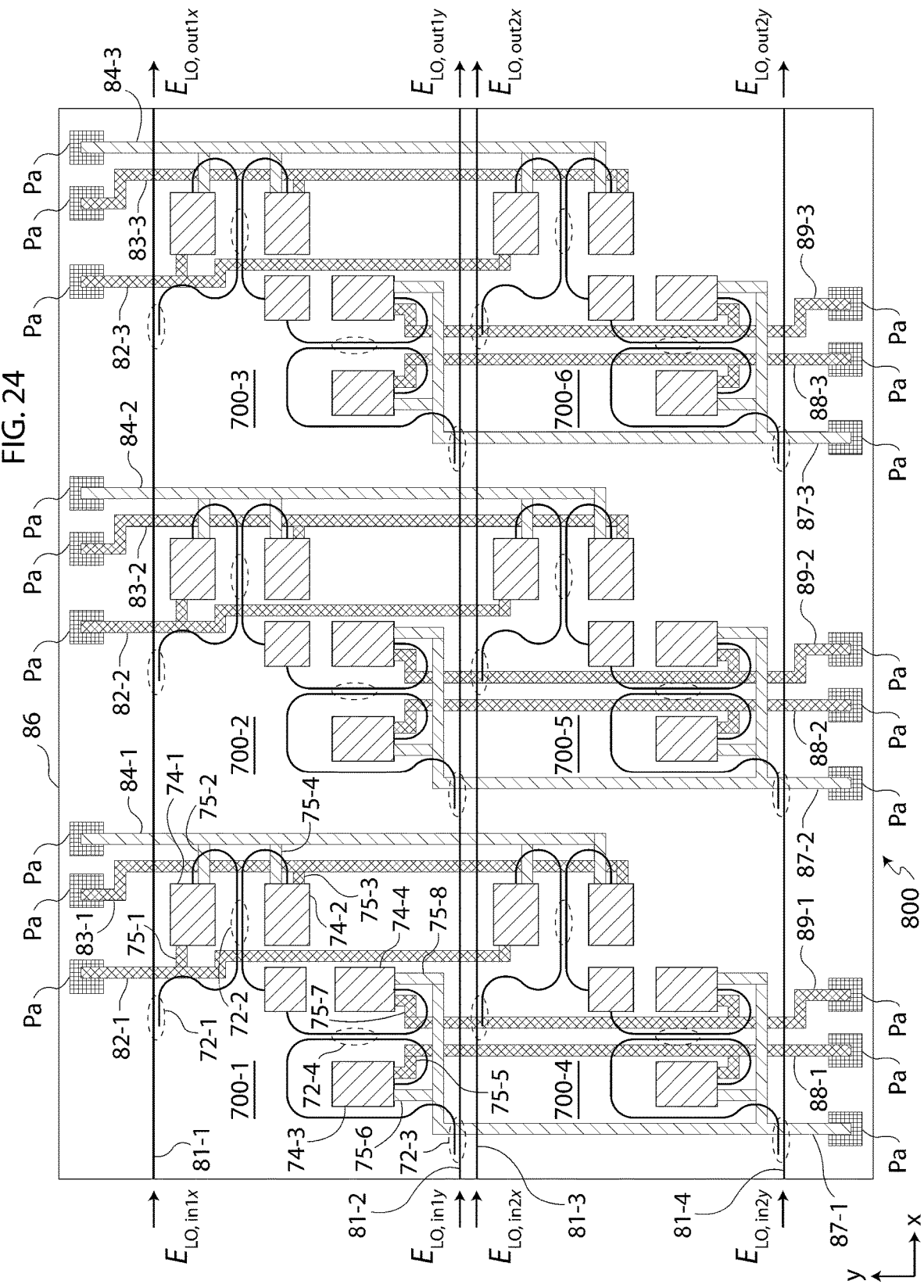
FIGS. 24, 25, 26 and 27 illustrate examples of another configuration of a coherent detection array according to an eighth preferred embodiment of the present invention where the two polarizations of the input light may be detected at the detection units of the array separately.

FIG. 24 illustrates a plan view of the coherent detection array 800. The coherent detection array 800 is configured to include plural units of the coherent detection unit 700 according to the embodiment illustrated in FIG. 22. In some aspects, the coherent detection array 800 may include other embodiments of the coherent detection units. In some aspects, the coherent detection array 800 may be constructed by concatenating plural units of the coherent detection unit 700 in a rectilinear configuration. In other aspects, embodiments of the coherent detection array may be constructed by concatenating plural units of the coherent detection unit 700 in geometries other than the rectilinear configuration. The coherent detection array 800 may be integrated on a substrate 86 using optical waveguide technology.

The coherent detection array 800 illustrated in FIG. 24 is similar to the coherent detection array 200 illustrated in FIG. 2 with an essential difference of employing the coherent detection unit 700 according to the embodiment illustrated in FIG. 22 as a building block of the detection array, instead of the coherent detection unit 100 used in the coherent detection array 200. In some aspects of a rectilinear configuration, the coherent detection array may be configured in M rows and N columns with M×N coherent detection units. As an example, the embodiment of the coherent detection array 800 illustrated in FIG. 24 includes 6 coherent detection units 700-1, 700-2, 700-3, 700-4, 700-5 and 700-6 that are all coherent detection units 700 arranged in the format of 2 rows and 3 columns.

The coherent detection array 800 may be understood with reference to the coherent detection array 200 according to the embodiment illustrated in FIG. 2, in conjunction with the following descriptions.

In some aspects with the coherent detection units 700 configured to detect incoming signal light that may be multiplexed with polarizations in the x and y directions, each row of a coherent detection array 800 may be configured to comprise a row-encoding waveguide for the x-polarized light and a row-encoding waveguide for the y-polarized light, with separate LO light introduced to each row-encoding waveguide. The series of the waveguides 73-1 and 73-10 in a row of connected coherent detection units 700 in the coherent detection array 800 constitute row-encoding waveguides of that row (see FIGS. 22 and 24). The LO light in the row-encoding waveguide for the x polarization may be coupled to the connected coherent detection units 700 through the optical couplers 72-1, and the LO light in the row-encoding waveguide for the y polarization may be coupled to the connected coherent detection units 700 through the optical couplers 72-3 (see FIGS. 22 and 24).

The electric fields of the LO light introduced to the row-encoding waveguides of the coherent detection array are $E_{LO,in\ m\ x}$ and $E_{LO,in\ m\ y}$ with m=1, 2, . . . , M, where M is the number of rows of the detection array. The corresponding transmitted LO fields out of the waveguides are $E_{LO,out\ mx}$ and $E_{LO,out\ my}$. The LO fields $E_{LO,in\ m\ x}$ and $E_{LO,in\ m\ y}$ for different m may have the same or different optical frequencies, the same or different magnitudes, and the same or different relative phases.

For the coherent detection array 800 illustrated in FIG. 24, the LO fields $E_{LO,in1x}$ and $E_{LO,in1y}$ are introduced respectively to the row-encoding waveguides 81-1 and 81-2 in row 1, and the LO fields $E_{LO,in2x}$ and $E_{LO,in2y}$ are introduced respectively to the row-encoding waveguides 81-3 and 81-4 in row 2.

In some aspects, a coherent detection array according to the present preferred embodiment may be constructed in such a manner that, for the coherent detection units in each column, the electrodes 75-1 and 75-2 of the photodetectors 74-1, the electrodes 75-3 and 75-4 of the photodetectors 74-2, the electrodes 75-5 and 75-6 of the photodetectors 74-3, and the electrodes 75-7 and 75-8 of the photodetectors 74-4 may be connected to separate column-readout wirings. In other aspects, either the electrodes 75-1 or the electrodes 75-2 of the photodetectors 74-1 and either the electrodes 75-3 or the electrodes 75-4 of the photodetectors 74-2 may be connected to a common column-readout wiring instead of separate column-readout wirings, and either the electrodes 75-5 or the electrodes 75-6 of the photodetectors 74-3 and either the electrodes 75-7 or the electrodes 75-8 of the photodetectors 74-4 may be connected to a common column-readout wiring instead of separate column-readout wirings. In further aspects, some of the column-readout wirings may be combined to simplify the layout.

For the coherent detection units 700-1 and 700-4 in column 1 of the illustration in FIG. 24, the electrodes 75-1 of the photodetectors 74-1 are connected to the column-readout wiring 82-1, the electrodes 75-3 of the photodetectors 74-2 are connected to the column-readout wiring 83-1, the electrodes 75-5 of the photodetectors 74-3 are connected to the column-readout wiring 88-1, the electrodes 75-7 of the photodetectors 74-4 are connected to the column-readout wiring 89-1, the electrodes 75-2 of the photodetectors 74-1 and the electrodes 75-4 of the photodetectors 74-2 are connected to the common column-readout wiring 84-1, and the electrodes 75-6 of the photodetectors 74-3 and the electrodes 75-8 of the photodetectors 74-4 are connected to the common column-readout wiring 87-1.

Similarly, for the coherent detection units 700-2 and 700-5 in column 2, the electrodes 75-1 of the photodetectors 74-1 are connected to the column-readout wiring 82-2, the electrodes 75-3 of the photodetectors 74-2 are connected to the column-readout wiring 83-2, the electrodes 75-5 of the photodetectors 74-3 are connected to the column-readout wiring 88-2, the electrodes 75-7 of the photodetectors 74-4 are connected to the column-readout wiring 89-2, the electrodes 75-2 of the photodetectors 74-1 and the electrodes 75-4 of the photodetectors 74-2 are connected to the common column-readout wiring 84-2, and the electrodes 75-6 of the photodetectors 74-3 and the electrodes 75-8 of the photodetectors 74-4 are connected to the common column-readout wiring 87-2.

Similarly, for the coherent detection units 700-3 and 700-6 in column 3, the electrodes 75-1 of the photodetectors 74-1 are connected to the column-readout wiring 82-3, the electrodes 75-3 of the photodetectors 74-2 are connected to the column-readout wiring 83-3, the electrodes 75-5 of the photodetectors 74-3 are connected to the column-readout wiring 88-3, the electrodes 75-7 of the photodetectors 74-4 are connected to the column-readout wiring 89-3, the electrodes 75-2 of the photodetectors 74-1 and the electrodes 75-4 of the photodetectors 74-2 are connected to the common column-readout wiring 84-3, and the electrodes 75-6 of the photodetectors 74-3 and the electrodes 75-8 of the photodetectors 74-4 are connected to the common column-readout wiring 87-3.

Similar to FIG. 2, the pads Pa in FIG. 24 are output terminals of the column-readout wirings that may be connected to peripheral readout circuits.

First Modified Example of Eighth Preferred Embodiment

Figure 25:
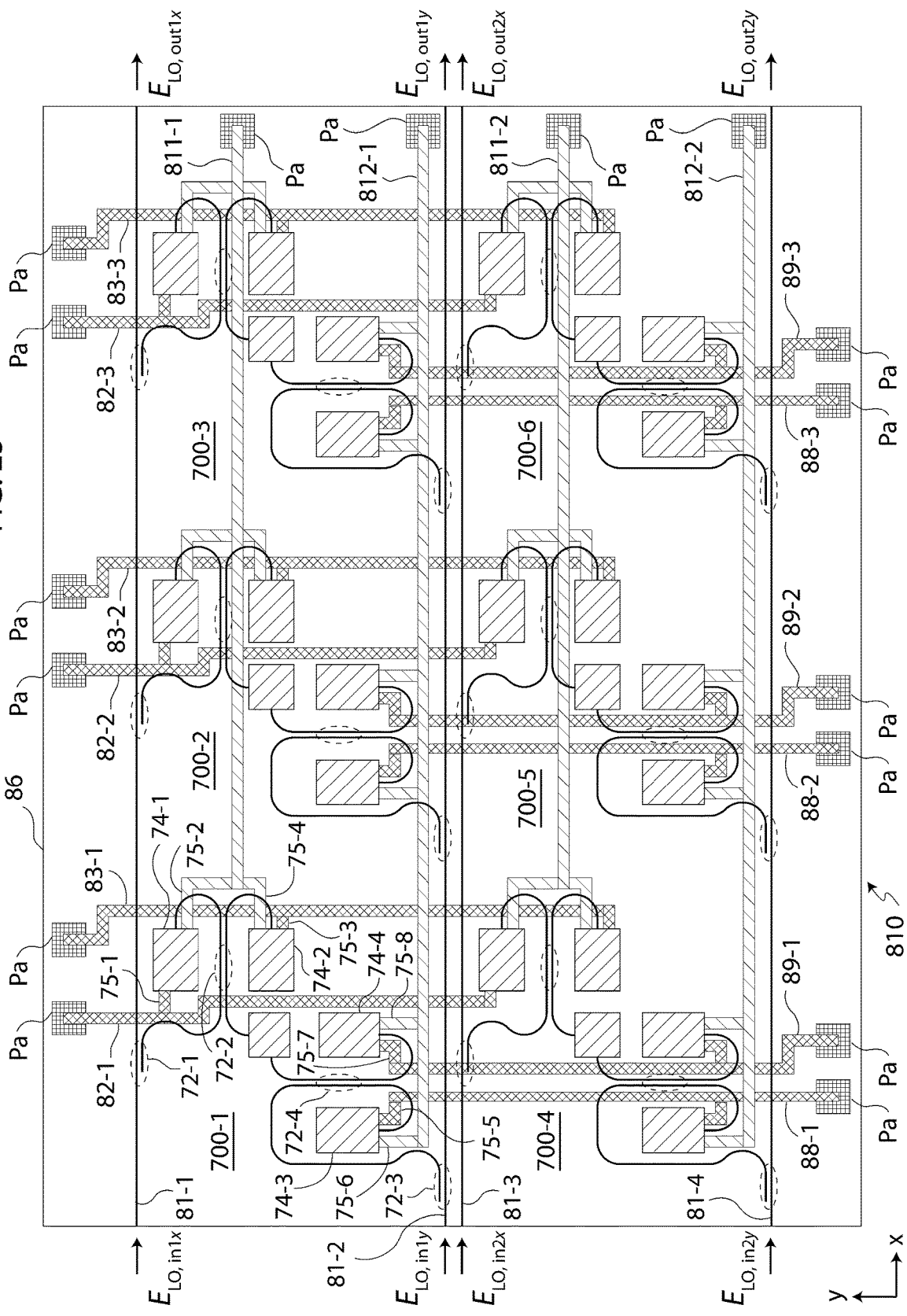

FIG. 25 illustrates a plan view of the coherent detection array 810. The coherent detection array 810 is a modified example of the coherent detection array 800 according to the embodiment illustrated in FIG. 24. Similar to the coherent detection array 800, the coherent detection array 810 may be configured to include plural units of the coherent detection unit 700 according to the embodiment illustrated in FIG. 22. Each row of a coherent detection array 810 may be constructed by concatenating a series of the coherent detection units 700 using the waveguides 73-1 (see FIG. 22). Plural rows of the coherent detection units 700 may be concatenated in series by electrical conducting paths to form a detection array. As an example, the embodiment of the coherent detection array 810 illustrated in FIG. 25 includes 6 coherent detection units 700-1, 700-2, 700-3, 700-4, 700-5 and 700-6 that are all coherent detection units 700 arranged in the format of 2 rows and 3 columns.

Similar to the coherent detection array 800, the coherent detection array 810 according to the present preferred embodiment may be configured in such a manner that, for the coherent detection units in each column, either the electrodes 75-1 or the electrodes 75-2 of the photodetectors 74-1 may be connected to a column-readout wiring, either the electrodes 75-3 or the electrodes 75-4 of the photodetectors 74-2 may be connected to a column-readout wiring, either the electrodes 75-5 or the electrodes 75-6 of the photodetectors 74-3 may be connected to a column-readout wiring, and either the electrodes 75-7 or the electrodes 75-8 of the photodetectors 74-4 may be connected to a column-readout wiring.

Different from the coherent detection array 800, the coherent detection array 810 according to the present preferred embodiment may be configured in such a manner that the other electrodes of the photodetectors of the coherent detection units may be connected across different columns by row-encoding wirings instead of across different rows by column-readout wirings. In some aspects, for the coherent detection units 700 in each row of the coherent detection array 810, either the electrodes 75-1 or the electrodes 75-2 of the photodetectors 74-1 may be connected to a row-encoding wiring, either the electrodes 75-3 or the electrodes 75-4 of the photodetectors 74-2 may be connected to a row-encoding wiring, either the electrodes 75-5 or the electrodes 75-6 of the photodetectors 74-3 may be connected to a row-encoding wiring, and either the electrodes 75-7 or the electrodes 75-8 of the photodetectors 74-4 may be connected to a row-encoding wiring. In other aspects, either the electrodes 75-1 or the electrodes 75-2 of the photodetectors 74-1 and either the electrodes 75-3 or the electrodes 75-4 of the photodetectors 74-2 may be connected to a common row-encoding wiring instead of separate row-encoding wirings, and either the electrodes 75-5 or the electrodes 75-6 of the photodetectors 74-3 and either the electrodes 75-7 or the electrodes 75-8 of the photodetectors 74-4 may be connected to a common row-encoding wiring instead of separate row-encoding wirings. In further aspects, some of the row-encoding wirings may be combined, and/or some of the column-readout wirings may be combined to simplify the layout.

Referring to the coherent detection array 810 illustrated in FIG. 25. On one hand, for the coherent detection units 700-1 and 700-4 in column 1, the electrodes 75-1 of the photodetectors 74-1 are connected to the column-readout wiring 82-1, the electrodes 75-3 of the photodetectors 74-2 are connected to the column-readout wiring 83-1, the electrodes 75-5 of the photodetectors 74-3 are connected to the column-readout wiring 88-1, and the electrodes 75-7 of the photodetectors 74-4 are connected to the column-readout wiring 89-1.

Similarly, for the coherent detection units 700-2 and 700-5 in column 2, the electrodes 75-1 of the photodetectors 74-1 are connected to the column-readout wiring 82-2, the electrodes 75-3 of the photodetectors 74-2 are connected to the column-readout wiring 83-2, the electrodes 75-5 of the photodetectors 74-3 are connected to the column-readout wiring 88-2, and the electrodes 75-7 of the photodetectors 74-4 are connected to the column-readout wiring 89-2.

Similarly, for the coherent detection units 700-3 and 700-6 in column 3, the electrodes 75-1 of the photodetectors 74-1 are connected to the column-readout wiring 82-3, the electrodes 75-3 of the photodetectors 74-2 are connected to the column-readout wiring 83-3, the electrodes 75-5 of the photodetectors 74-3 are connected to the column-readout wiring 88-3, and the electrodes 75-7 of the photodetectors 74-4 are connected to the column-readout wiring 89-3.

On the other hand, for the coherent detection units 700-1, 700-2 and 700-3 in row 1, the electrodes 75-2 of the photodetectors 74-1 and the electrodes 75-4 of the photodetectors 74-2 are connected to the common row-encoding wiring 811-1, and the electrodes 75-6 of the photodetectors 74-3 and the electrodes 75-8 of the photodetectors 74-4 are connected to the common row-encoding wiring 812-1.

Similarly, for the coherent detection units 700-4, 700-5 and 700-6 in row 2, the electrodes 75-2 of the photodetectors 74-1 and the electrodes 75-4 of the photodetectors 74-2 are connected to the common row-encoding wiring 811-2, and the electrodes 75-6 of the photodetectors 74-3 and the electrodes 75-8 of the photodetectors 74-4 are connected to the common row-encoding wiring 812-2.

Figure 26:
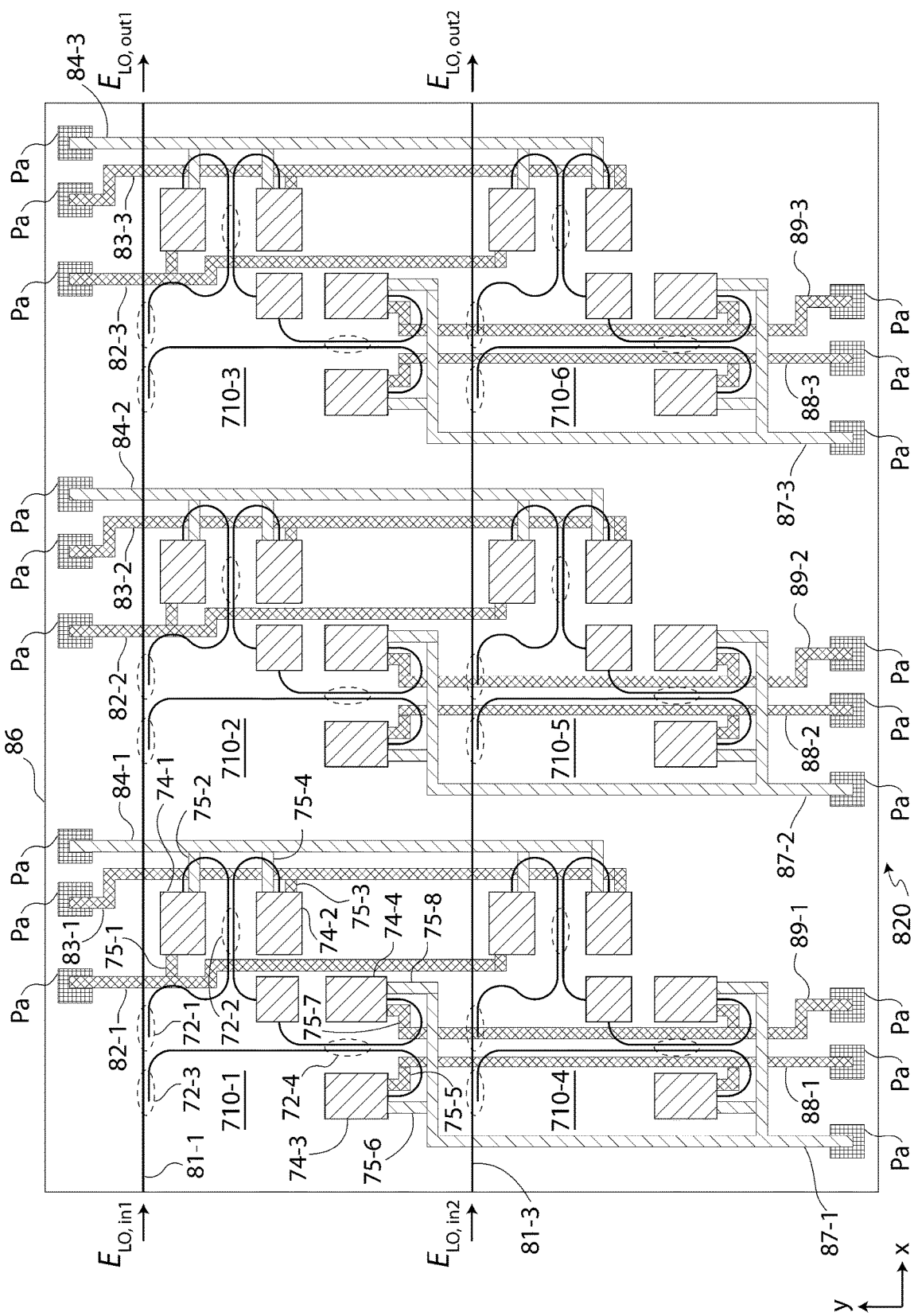

The pads Pa in FIG. 25 are terminals of the column-readout wirings and the row-encoding wirings that may be connected to peripheral electrical circuits Second Modified Example of Eighth Preferred Embodiment FIG. 26 illustrates a plan view of the coherent detection array 820. The coherent detection array 820 is another modified example of the coherent detection array 800 according to the embodiment illustrated in FIG. 24.

The coherent detection array 820 illustrated in FIG. 26 is similar to the coherent detection array 800 illustrated in FIG. 24 with an essential difference of employing the coherent detection unit 710 according to the embodiment illustrated in FIG. 23 as a building block of the detection array, instead of the coherent detection unit 700 used in the coherent detection array 800. In some aspects of a rectilinear configuration, the coherent detection array may be configured in M rows and N columns with M×N coherent detection units. As an example, the embodiment of the coherent detection array 820 illustrated in FIG. 26 includes 6 coherent detection units 710-1, 710-2, 710-3, 710-4, 710-5 and 710-6 that are all coherent detection units 710 arranged in the format of 2 rows and 3 columns.

With the coherent detection units 710 employed, the row-encoding waveguides for the x-polarized and y-polarized light may be combined into one and the same local oscillator light $E_{LO,in\_m}$ with m=1, 2, ..., M, where M is the number of rows, may be used for the two polarizations.

For the coherent detection array 820 illustrated in FIG. 26, the LO light $E_{LO,in1}$ is introduced to the row-encoding waveguide 81-1 in row 1, and the LO light $E_{LO,in2}$ is introduced to the row-encoding waveguide 81-3 in row 2.

Third Modified Example of Eighth Preferred Embodiment

Figure 27:
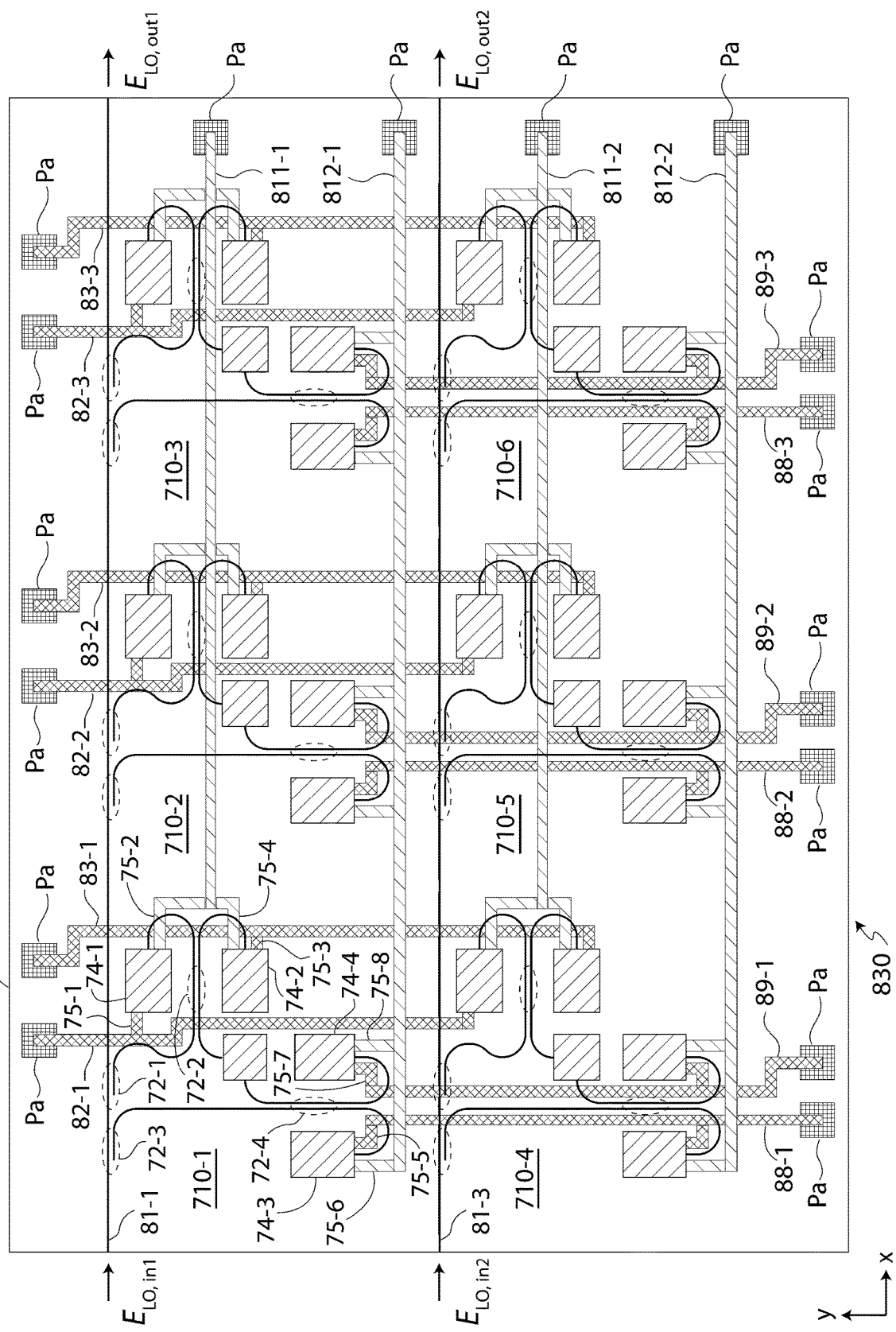

FIG. 27 illustrates a plan view of the coherent detection array 830. The coherent detection array 830 is another modified example of the coherent detection array 800 according to the embodiment illustrated in FIG. 24.

The coherent detection array 830 combines the modifications made to the coherent detection array 800 according to the coherent detection array 810 in FIG. 25 and the coherent detection array 820 in FIG. 26. The coherent detection array 830 may be understood with reference to the coherent detection arrays 810 and 820 according to the embodiments illustrated in FIGS. 25 and 26, in conjunction with the following descriptions.

On one hand, similar to the coherent detection array 820, the coherent detection array 830 employs the coherent detection unit 710 according to the embodiment illustrated in FIG. 23 as a building block of the detection array, instead of the coherent detection unit 700 used in the coherent detection arrays 800 and 810.

With the coherent detection units 710 employed, the row-encoding waveguides for the x-polarized and y-polarized light may be combined into one and the same local oscillator light $E_{LO,in\ m}$ with m=1, 2, . . . , M, where M is the number of rows, may be used for the two polarizations.

For the coherent detection array 830 illustrated in FIG. 27, the LO light $E_{LO,in1}$ is introduced to the row-encoding waveguide 81-1 in row 1, and the LO light $E_{LO,in2}$ is introduced to the row-encoding waveguide 81-3 in row 2.

On the other hand, similar to the coherent detection array 810, the coherent detection array 830 may be configured in such a manner that, for the coherent detection units 710 in each column of the detection array, either the electrodes 75-1 or the electrodes 75-2 of the photodetectors 74-1 may be connected to a column-readout wiring, either the electrodes 75-3 or the electrodes 75-4 of the photodetectors 74-2 may be connected to a column-readout wiring, either the electrodes 75-5 or the electrodes 75-6 of the photodetectors 74-3 may be connected to a column-readout wiring, and either the electrodes 75-7 or the electrodes 75-8 of the photodetectors 74-4 may be connected to a column-readout wiring, while the other electrodes of the photodetectors 74-1, 74-2, 74-3 and 74-4 of the coherent detection units 710 in each row of the detection array may be connected to row-encoding wirings across the columns of that row. In some aspects, some of the row-encoding wirings may be combined, and/or some of the column-readout wirings may be combined to simplify the layout.

Referring to the coherent detection array 830 illustrated in FIG. 27. On one hand, for the coherent detection units 710-1 and 710-4 in column 1, the electrodes 75-1 of the photodetectors 74-1 are connected to the column-readout wiring 82-1, the electrodes 75-3 of the photodetectors 74-2 are connected to the column-readout wiring 83-1, the electrodes 75-5 of the photodetectors 74-3 are connected to the column-readout wiring 88-1, and the electrodes 75-7 of the photodetectors 74-4 are connected to the column-readout wiring 89-1.

Similarly, for the coherent detection units 710-2 and 710-5 in column 2, the electrodes 75-1 of the photodetectors 74-1 are connected to the column-readout wiring 82-2, the electrodes 75-3 of the photodetectors 74-2 are connected to the column-readout wiring 83-2, the electrodes 75-5 of the photodetectors 74-3 are connected to the column-readout wiring 88-2, and the electrodes 75-7 of the photodetectors 74-4 are connected to the column-readout wiring 89-2.

Similarly, for the coherent detection units 710-3 and 710-6 in column 3, the electrodes 75-1 of the photodetectors 74-1 are connected to the column-readout wiring 82-3, the electrodes 75-3 of the photodetectors 74-2 are connected to the column-readout wiring 83-3, the electrodes 75-5 of the photodetectors 74-3 are connected to the column-readout wiring 88-3, and the electrodes 75-7 of the photodetectors 74-4 are connected to the column-readout wiring 89-3.

On the other hand, for the coherent detection units 710-1, 710-2 and 710-3 in row 1, the electrodes 75-2 of the photodetectors 74-1 and the electrodes 75-4 of the photodetectors 74-2 are connected to the common row-encoding wiring 811-1, and the electrodes 75-6 of the photodetectors 74-3 and the electrodes 75-8 of the photodetectors 74-4 are connected to the common row-encoding wiring 812-1.

Similarly, for the coherent detection units 710-4, 710-5 and 710-6 in row 2, the electrodes 75-2 of the photodetectors 74-1 and the electrodes 75-4 of the photodetectors 74-2 are connected to the common row-encoding wiring 811-2, and the electrodes 75-6 of the photodetectors 74-3 and the electrodes 75-8 of the photodetectors 74-4 are connected to the common row-encoding wiring 812-2.

Multiplexing Methods

The signal multiplexing methods that may be applied to the coherent detection array in the present invention will be described in the following. In some aspects, the signal multiplexing methods may be applied to the embodiments of the configurations of the coherent detection array in the present invention. In other aspects, the signal multiplexing methods may also be applied to other detection array configurations and designs not mentioned.

The signal multiplexing methods comprise methods leveraging the extra degrees of freedom of the coherent detection array. These multiplexing methods may be categorized into optical and electrical domains. These methods may include those enabled by the local oscillator and those related to the properties and responses of the components of the PIC-based detection array.

Multiplexing in the optical domain may include the manipulation of the properties of the local oscillator and the optical waveguides of the detection array. Multiplexing through the LO may be enabled by controlling the amplitude, frequency and phase of the LO light at each detection unit or groups of detection units of the detection array. The photocurrents generated may be multiplexed to form multiplexed electrical readout signals. The amplitudes, frequencies and phases of the LO of the detection units may also be temporally modulated so that the multiplexed electrical readout signals may vary in time accordingly.

Multiplexing through the waveguides of the detection array may be enabled by controlling the refractive index of the waveguides of the detection array electrically, thermally, or optically. Methods to control the refractive index of the waveguides electrically may include those utilizing the electro-optic (EO) effect. Methods to control the refractive index of the waveguides thermally may include those utilizing the thermo-optic (TO) effect. Methods to control the refractive index of the waveguides optically may include those utilizing the nonlinear optical effects such as cross-phase modulation (XPM). In some aspects, the manipulation of the refractive index of the waveguide may be applied to waveguides wherein the local oscillator light is guided. This may result in effects similar to manipulating the amplitudes, frequencies and phases of the LO. In other aspects, the manipulation of the refractive index of the waveguide may be applied to waveguides wherein the signal light is guided.

Multiplexing in the electrical domain may include the manipulation of the electrical responses or properties of the components of the detection units in the coherent detection array, such as the responsivities of the photodetectors.

Multiplexing based on the responsivities of the photodetectors may be enabled by controlling the amplitude, frequency and phase of the voltage applied to the photodetector(s) at each detection unit or groups of detection units of the detection array. Photodetector with the responsivity changeable by the applied voltage may include self-mixing detector as described in Non-Patent Document [William C. Ruff, John D. Bruno, Stephen W. Kennerly, Ken Ritter, Paul H. Shen, Barry L. Stann, Michael R. Stead, Zoltan G. Sztankay, Mary S. Tobin, "Self-mixing detector candidates for an FM/cw ladar architecture," Proc. SPIE 4035, Laser Radar Technology and Applications V, (5 Sep. 2000)]. The modulated photocurrents from different coherent detection units may be multiplexed to form multiplexed electrical readout signals. The amplitudes, frequencies and phases of the voltage applied to the photodetectors of the detection units may also be temporally modulated so that the multiplexed electrical readout signals may vary in time accordingly.

Any combination of time-division multiplexing schemes, space-division multiplexing schemes, the multiplexing schemes utilizing the LO, the multiplexing schemes exploiting the waveguides of the detection array, and the multiplexing schemes exploiting the responsivity of the photodetector may be applied concurrently or not concurrently to the coherent detection array. Signal post-processing may be applied to the multiplexed electrical readout signals to extract information regarding the signal light measured at the detection units.

Figure 28:
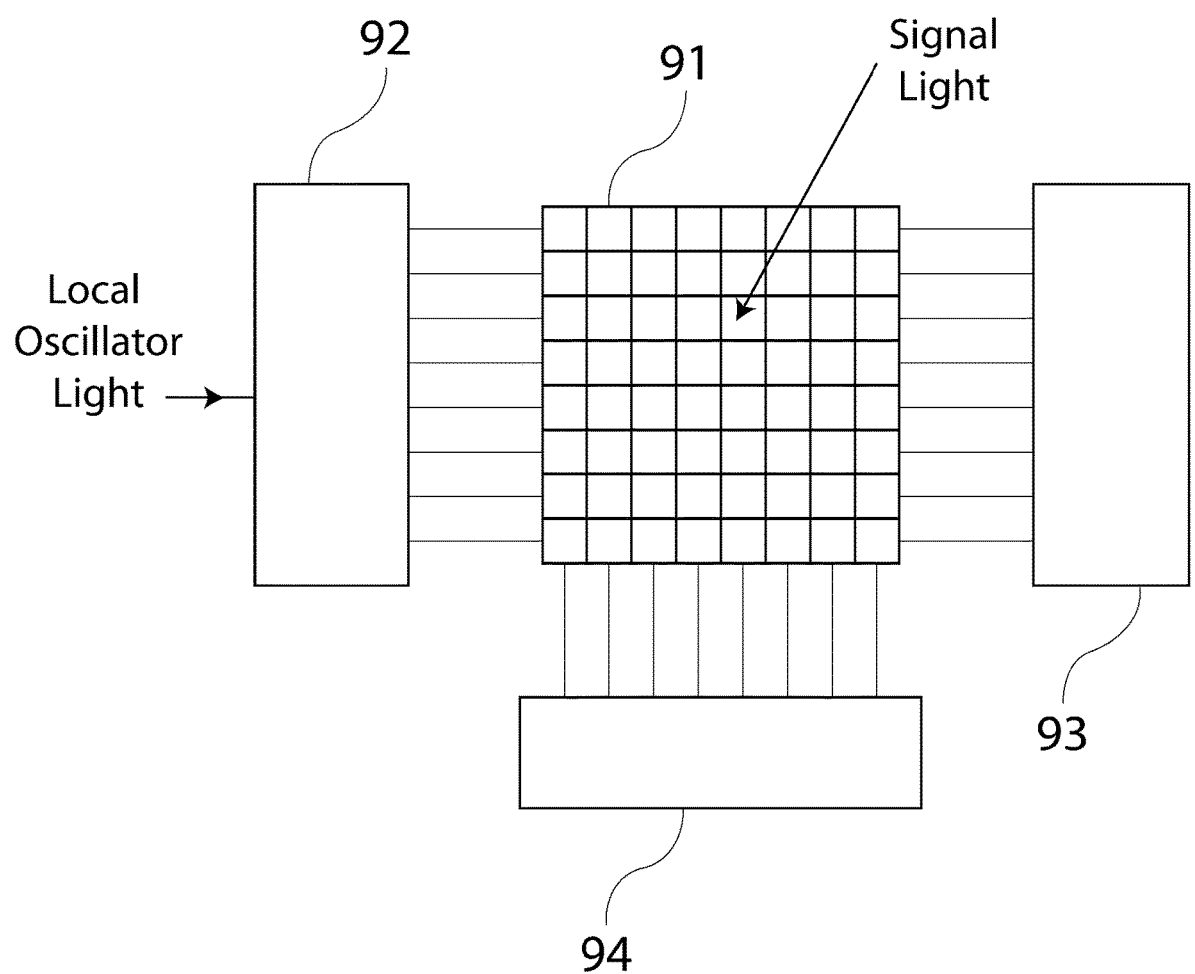
FIG. 28 illustrates a conceptual setup of a coherent detection apparatus comprising a coherent detection array, an optical input circuit, an electrical multiplexing circuit and an electrical readout circuit.

FIG. 28 illustrates a conceptual setup of a coherent detection apparatus comprising a coherent detection array 91, an optical input circuit 92, an electrical multiplexing circuit 93, and an electrical readout circuit 94, wherein any combination of time-division multiplexing schemes, space-division multiplexing schemes, the multiplexing schemes utilizing the LO, the multiplexing schemes exploiting the waveguides of the detection array, and the multiplexing schemes exploiting the responsivity of the photodetector may be applied.

For the embodiments of the coherent detection array of the present invention illustrated in FIGS. 2, 3, 6, 7, 8, 9, 14, 15, 16, 17, 18, 19, 20, 21, 24, 25, 26 and 27, the electric currents at the output ends of the column-readout wirings on column n of the coherent detection array are proportional to $$I_{(n)}(t) = \sum_{m=1}^{M} R_{(m,n)}(t)[P_{0(m,n)} + \langle E_{LO,in(m)}(t)E_{Sig,in(m,n)}(t)\rangle], \quad (1)$$

wherein t denotes time, $E_{LO,in(m)}(t)$ is the electric field of the LO light on row m, $E_{Sig,in(m,n)}(t)$ is the electric field of the signal light coupled to the free-space-to-waveguide coupler at the coherent detection unit on row m and column n, and $R_{(m,n)}(t)$ is the responsivity of the corresponding photodetector. The indices m=1, 2, . . . M and n=1, 2, . . . , N, where M and N denote respectively the numbers of rows and columns of the coherent detection array. The quantity $P_{0(m,n)}$ is a direct component proportional to the average intensities of the signal light and the local oscillator light at the coherent detection unit on row m and column n. For the embodiments of the coherent detection array illustrated in FIGS. 2, 3, 6, 7, 8, 9, 14, 15, 16, 17, 18, 19, 20 and 21, M=3 and N=4, whereas M=2 and N=3 for the illustrations in FIGS. 24, 25, 26 and 27. For the embodiments of the coherent detection array illustrated in FIGS. 14, 15, 16, 17, 18, 19, 20, 21, 24, 25, 26 and 27, the electric fields of the local oscillator light $E_{LO,in(m)}(t)$ and the signal light $E_{Sig,in(m,n)}(t)$ in Equation (1) may further be indexed by the polarization. The photodetector responsivity $R_{(m,n)}(t)$ may also be indexed by the detector label for the coherent detection unit with more than one photodetector implemented. The photodetector responsivity $R_{(m,n)}(t)$ may be determined through calibrations of the coherent detection array. A noise component that may be present has been neglected in Equation (1) for the sake of simplicity.

Embodiments of the multiplexing methods leveraging the extra degrees of freedom in the optical and electrical domain for coherent detection as manifested by the manipulation of the LO and photodetector responsivity will be described below.

Multiplexing Methods by Local Oscillator

In the following, the principles and embodiments of the multiplexing methods leveraging the designs of the coherent detection array of the present invention and exploiting the local oscillator are described.

In some aspects, multiplexing for signal readout may be realized by manipulating the LO. In those circumstances, the photodetector responsivity $R_{(m,n)}$ may be treated as independent of or slowly varying in time. The cross component $\langle E_{LO,in(m)}(t)E_{Sig,in(m,n)}(t)\rangle$ of the electric current in Equation (1) may then be extracted by suppressing the direct component of the electric current by an appropriate filter if the direct component is slowly varying compared to the cross component, or by taking a difference between the photocurrents by the photodetectors for the cases of the embodiments of the coherent detection array illustrated in FIGS. 2, 3, 24, 25, 26 and 27 wherein balanced configurations may be implemented. The cross components of the electric currents at the output ends of the column-readout wirings on column n of the coherent detection array are then proportional to $$I_{ac(n)}(t) = \sum_{m=1}^{M} R_{(m,n)}\langle E_{LO,in(m)}(t)E_{Sig,in(m,n)}(t)\rangle. \quad (2)$$

Equation (2) manifests that, by introducing local oscillator light $E_{LO,in(m)}$ with a nonzero amplitude in the row-encoding waveguide on row m while setting the local oscillator light in other rows to zero, the cross components of the electric currents at the output ends of the column-readout wirings on column n are proportional to $\langle E_{LO,in(m)}(t)E_{Sig,in(m,n)}(t)\rangle$. Consequently, the local oscillator light may be used to select a particular row of the coherent detection array.

In some aspects, the described methods for signal multiplexing may be implemented in view of Equation (2) by controlling the local oscillator light to select the rows of the coherent detection array one-by-one sequentially or non-sequentially, so that all the rows may be readout in M steps. In other aspects, multiplexing may be implemented by introducing nonzero local oscillator light simultaneously into subsets of rows of the coherent detection array. Additionally, the local oscillator light may be introduced into different subsets of rows of the coherent detection array at different times. Also, the electrical signals at the output ends of the column-readout wirings on different columns of the detection array may be multiplexed using existing common readout methods for output to external circuits. Furthermore, signal post-processing may be applied to extract the information of the signal light.

Two other exemplars of the embodiments of the multiplexing methods based on the frequency or amplitude of the LO are described in the following. It is understood that the exemplars are non-exhaustive. In some aspects, other multiplexing schemes may be used to exploit any combination of the amplitude, frequency and phase of the local oscillator light.

Multiplexing Method Based on Frequency Offsets of the Local Oscillator

In the following, an embodiment of the multiplexing method that exploits the frequency of the local oscillator is described.

In some aspects, local oscillator light with different optical frequencies may be introduced into different rows of the coherent detection array to multiplex the electric currents in the column-readout wirings according to Equation (2). In this respect, the different terms of the sum in Equation (2) may exhibit different beating frequencies wherein signal processing may be applied to de-multiplex the information of different rows.

An application of the multiplexing method utilizing different frequencies of the LO to coherent detection is to extend FMCW-LIDAR (see Non-Patent Document [A. Dieckmann, "FMCW-LIDAR with tunable twin-guide laser diode," Electronics Letters 30, 308-309 (1994)]) to achieve simultaneous full-field 3D FMCW-LIDAR. Taking as an exemplar of applying the 3D FMCW-LIDAR on a target using a full-field-illuminating probe laser with a linear frequency chirped at the central frequency $f_0$ with a frequency tuning range B for a sweeping period $T_s$. With the coherent detection array, when the local oscillator light $E_{LO,in\ m}$ in row m is frequency-offset from $f_0$ by $\Omega_m$ with m=1, . . . , M, the cross components of the FMCW photocurrents at the output ends of the column-readout wirings of column n are proportional to $$I_{ac(n)}^{FMCW}(t) = \sum_{m=1}^{M} R_{(m,n)} |E_{LO,in(m)}||E_{Sig,in(m,n)}| \cos\left(2\pi\left(\frac{\tau_{mn}}{T_s}B + \Omega_m\right)t + \theta_{mn}\right), \quad (3)$$

with the phase factor $$\theta_{mn} = 2\pi\tau_{mn}\left(f_0 - \frac{\tau_{mn}}{T_s}B\right) + \Delta\Phi_{mn}(t, \tau),$$

where $\tau_{mn}$ is the round-trip time for the probe beam transmitting to and reflecting from the target and travelling to the coherent detection unit at row m and column n. The phase difference $\Delta\Phi_{mn}(t,\tau)$ contains the phase noise of the laser. By setting the frequency offsets $\Omega_m$ at sufficiently large values, such as but not limited to $$\Omega_m = m\frac{\tau_c}{T_s}B$$

where $\tau_c$ is the coherence time of the probe laser, so that the FMCW photocurrent components from different row m are shifted to distinct frequency bands, the round-trip times $\tau_{mn}$ for all m may be uniquely determined from the frequency spectra of the FMCW photocurrents. Consequently, the frequencies of the local oscillator fields may be exploited to select subsets of rows of the coherent detection array and de-multiplex the information of the signals of the rows.

Figure 29A:
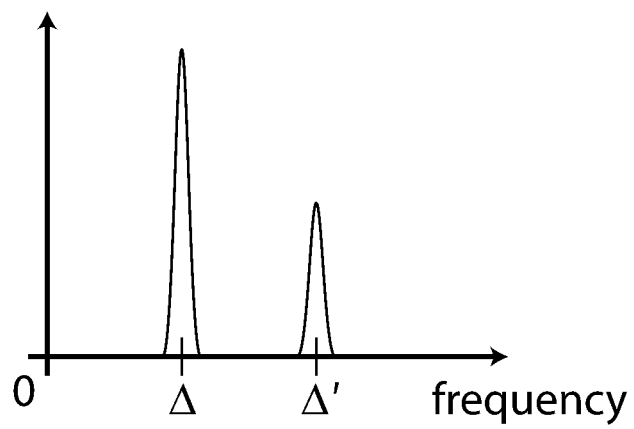
FIGS. 29A and 29B graphically illustrate the concept of an embodiment of a multiplexing method exploiting the local oscillator for a coherent detection array of the present invention.
Figure 29B:
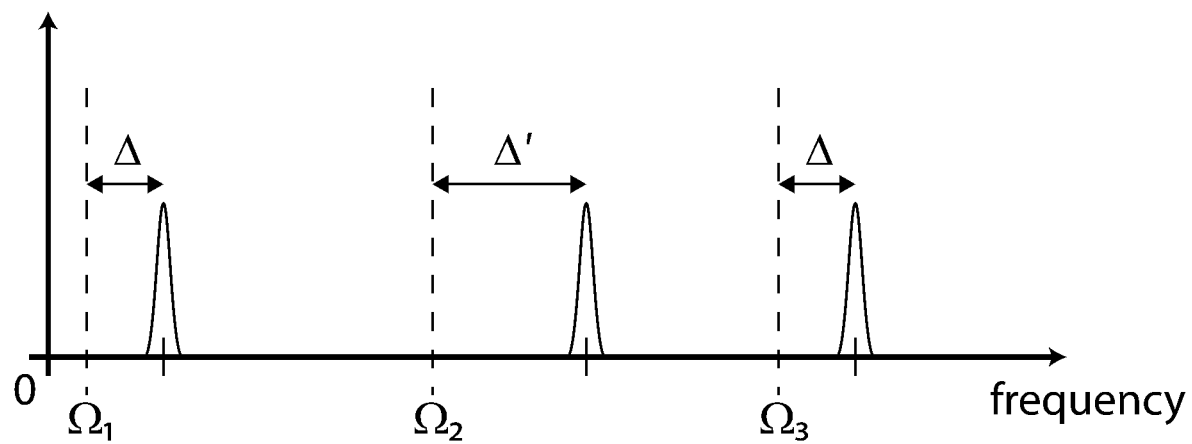

FIGS. 29A and 29B schematically depict examples of the spectra of the cross components of the FMCW photocurrents without and with the LO frequency offsets respectively. Since the signals of interest are purely real, only the positive frequencies are shown. FIG. 29A shows an example for the case of the spectrum without the frequency offsets, which corresponds to Equation (3) with $\Omega_m$=0. Consider an example of the photocurrent composing of signals from three detection units in a column (e.g., detection units 1, 2, 3 at rows 1, 2 and 3 of column 1), wherein detection units 1 and 3 detect the signals from probe beams with round-trip times both equal to $\Delta T_s/B$, i.e. $\tau_{11}=\tau_{31}=\Delta T_s/B$, and detection unit 2 detects the signal from a probe beam with a round-trip time $\tau_{21}=\Delta' T_s/B$. Assume that the signal at the three detection units have the same amplitude and phase for illustrative purposes. Since the round-trip times at detection units 1 and 3 are the same, the photocurrents from detection units 1 and 3 add up. Thus, the amplitude of the photocurrent at the frequency $\Delta$ is twice of that at the frequency $\Delta'$ as depicted in FIG. 29A. In addition, since the photocurrents from the three detection units are summed, there is no way to distinguish their respective contributions from the combined photocurrent. FIG. 29B shows the case of the spectrum when frequency offsets $\Omega_m$ with m=1, 2, 3 are applied to the LO at the detection units 1, 2 and 3 respectively. The frequencies of the photocurrents from the three detection units may then be separated in distinct bands, so that the contributions from the detection units, as well as the round-trip time information of the probe beams at the detection units, may be determined individually.

Multiplexing Method Based on Compressed Sensing

In the following, an embodiment of the multiplexing method that exploits the amplitude of the local oscillator is described.

In some aspects, the selections of the subsets of rows of the coherent detection array and the signal post-processing may be based on the method of compressed sensing (CS) (see Non-Patent Document [D. L. Donoho, "Compressed sensing," IEEE Transactions on Information Theory 52, 1289 (2000)]). To illustrate the principle of the multiplexing method, the incident signal light is taken to be a continuous wave (CW) signal in the following description, though in general the method works for any incident signal light.

In some implementations of the CS method, the incident signal light may be measured K times, wherein each measurement may last for a duration $T_k$ with k=1, 2, . . . , K. The cross components of the electric currents at the output ends of the column-readout wirings on column n of the coherent detection array at the kth measurement according to Equation (2) are proportional to $$I_{ac(n)}^{(k)}(t_k) = \sum_{m=1}^{M} R_{(m,n)} |E_{LO,in(m)}^{(k)}||E_{Sig,in(m,n)}| \cos(2\pi\Delta_{mn}t_k + \theta'_{mn}), \quad (4)$$

where $E_{LO,in\ m}^{(k)}(t_k)$ is the local oscillator light at the row-encoding waveguide in row m in the kth measurement, $|E_{LO,in\ m}^{(k)}|$ and $|E_{Sig,in(m,n)}|$ are the magnitudes of $E_{LO,in\ m}^{(k)}(t_k)$ and $E_{Sig,in(m,n)}(t_k)$ respectively, $\Delta_{mn}$ is the beat frequency of the signal light with the local oscillator light at the detection unit on row m and column n, and $\theta'_{mn}$ is the corresponding phase shift. The time $t_k$ falls within the duration $T_k$ of the kth measurement. Consider the situation when $\theta'_{mn}$ is deterministic for illustrative purposes, i.e., the phase variations in Equation (2) are neglected. In the Fourier domain, Equation (4) may be written in a matrix form: $I_{ac(n)} = E_{LO} x_n$, wherein the elements of the vector $x_n$ are $|E_{Sig,in(m,n)}|[e^{i\theta'_{mn}} \delta(f - \Delta_{mn}) + e^{-i\theta'_{mn}} \delta(f + \Delta_{mn})]$ with $\delta(f)$ being the delta function in the Fourier domain. Here, for any column n, $I_{ac(n)}$ is a vector of length K, $x_n$ is a vector of length M, and $E_{LO}$ is a matrix of size K×M. The local oscillator light together with the constants $R_{(m,n)}$, as represented by $E_{LO} = R_{(m,n)} |E_{LO,in(m)}^{(k)}|$, thus plays the role of the sensing matrix in CS. When the unknown signal vector $x_n$ is sparse according to the CS theory, it may be recovered efficiently through a signal reconstruction algorithm.

Multiplexing Methods by Photodetector

In the following, the principles and an embodiment of the multiplexing methods leveraging the designs of the coherent detection array of the present invention and exploiting the properties of the photodetector are described.

In some aspects, multiplexing through the manipulation of the properties of the photodetector may be performed in the embodiments of the coherent detection arrays illustrated in FIGS. 3, 7, 9, 15, 17, 19, 21, 25 and 27 wherein row-encoding wirings are implemented. For those circumstances, the responsivity of the photodetector may be written in the form $R_{(m,n)} f_{(m)}(t)$ so that the temporal dependence of the responsivity is the same across a row of the detection units of the coherent detection array and the factor $R_{(m,n)}$ accounts for the variations of the responsivities among different photodetectors of the different detection units. The function $f_{(m)}(t)$ may be temporally controlled by changing the voltage applied to the photodetectors on row m of the detection array. According to Equation (1), the electric currents at the output ends of the column-readout wirings on column n of the coherent detection array may then be written as $$I_{(n)}(t) = \sum_{m=1}^{M} R_{(m,n)} f_{(m)}(t) [P_{0(m,n)} + \langle E_{LO,in(m)}(t) E_{Sig,in(m,n)}(t) \rangle]. \quad (5)$$

According to Equation (5), time-division multiplexing methods may be implemented to select the photodetector output on row m by setting a nonzero value to $f_{(m)}(t)$ while switching off the other rows.

In some aspects, the function $f_{(m)}(t)$ may be exploited to provide frequency offsets to multiplex the output signal in a manner similar to the multiplexing method based on the frequency offsets of the local oscillator as manifested in Equation (3). As an illustration, consider the application in the simultaneous full-field 3D FMCW-LIDAR with the local oscillator frequency offsets set to zero and the responsivities take the form $f_{(m)}(t) = C_m + A_m \cos 2\pi\Omega_m t$. Then Equation (5) may be written as $$I_{(n)}^{FMCW}(t) = I_{(n)}^{base}(t) + I_{(n)}^{shift}(t), \quad (6)$$

where the base-band current is given by $$I_{(n)}^{base}(t) = \sum_{m=1}^{M} R_{(m,n)} C_m \left[ P_{0(m,n)} + |E_{LO,in(m)}||E_{Sig,in(m,n)}| \cos\left(2\pi \frac{\tau_{mn}}{T_s} B t + \theta_{mn}\right) \right], \quad (7)$$

and the band-shifted current is given by $$I_{(n)}^{shift}(t) = \sum_{m=1}^{M} R_{(m,n)} A_m \quad (8)$$

$$\left\{ P_{0(m,n)} \cos 2\pi\Omega_m t + \frac{1}{2} |E_{LO,in(m)}||E_{Sig,in(m,n)}| \left[ \cos\left(2\pi\left(\frac{\tau_{mn}}{T_s} B + \Omega_m\right) t + \theta_{mn}\right) + \cos\left(2\pi\left(\frac{\tau_{mn}}{T_s} B - \Omega_m\right) t + \theta_{mn}\right) \right] \right\}.$$

On one hand, the base-band current in Equation (7) corresponds to the signal component that is unaffected by the multiplexing through the temporal modulations of the responsivities of the photodetectors.

On the other hand, similar to the situation represented by Equation (3), the summands of the band-shifted current according to Equation (8) at different rows of the detection array are shifted by the modulation frequencies $\Omega_m$ of the photodetector responsivities. When the modulation frequencies $\Omega_m$ are sufficiently large, the FMCW photocurrent components containing the distance information $\tau_{mn}$ with different m may be shifted to distinct frequency bands. Consequently, the frequency-modulation applied to the photodetector responsivity may be exploited to select subsets of rows of the coherent detection array and de-multiplex the information of the signals of the rows, in a manner similar to the multiplexing method by the LO frequency offsets.

Different from the situation represented by Equation (3), the distance information in the band-shifted current may manifest as two sidebands around the shifted average power term $P_{0(m,n)}$ centered at $\Omega_m$. Therefore, more sophisticated signal post-processing may be needed to extract such information.

Figure 30A:
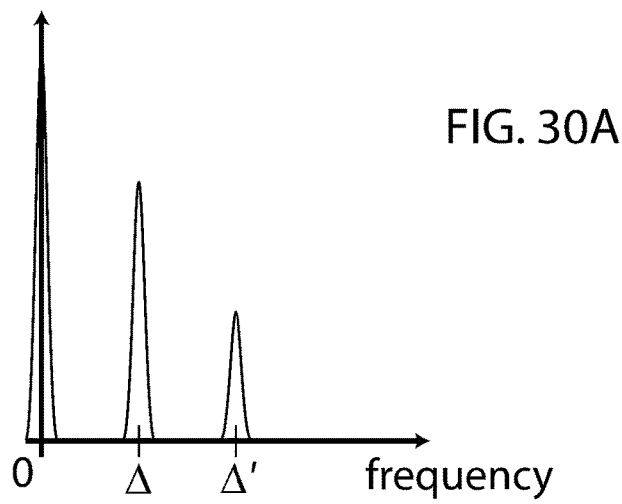
FIGS. 30A-C graphically illustrate the concept of an embodiment of a multiplexing method exploiting the photodetector responsivity for a coherent detection array of the present invention.
Figure 30B:
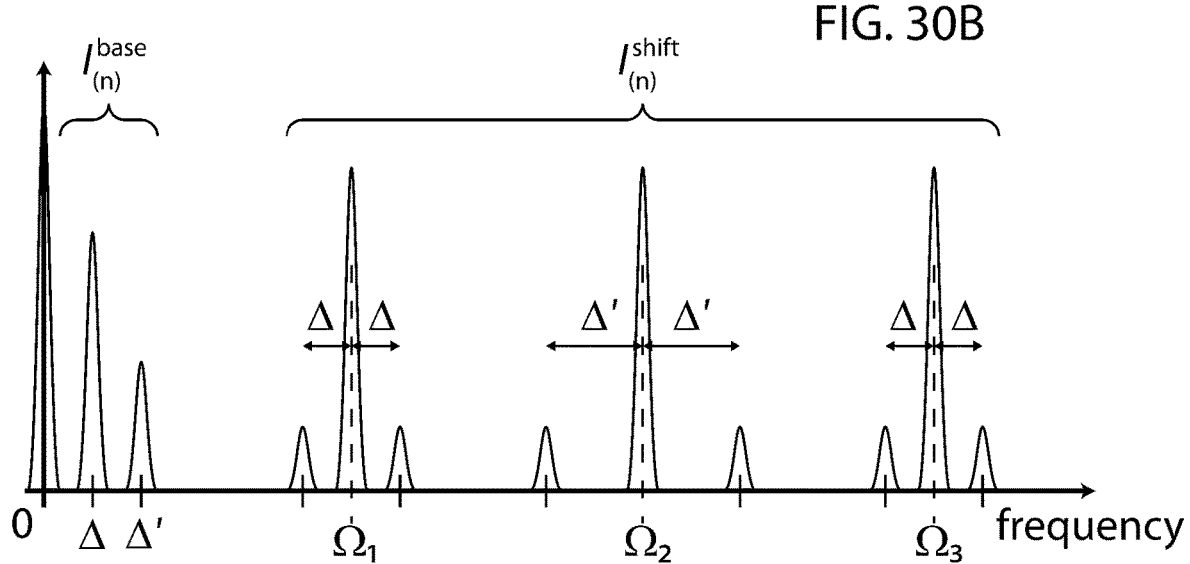
Figure 30C:
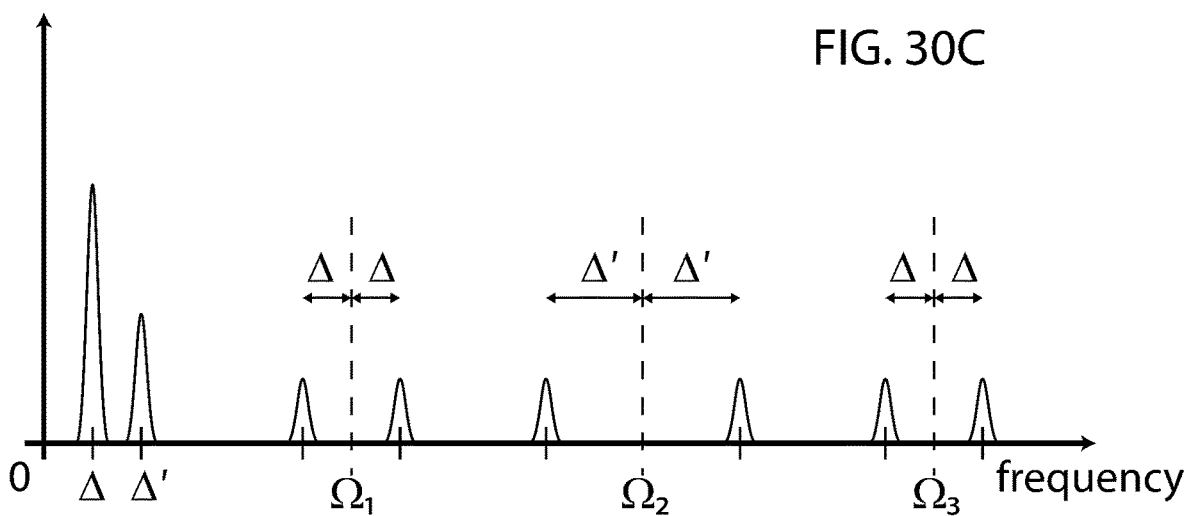

FIGS. 30A-C schematically depict examples of the spectra of the FMCW photocurrents when the photodetector responsivities are modulated sinusoidally. Conditions and parameters the same as that in FIGS. 29A and 29B are considered. Since the signals of interest are purely real, only the positive frequencies are shown. FIG. 30A shows an example for the case of the spectrum without the modulation, which corresponds to Equation (6) with $A_m = 0$. FIG. 30A is the same as FIG. 29A except that the direct component corresponding to the average power $P_{0(m,n)}$ is present. FIG. 30B shows the case of the spectrum when sinusoidal modulations at frequencies $\Omega_m$ with m=1, 2, 3 are applied to the photodetectors at the detection units 1, 2 and 3 respectively. The frequencies of the photocurrents from the three detection units are separated in distinct bands though exhibiting more complicated patterns than FIG. 29B. FIG. 30C shows the situation when the terms containing the average power $P_{0(m,n)}$ in Equations (5), (7) and (8) may be suppressed by taking a difference between the photocurrents by the photodetectors for the cases of the embodiments of the coherent detection array illustrated in FIGS. 2, 3, 24, 25, 26 and 27 wherein balanced configurations may be implemented.

REFERENCES CITED

Other Publications

Firooz Aflatouni, Behrooz Abiri, Angad Rekhi, and Ali Hajimiri, "Nanophotonic coherent imager," Optics Express 23, 5117-5125 (2015).

William C. Ruff, John D. Bruno, Stephen W. Kennerly, Ken Ritter, Paul H. Shen, Barry L. Stann, Michael R. Stead, Zoltan G. Sztankay, Mary S. Tobin, "Self-mixing detector candidates for an FM/cw ladar architecture," Proc. SPIE 4035, Laser Radar Technology and Applications V, (5 Sep. 2000).

A. Dieckmann, "FMCW-LIDAR with tunable twin-guide laser diode," Electronics Letters 30, 308-309 (1994).

D. L. Donoho, "Compressed sensing," IEEE Transactions on Information Theory 52, 1289 (2000).

What is claimed is:

1. A method of optical coherent detection, comprising:
receiving an input light signal from free space using a first subset of coherent detection units of a coherent detection array;
introducing a local oscillator (LO) signal through an optical waveguide to a second subset of the coherent detection units, wherein the second subset overlaps with the first subset;
optically mixing, in individual overlapping ones of the coherent detection units in the first and second subsets, the input light signal and the LO signal by an optical coupler to generate an output light signal from the optical coupler;
converting, in individual ones of the coherent detection units in a third subset of the coherent detection units, the output light signal to an output electrical signal by a photodetector, wherein the third subset overlaps with the first and second subsets;
outputting, through a readout channel, an electrical readout signal based on output electrical signals respectively generated from coherent detection units that are electrically connected to the readout channel in the third subset; and
extracting signal information from a cross component of the electrical readout signal based on detection unit information of an overlapping one of the coherent detection units in the first, second, and third subsets, the signal information being associated with the input light signal received by said overlapping one of the coherent detection units.

2. The method of claim 1, wherein the cross component is related to a product of an electric field of the input light signal and an electric field of the LO signal.

3. The method of claim 1, wherein the detection unit information comprises information related to positions of the coherent detection units of the second subset to which the LO signal is introduced.

4. The method of claim 3, wherein the detection unit information further comprises information related to at least one of an amplitude, a frequency, a relative phase, and application time and duration of the LO signal.

5. The method of claim 1, wherein the detection unit information comprises information related to positions of the coherent detection units of the third subset.

6. The method of claim 1, further comprising filtering out a direct component of the output electrical signal to obtain the cross component using a high-pass filter.

7. The method of claim 1, after optically mixing the input light signal and the LO signal, further comprising splitting the output light signal into a first output light signal and a second output light signal in said individual overlapping ones of the coherent detection units in the first and second subsets; and
wherein converting the output light signal comprises:
converting the first output light signal to a first output electrical signal by a first photodetector in said individual ones of the coherent detection units in the third subset; and
converting the second output light signal to a second output electrical signal by a second photodetector in said individual ones of the coherent detection units in the third subset.

8. The method of claim 7, after converting the first and second output light signals respectively to the first and second output electrical signals, further comprising taking a difference of the first and second output electrical signals to give rise to a differential output electrical signal in said individual ones of the coherent detection units in the third subset; and
wherein outputting the electrical readout signal based on differential output electrical signals respectively generated from the coherent detection units that are electrically connected to the readout channel in the third subset.

9. The method of claim 7, wherein outputting the readout electrical signal comprises:
outputting, through a first readout channel, a first electrical readout signal based on the first output electrical signals respectively generated from the coherent detection units that are electrically connected to the first readout channel in the third subset; and
outputting, through a second readout channel, a second electrical readout signal based on the second output electrical signals respectively generated from the coherent detection units that are electrically connected to the second readout channel in the third subset; and
wherein extracting the signal information associated with the input light signal comprises taking a difference of the first and second electrical readout signals.

10. The method of claim 1, wherein converting the output light signal to the output electrical signal comprises shifting a frequency of the output electrical signal.

11. The method of claim 10, wherein shifting the frequency of the output electrical signal comprises modulating responsivities of the photodetectors in the third set of the coherent detection units by a finite frequency offset, such that the output electrical signal generated by the photodetector in the third subset is shifted to a distinct frequency band.

12. A coherent detection apparatus, comprising:
a coherent detection array including a plurality of coherent detection units to receive an input light signal from free space;
a plurality of encoding waveguides, each being optically coupled to a first subset of the coherent detection units;
a plurality of readout channels, each being electrically connected to a second subset of the coherent detection units;
an optical input circuit to introduce a local oscillator (LO) signal through one of the encoding waveguides to the corresponding first subset of the coherent detection units, the LO signal and the input light signal being optically mixed and converted into an output electrical signal in individual ones of the coherent detection units in the first subset; and a readout circuit electrically connected to the readout channels;

wherein the readout circuit is configured to:

receive an electrical readout signal from the readout channels; and extract signal information from a cross component of the electrical readout signal based on detection unit information of an overlapping one of the coherent detection units in the first and second subsets, the signal information being associated with the input light signal received by said overlapping one of the coherent detection units.

13. The apparatus of claim 12, wherein the electrical readout signal is based on output electrical signals respectively generated from the coherent detection units in the second subset.

14. The apparatus of claim 12, wherein the cross component is related to a product of an electric field of the input light signal and an electric field of the LO signal.

15. The apparatus of claim 12, wherein the detection unit information comprises information related to positions of the coherent detection units of the first subset to which the LO signal is introduced.

16. The apparatus of claim 15, wherein the detection unit information further comprises information related to at least one of an amplitude, a frequency, a relative phase, and application time and duration of the LO signal.

17. The apparatus of claim 12, wherein individual ones of the coherent detection units comprise a high-pass filter to filter out a direct component of the output electrical signal.

18. The apparatus of claim 12, wherein individual ones of the coherent detection units comprise:

an optical coupler to mix the input light signal and the LO signal and to splitt the mixed light signal into a first output light signal and a second output light signal; and first and second photodetectors to convert the first and second output light signals respectively into first and second output electrical signals.

19. The apparatus of claim 18, wherein a difference of the first and second output electrical signals is taken to give rise to a differential output electrical signal; and wherein the readout circuit is configured to receive the electrical readout signal based on differential output electrical signals respectively generated from the coherent detection units in the second subset.

20. The apparatus of claim 18, wherein individual ones of the readout channels comprise:

a first readout channel electrically connected to the coherent detection units in the second subset; and a second readout channel electrically connected to the coherent detection units in the second subset; and wherein the readout circuit is configured to:

receive first and second electrical readout signals respectively from the first and second readout channels, the first and second electrical readout signals being respectively based on the first and second output electrical signals generated from the coherent detection units in the second subset; and extract the signal information associated with the input light signal by taking a difference of the first and second electrical readout signals.

21. The apparatus of claim 12, further comprising a plurality of encoding channels, each being electrically connected to a third subset of the coherent detection units; and wherein the readout circuit is configured to:

receive an electrical readout signal from the readout channels; and extract signal information from a cross component of the electrical readout signal based on detection unit information of an overlapping one of the coherent detection units in the first, second, and third subsets, the signal information being associated with the input light signal received by said overlapping one of the coherent detection units.

22. The apparatus of claim 21, wherein the detection unit information comprises information related to positions of the coherent detection units of the third subset.

23. The apparatus of claim 21, wherein the photodetectors in one or more of the third subsets of the coherent detection units are switched on through the corresponding encoding channel of the third subset, and wherein the photodetectors in other one or more of the third subsets of the coherent detection units are switched off through the corresponding encoding channel of the third subset.

24. The apparatus of claim 23, wherein the electrical readout signal is based on output electrical signals respectively generated from the overlapping coherent detection units in the second and third subsets, wherein the photodetectors of the third subset are switched on.

25. The apparatus of claim 21, wherein responsivities of the photodetectors of the coherent detection units in the third subset are modulated by a finite frequency offset, such that the output electrical signals generated by the coherent detection units are shifted to a distinct frequency band.

* * * * *